United States Patent
Yatake et al.

(10) Patent No.: US 9,725,608 B2
(45) Date of Patent: *Aug. 8, 2017

(54) INK JET RECORDING INK, INK JET RECORDING INK SET, RECORDING METHOD, RECORDED MATTER AND INK JET RECORDING APPARATUS

(71) Applicant: Seiko Epson Corporation, Tokyo (JP)

(72) Inventors: Masahiro Yatake, Nagano-ken (JP); Toshiyuki Miyabayashi, Nagano-ken (JP); Hiroko Hayashi, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,994

(22) Filed: Feb. 25, 2014

(65) Prior Publication Data

US 2014/0171558 A1    Jun. 19, 2014

Related U.S. Application Data

(63) Continuation of application No. 11/981,349, filed on Oct. 31, 2007, now abandoned, which is a continuation of application No. 10/048,909, filed as application No. PCT/JP01/04787 on Jun. 6, 2001, now Pat. No. 7,307,109.

(30) Foreign Application Priority Data

| Jun. 7, 2000 | (JP) | 2000-170921 |
| Jun. 7, 2000 | (JP) | 2000-170922 |
| Jun. 7, 2000 | (JP) | 2000-170923 |
| Jun. 7, 2000 | (JP) | 2000-170924 |
| Jun. 7, 2000 | (JP) | 2000-170925 |
| Jun. 7, 2000 | (JP) | 2000-170926 |
| Jun. 7, 2000 | (JP) | 2000-170927 |
| Jun. 7, 2000 | (JP) | 2000-170928 |
| Jun. 7, 2000 | (JP) | 2000-170929 |
| Jun. 7, 2000 | (JP) | 2000-170931 |
| Jun. 7, 2000 | (JP) | 2000-170932 |
| Jun. 7, 2000 | (JP) | 2000-170934 |
| Jun. 7, 2000 | (JP) | 2000-170935 |
| Jun. 7, 2000 | (JP) | 2000-170936 |

(51) Int. Cl.
| B41J 2/14 | (2006.01) |
| C08K 3/20 | (2006.01) |
| C08K 5/053 | (2006.01) |
| C08K 5/06 | (2006.01) |
| C09D 11/32 | (2014.01) |
| C09D 11/322 | (2014.01) |
| C09D 11/40 | (2014.01) |

(52) U.S. Cl.
CPC ......... *C09D 11/322* (2013.01); *B41J 2/14201* (2013.01); *C08K 3/20* (2013.01); *C08K 5/053* (2013.01); *C08K 5/06* (2013.01); *C09D 11/32* (2013.01); *C09D 11/40* (2013.01)

(58) Field of Classification Search
CPC ....... C09D 11/322; C09D 11/32; C09D 11/40; C08K 3/20; C08K 5/053; C08K 5/06; B41J 2/14201

See application file for complete search history.

(56) References Cited

U.S. PATENT DOCUMENTS

| 4,692,188 A | 9/1987 | Ober et al. |
| 4,986,850 A | 1/1991 | Iwata et al. |
| 5,380,358 A | 1/1995 | Aoki et al. |
| 5,877,235 A * | 3/1999 | Sakuma et al. ............... 523/161 |
| 5,913,971 A | 6/1999 | Fujimatsu et al. |
| 5,919,291 A | 7/1999 | Hotomi et al. |
| 5,981,623 A | 11/1999 | McCain et al. |
| 6,004,389 A | 12/1999 | Yatake |
| 6,031,019 A | 2/2000 | Tsutsumi et al. |
| 6,039,796 A | 3/2000 | Kubota et al. |
| 6,274,646 B1 | 8/2001 | Watanabe et al. |
| 6,500,248 B1 | 12/2002 | Hayashi |
| 6,767,090 B2 | 7/2004 | Yatake et al. |
| 6,864,302 B2 * | 3/2005 | Miyabayashi ................ 523/160 |

(Continued)

FOREIGN PATENT DOCUMENTS

| EP | 0 801 119 A1 | 10/1997 |
| EP | 0 978 547 A1 | 2/2000 |
| JP | 62-95366 A | 5/1987 |
| JP | 01-170672 A | 7/1989 |
| JP | 05-039447 A | 2/1993 |
| JP | 05-339516 A | 12/1993 |
| JP | 06-313141 A | 11/1994 |
| JP | 7-94634 B2 | 10/1995 |
| JP | 08-030228 A | 2/1996 |

(Continued)

OTHER PUBLICATIONS

Machine English translation of JP 10-316909, Nagai et al., Dec. 1998.*

(Continued)

*Primary Examiner* — Patrick Niland
(74) *Attorney, Agent, or Firm* — Harness, Dickey & Pierce, P.L.C.

(57) ABSTRACT

An ink jet recording ink has excellent dispersion stability and ejection stability and is capable of providing images free from bleeding. Such an ink exhibits excellent color development and rubbing resistance. The ink jet recording ink comprises a pigment dispersed by a polymer; water; at least one compound selected from the group consisting of an acetylene glycol surfactant and an acetylene alcohol surfactant; and 1,2-hexanediol. The pigment dispersed by the polymer is produced by a phase conversion emulsification, an emulsion polymerization, an acid deposition or a forced emulsification. The ink has a surface tension between 25 mN/m and 45 mN/m.

1 Claim, No Drawings

(56) References Cited

U.S. PATENT DOCUMENTS

| | | | |
|---|---|---|---|
| 7,307,109 B2* | 12/2007 | Yatake et al. ................. | 523/160 |
| 2003/0236321 A1 | 12/2003 | Sano et al. | |

FOREIGN PATENT DOCUMENTS

| | | | |
|---|---|---|---|
| JP | 08-059715 A | | 3/1996 |
| JP | 08-081647 A | | 3/1996 |
| JP | 08-302227 A | | 11/1996 |
| JP | 09-279053 A | | 10/1997 |
| JP | 10-077430 A | | 3/1998 |
| JP | 10-120957 A | | 5/1998 |
| JP | 10-140065 A | | 5/1998 |
| JP | 10-176130 A | | 6/1998 |
| JP | 10-316909 | * | 12/1998 |
| JP | 10-316909 A | | 12/1998 |
| JP | 11-116881 A | | 4/1999 |
| JP | 2000-007961 A | | 1/2000 |
| JP | 2000-034430 A | | 2/2000 |
| JP | 2001-123098 A | | 5/2001 |
| JP | 2001-164144 A | | 6/2001 |
| WO | 00/22056 A1 | | 4/2000 |
| WO | 01/94482 A1 | | 12/2001 |

OTHER PUBLICATIONS

Amari, T., "Technologies & Materials for Inkjet Printer", CMC Publishing Co., Ltd., 1998, pp. 201-213.

\* cited by examiner

INK JET RECORDING INK, INK JET RECORDING INK SET, RECORDING METHOD, RECORDED MATTER AND INK JET RECORDING APPARATUS

CROSS-REFERENCE TO RELATED APPLICATIONS

This application is a continuation of, and claims priority under 35 U.S.C. §120 on, application Ser. No. 11/981,349, filed Oct. 31, 2007, which is a continuation of application Ser. No. 10/048,909, filed Jun. 18, 2002, now U.S. Pat. No. 7,307,109, which is a U.S. national phase application of PCT/JP01/04787, filed Jun. 6, 2001. The content of each of these related applications is incorporated by reference herein.

TECHNICAL FIELD

The present invention relates to an ink jet recording ink, an ink jet recording ink set, a recording method, recorded matter, and an ink jet recording apparatus.

BACKGROUND ART

Ink jet recording is a method of recording letters and figures on the surface of a recording object by ejecting ink droplets onto the object through fine nozzles. For such an ink jet recording system, for example, practically employed are a method of recording letters and symbols on the surface of a recording object by converting electronic signals into mechanical ones by the use of an electrostrictive device, followed by intermittently ejecting the ink stored in a nozzle head onto the object according to the thus-converted mechanical signals; and a method of recording letters and symbols on the surface of a recording object by rapidly heating a part of the ink stored in a nozzle head and nearest to the ejecting orifices of the nozzle to cause bubbling, and intermittently ejecting the ink onto the object by the volume expansion of the ink bubbles.

Ink for such ink jet recording is required to have various specific characteristics. For example, for printing on paper which is an recording object, the requirements of the ink to be used are that it does not cause bleeding, it quickly dries thereon, it enables uniform recording on various kinds of recording objects, and it does not mix with the neighboring ink in multi-color printing to form color prints.

For ink jet recording ink, generally used are those prepared by dissolving various kinds of water-soluble dyes in aqueous media. Recently, those prepared by dispersing pigments in aqueous media have been provided, and this is characterized in that the pigment-containing inks are superior to the water-soluble dye-containing ones in water-resistance and light-resistance.

Many conventional pigment-containing inks are to ensure the quality of printed matter by mainly suppressing their penetration into printing paper to thereby prevent the paper surface from being too much wetted with the inks and make the ink droplets stay near the paper surface. However, the inks of this type are problematic in that their applicability to all kinds of paper is low. Specifically, one problem is that the difference in the degree of bleeding depending on the kind of paper is large. In particular, for regenerated paper that comprises many unspecific paper materials, the difference in the wettability of inks with such different paper materials constituting it has an influence on the degree of ink bleeding thereon, and, as a result, the print quality is unstable.

Another problem is that the inks of the type mentioned above take a long time until the printed area is dried. In particular, in multi-color printing for color prints, the neighboring inks are mixed. Still another problem is that some pigment remains on the printed paper, and therefore the printed paper is deteriorated in abrasion resistance.

To solve the problems, adding a penetrant to ink is tried for improving ink penetration into paper. For example, some examples of using glycol ethers are disclosed as follows. An example of using triethylene glycol monomethyl ether is disclosed in Japanese Patent Laid-Open No. 147861/1981; and an example of using ethylene glycol, diethylene glycol or triethylene glycol ethers is in Japanese Patent Laid-Open No. 111165/1997. Addition of diethylene glycol monobutyl ether is proposed in U.S. Pat. No. 5,156,675; addition of an acetylene glycol surfactant, Surfynol 465 (by Nisshin Chemical) is in U.S. Pat. No. 5,183,502; and a combined use of diethylene glycol monobutyl ether and Surfynol 465 is in U.S. Pat. No. 5,196,056. In U.S. Pat. No. 2,083,372, proposed is using diethylene glycol ethers in ink.

For preparing conventional pigment-containing inks, in general, pigment is dispersed in an aqueous medium by a dispersant such as surfactant or polymer dispersant. However, this is problematic in that it is not easy to improve the ink penetration while ensuring the pigment dispersion stability in ink.

In the inks of pigment dispersion prepared by dispersing pigment by a dispersant such as surfactant or polymer dispersant so as to improve the ink penetration, the pigment merely adsorbs the dispersant on its surface. Therefore, when the ink of the type is ejected through fine nozzles, the adsorbed dispersant drops off in case where it receives strong shear force, and the pigment dispersibility in the ink is lowered, thereby the ejection may tend to become unstable. In addition, when the ink is stored for a long time, the dispersibility may tend to become unstable. To solve the problems, an increase of the addition amount of the dispersant can be considered. In such a case, however, the amount of the dispersant not adsorbed by the pigment but still dissolving in the ink increases, and therefore the ink often involves the phenomena that when used in printing plain paper or regenerated paper, it readily cause bleeding and it wets the periphery of the nozzles to readily make the ejection unstable. In addition, in case where ink of a pigment dispersion prepared by dispersing a pigment by a dispersant such as surfactant or polymer dispersant to ensure improved penetration is used in printing on plain paper or regenerated paper, the pigment which is the colorant component therein tends to hardly remain on the surface of the fibers constituting the surface of the recording medium and, as a result, there is a tendency that the printed density is insufficient and the color development is not good. Moreover, in general, the dispersant not originally adsorbed by the pigment but dissolving in ink, or the dispersant having dropped off from the pigment tend to increase the viscosity of the ink, and therefore the pigment content of the ink is limited in many cases. Therefore, the ink of this type could not ensure sufficient printed density especially on plain paper or regenerated paper, and hence good color development cannot be attained and high-quality images are hardly obtained. In addition, when ink is left in heads for a long time, its dispersion stability is deteriorated and there have been cases where the ejection of the ink from the nozzles of a printer becomes difficult.

With respect to these problems, inks using pigments having subjected to some surface treatment to their surfaces have been proposed for improving ejection stability, dispersion stability, printed density and color development property. Examples of the inks using treated pigments are as follows. For example, inks using pigment particles oxidized on their surfaces are proposed in Japanese Patent Laid-Open No. 319444/1996; inks using encapsulated fine pigment particles are proposed in Japanese Patent Publication No. 94634/1995 and Japanese Patent Laid-Open No. 59715/1996; and inks using pigment particles having graft polymerized a polymer on their surfaces are proposed in Japanese Patent Laid-Open Nos. 339516/1993, 302227/1996, 302228/1996 and 81647/1996.

In addition to the above proposals, further proposed are inks using a pigment coated with a resin having film-forming property through phase conversion emulsification at room temperature, as disclosed in Japanese Patent Laid-Open Nos. 218015/1996, 295837/1996, 3376/1997, 183920/1996, 46075/1998, 292143/1998, 80633/1999, 349870/1999 and 7961/2000; and inks using a pigment coated with an anionic group-containing organic polymer compound through acid deposition, as disclosed in Japanese Patent Laid-Open Nos. 31360/1997, 217019/1997, 316353/1997, 104834/1997, 151342/1997, 140065/1998, 152424/1999, 166145/1999, 166145/1999, 199783/1999 and 209672/1999. However, inks using the colorant prepared through phase conversion emulsification or acid deposition in combination with a surfactant, as a penetrant, such as glycol ethers or acetylene glycol surfactants are still unsatisfactory especially in point of the image quality on plain paper or regenerated paper. Specifically, the resin not absorbed by the pigment exists in the ink with being dissolved therein; and the resin adsorbed by the pigment drops off to increase the amount of the resin dissolving in the ink. For these reasons, when the ink is used in printing on plain paper or regenerated paper, the pigment which is the colorant component hardly remain on the surface of paper-forming fibers on the recording medium surface. Therefore, it is difficult to obtain a sufficient printed density and the color development is not good. In addition, bleeding readily occurs. Furthermore, it tends to cause a phenomenon that the ink wets the periphery of the nozzles to readily make the ejection unstable.

The present invention is to solve at least some of the problems described above. Accordingly, an object thereof is to provide an ink jet recording ink having excellent dispersion stability and ejection stability and being capable of providing a high-quality image free from bleeding and that has high printed density and excellent color development property even on plain paper and regenerated paper.

Another object of the invention is to provide an ink jet recording ink capable of attaining satisfactory rubbing resistance not only on plain paper and regenerated paper but also on other recording media such as coated paper, etc.

A still other object of the invention is to provide an ink jet recording ink that has excellent long-term storage stability.

DISCLOSURE OF THE INVENTION

The present inventors invented an ink that has excellent properties suitable for ink jet recording ink. Specifically, it was found that the ink has good dispersion stability and ejection stability, and enables stable printing operation with no trouble of nozzle clogging for a long time, and further found that, when used in printing on recording media such as plain paper, regenerated paper and coated paper, it can form an image having a good drying property, being free from bleeding, having high printed density and excellent color development property and rubbing resistance. Embodiments of the invention are set forth below.

An ink jet recording ink comprising a pigment dispersed by a polymer; water; at least one compound selected from the group consisting of an acetylene glycol surfactant and an acetylene alcohol surfactant; and 1,2-hexanediol. The pigment dispersed by the polymer is produced by a phase conversion emulsification, an emulsion polymerization, an acid deposition or a forced emulsification. The ink has a surface tension between 25 mN/m and 45 mN/m.

The ink jet recording ink may further comprise glycol ether. The glycol ether may be di(tri)ethylene glycol monobutyl ether, (di)propylene glycol monobutyl ether, or both.

The ink jet recording ink may further comprise at least one compound selected from the group consisting of polyalcohols and compounds of the following formula (1):

$$R\text{-}EOn\text{-}POm\text{-}M \qquad (1)$$

where
R represents a $C_{4\text{-}12}$ alkanol, cycloalkanol, phenol and/or naphthol group, which is linear and/or another isomer;
EO represents an ethyleneoxy group;
PO represents a propyleneoxy group;
n and m each indicate the mean value of the repetitive units in the whole system;
the indication of EO and PO merely represent the presence thereof in the molecule, not limiting their order;
M represents a hydrogen atom, a sulfonate group, a phosphate group and/or a borate group, and the counter ion of the sulfonate group, the phosphate group and/or the borate group is a hydrogen atom, an alkali metal, an inorganic base and/or an organic amine.

In the ink jet recording ink, the polymer content may be 10% by weight or higher based on the whole amount of the pigment.

The polymer itself may comprise, as a main component, at least one member selected from the group consisting of vinyl polymers, polyesters, polyamides, polyimides, silicon-containing polymers and sulfur-containing polymers. The polymer may have a crosslinked structure.

Other characteristics and properties of the polymer may include one or more of the following. The polymer may have a solubility parameter of from 11 to 14 cal/cm³, where the difference between the solubility parameter of a liquid component in the ink and that of the polymer is 1.0 cal/cm³ or greater. The polymer may have an acid value of from 20 to 200 KOH mg/g. The polymer may have a glass transition temperature of not higher than 25° C. The polymer may have a film-forming temperature of not higher than 25° C.

In the ink jet recording ink, the pigment dispersed by the polymer may further contain a hardly water-soluble substance. The hardly water-soluble substance may have a solubility in water of 10% by weight or lower.

The ink jet recording ink may have a surface tension of at most 37 mN/m.

In the ink jet recording ink, the pigment may be an inorganic pigment selected from the group consisting of copper oxides, iron oxides, titanium oxides, and carbon blacks, or an organic pigment selected from the group consisting of azo pigments, phthalocyanine pigments, perylene pigments, perinone pigments, anthraquinone pigments, quinacridone pigments, dioxane pigments, thioindigo pigments, isoindolinone pigments, quinofuranone pigments, nitro pigments, nitroso pigments, and aniline black.

In the ink jet recording ink, the content of 1,2-hexanediol in the ink may be from 0.5% by weight to 10% by weight.

In the ink jet recording ink, an addition amount of 1,2-alkylene glycol in the ink may be less than 10 times an addition amount of the acetylene glycol surfactant and/or the acetylene alcohol surfactant.

In the event a polymerizable surfactant is employed, it may be a compound having the following formula (1):

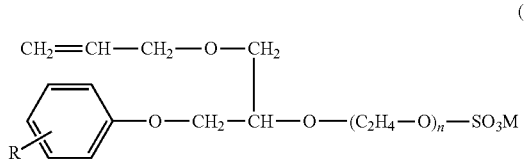

wherein R represents a hydrogen atom, or a hydrocarbon group having from 1 to 12 carbon atoms; n indicates a number falling between 2 and 20; M represents an alkali metal, an ammonium salt, or an alkanolamine.

Alternatively, any polymerizable surfactant may be a compound of the following formula (II):

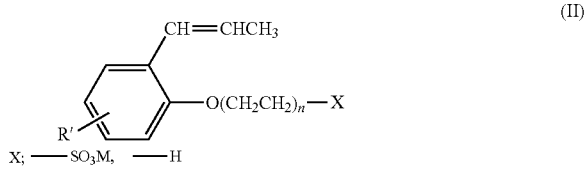

wherein R' represents a hydrogen atom or a hydrocarbon group having from 1 to 12 carbon atoms; n indicates a number falling between 2 and 20; M represents an alkali metal, an ammonium salt, or an alkanolamine.

BEST MODES OF CARRYING OUT THE INVENTION

The ink jet recording ink of the invention (hereinafter sometimes referred to simply as "ink") has a feature that it contains: a colorant of a pigment and/or dye enveloped in a polymer; and water, and contains at least one compound selected from the group consisting of acetylene glycol surfactants, acetylene alcohol surfactants, glycol ethers, and 1,2-alkylene glycols.

Preferably, the ink jet recording ink is so designed that the content of the at least one compound therein, which is selected from the group consisting of acetylene glycol surfactants, acetylene alcohol surfactants, glycol ethers and 1,2-alkylene glycols, falls between 0.5% by weight and 30% by weight. If the content is smaller than 0.5% by weight, the effect of improving penetration readily becomes insufficient and the print quality is hardly improved. On the other hand, if the content is larger than 30% by weight, the ink viscosity increases to make the handling thereof difficult, and a further larger amount addition thereof tends to not show an effect of further improving the print quality. More preferably, the content falls between 1% by weight and 15% by weight.

Particularly preferably, the ink of the invention contains: a colorant of a pigment and/or dye enveloped in a polymer; and water, and contains: at least one compound selected from the group consisting of acetylene glycol surfactants and acetylene alcohol surfactants; and at least one compound selected from the group consisting of glycol ethers and 1,2-alkylene glycols.

Also preferably, the ink jet recording ink contains at most 5% by weight of at least one compound selected from the group consisting of acetylene glycol surfactants and acetylene alcohol surfactants. If the content of the compound is larger than 5% by weight, its effect to improve the print quality has peaked and the ink viscosity increases to make the handling thereof difficult. In addition, the ink readily adheres to the tip of a head and the printed image tends to be disordered. More preferably, the content of the compound falls between 0.1% by weight and 2% by weight.

One preferred embodiment of the ink jet recording ink contains at most 5% by weight of at least one compound selected from the group consisting of acetylene glycol surfactants and acetylene alcohol surfactants, and contains at least 1% by weight of at least one compound selected from glycol ethers and 1,2-alkylene glycols.

The acetylene glycol surfactants and acetylene alcohol surfactants are effective to improve ink penetration even though their amount in ink is small. For this reason, therefore, when the content of the at least one compound selected from the group consisting of acetylene glycol surfactants and acetylene alcohol surfactants in ink is at most 0.5% by weight, it is desirable that the content of the at least one compound selected from the group consisting of glycol ethers and 1,2-alkylene glycols in the ink is at least 1% by weight for ensuring improved print quality.

In case where the ink jet recording ink contains at least 0.5% by weight of the at least one compound selected from the group consisting of acetylene glycol surfactants and acetylene alcohol surfactants, it is desirable that the ratio by weight of the compound to the 1,2-alkylene glycol in the ink is controlled to fall between 1:0 and 1:10 from the viewpoint of print quality. If the addition amount of the 1,2-alkylene glycol in the ink is over 10 times the acetylene glycol surfactant and/or the acetylene alcohol surfactant, not only the effect of improving the print quality tends to have peaked, but also an adverse effect of increasing the ink viscosity tends to occur.

From the viewpoint of the print quality improvement, suitable examples of the at least one compound selected from the group consisting of acetylene glycol surfactants and acetylene alcohol surfactants include at least one compound selected from the group consisting of 2,4-dimethyl-5-hexyn-3-ol, 2,4,7,9-tetramethyl-5-decyne-4,7-diol, 3,6-dimethyl-4-octyne-3,6-diol, and adducts of those 2,4-dimethyl-5-hexyn-3-ol, 2,4,7,9-tetramethyl-5-decyne-4,7-diol and 3,6-dimethyl-4-octyne-3,6-diol each with at most 30, on average number, of ethyleneoxy groups and/or propyleneoxy groups added thereto.

Of the adducts of 2,4-dimethyl-5-hexyn-3-ol, 2,4,7,9-tetramethyl-5-decyne-4,7-diol and 3,6-dimethyl-4-octyne-3,6-diol each with ethyleneoxy groups and/or propyleneoxy groups added thereto, those in which the average number of the ethyleneoxy groups and/or propyleneoxy groups added thereto is larger than 30 tend to cause heavy bubbling of the ink to deteriorate the print quality improving effect. Therefore, the number of the groups in the adducts is preferably at most 30.

In case where the ink contains an acetylene alcohol surfactant, a dissolution promoter may be added thereto. Preferred examples of the dissolution promoter include 1,3-dimethyl-2-imidazolidinone, 2-pyrrolidone, and N-methyl-2-pyrrolidone.

The glycol ethers for use herein include diethylene glycol mono($C_{1-8}$ alkyl)ethers, triethylene glycol mono($C_{1-8}$ alkyl)ethers, propylene glycol mono($C_{1-6}$ alkyl)ethers, and dipropylene glycol mono($C_{1-6}$ alkyl)ethers. These compounds may be used singly or as a mixture of two or more thereof.

Specific examples thereof include ethylene glycol monomethyl ether, ethylene glycol monoethyl ether, ethylene glycol mono-iso-propyl ether, ethylene glycol monobutyl ether, ethylene glycol mono-t-butyl ether, ethylene glycol monomethyl ether acetate, diethylene glycol monomethyl ether (DEGmME), diethylene glycol monoethyl ether (DEGmEE), diethylene glycol monopropyl ether (DEGmPE), diethylene glycol mono-iso-propyl ether, diethylene glycol monobutyl ether (DEGmBE), diethylene glycol mono-t-butyl ether, diethylene glycol monopentyl ether (DEGmPeE), diethylene glycol monohexyl ether (DEGmHE), diethylene glycol monoheptyl ether (DEGmHpE), diethylene glycol monooctyl ether (DEGmOE), triethylene glycol monomethyl ether (TEGmME), triethylene glycol monoethyl ether (TEGmEE), triethylene glycol monopropyl ether (TEGmPE), triethylene glycol monobutyl ether (TEGmBE), triethylene glycol monopentyl ether (TEGmPeE), triethylene glycol monohexyl ether (TEGmHE), triethylene glycol monoheptyl ether (TEGmHpE), triethylene glycol monooctyl ether (TEGmOE), propylene glycol monomethyl ether (PGmME), propylene glycol monoethyl ether (PGmEE), propylene glycol monopropyl ether (PGmPE), propylene glycol mono-iso-propyl ether, propylene glycol monobutyl ether (PGmBE), propylene glycol mono-t-butyl ether, propylene glycol monopentyl ether (PGmPeE), propylene glycol monohexyl ether (PGmHE), dipropylene glycol monomethyl ether (DPGmME), dipropylene glycol monoethyl ether (DPGmEE), dipropylene glycol monopropyl ether (DPGmPE), dipropylene glycol mono-iso-propyl ether, dipropylene glycol monobutyl ether (DPGmBE), dipropylene glycol monopentyl ether (DPGmPeE), and dipropylene glycol monohexyl ether (DPGmHE). Since a larger alkyl group has higher hydrophobicity, the alkyl group therein is preferably methyl, ethyl, propyl or butyl, for ensuring good print quality on plain paper.

Particularly preferably, the glycol ether is di(tri)ethylene glycol monobutyl ether and/or (di)propylene glycol monobutyl ether.

The (di)propylene glycol monobutyl ether is meant to indicate propylene glycol monobutyl ether (PGmBE) (solubility parameter δ=8.9) and/or dipropylene glycol monobutyl ether (DPGmBE) (δ=8.2). The di(tri)ethylene glycol monobutyl ether is meant to indicate diethylene glycol monobutyl ether (DEGmBE) (δ=8.96) and/or triethylene glycol monobutyl ether (TEGmBE) (δ=8.86).

The (di)propylene glycol monobutyl ether content in the ink is preferably at most 10% by weight for imparting satisfactory ink penetration suitable for ink jet recording ink. If it is larger than 10% by weight, not only the effect of improving the print quality tends to have peaked, but also an adverse effect of increasing the ink viscosity tends to occur. In addition, since the solubility in water of the (di)propylene glycol monobutyl ether is not so high, the addition thereof in an amount larger than 10% by weight in the ink tends to necessitate a dissolution promoter. More preferably, the (di)propylene glycol monobutyl ether content of the ink falls between 0.5% by weight and 5% by weight.

In case where the ink jet recording ink contains at least 0.5% by weight of the at least one compound selected from the group consisting of acetylene glycol surfactants and acetylene alcohol surfactants, it is desirable that the ratio by weight of the compound to the (di)propylene glycol monobutyl ether in the ink is controlled to fall between 1:0 and 1:10 for ensuring good print quality. If the amount of the (di)propylene glycol monobutyl ether in the ink is over 10 times the acetylene glycol surfactant and/or the acetylene alcohol surfactant, the effect of improving the print quality tends to have peaked, and a further larger amount addition thereof gives merely a small effect, rather readily causes an adverse effect of increasing the viscosity.

The di(tri)ethylene glycol monobutyl ether content in the ink is preferably at most 20% by weight for imparting satisfactory ink penetration suitable for ink jet recording ink. If it is larger than 20% by weight, not only the effect of improving the print quality tends to have peaked, but also an adverse effect of increasing the viscosity tends to occur. More preferably, the di(tri)ethylene glycol monobutyl ether content of the ink falls between 0.5% by weight and 10% by weight.

In case where the ink jet recording ink contains at least 0.5% by weight of the at least one compound selected from the group consisting of acetylene glycol surfactants and acetylene alcohol surfactants, it is desirable that the ratio by weight of the compound to the di(tri)ethylene glycol monobutyl ether is controlled to fall between 1:0 and 1:10 for ensuring good print quality. The di(tri)ethylene glycol monobutyl ether is effective for improving the solubility of the acetylene glycol surfactants and for improving the print quality. However, if the addition amount thereof is over 10 times the di(tri)ethylene glycol monobutyl ether, those effects tends to have peaked, and the handling as an ink jet recording ink becomes worsened.

The 1,2-alkylene glycols include 1,2-($C_{4-10}$ alkyl)diols.

Preferably, the 1,2-($C_{4-10}$ alkylene) glycol content in the ink is at most 15% by weight for imparting satisfactory ink penetration suitable for ink jet recording ink. Of 1,2-alkylene glycols, those in which the number of the carbon atoms in the alkylene group is 3 or less give only a small effect of improving the penetration. On the other hand, those in which the number of the carbon atoms is more than 10 are poorly soluble in water, and are therefore difficult to be used in water-soluble ink as in the present invention, which necessitates the introduction of a structure added with an oxyethylene chain or a water-soluble group such as sulfonic acid group or phosphoric acid group. Provided that the number of carbon atoms is 4 or more, 1,2-alkylene glycol derivatives having such a water-soluble group introduced thereinto and having at most 30 carbon atoms can be suitably used.

Preferably, the 1,2-($C_{4-10}$ alkylene) glycol content in the ink is at most 15% by weight. If it is larger than 15% by weight, not only the effect of improving the ink penetration tends to have peaked to deteriorate the effect of improving the print quality, but also an adverse effect of increasing the viscosity tends to readily occur.

The 1,2-alkylene glycol includes, for example, 1,2-butanediol (1,2-BD), 1,2-pentanediol (1,2-PeD), 1,2-hexanediol (1,2-HD), 1,2-octanediol, and 1,2-decanediol. Of those 1,2-alkylene glycols, 1,2-pentanediol and/or 1,2-hexanediol are highly effective when used directly as they are.

Particularly preferably, the 1,2-pentanediol content in the ink falls between 3% by weight and 15% by weight. If it is smaller than 3% by weight, the effect of improving the penetration tends to be lowered. Also preferably, the 1,2-hexanediol content in the ink falls between 0.5% by weight and 10% by weight. If it is smaller than 0.5% by weight, the effect of improving the penetration tends to be lowered.

Preferably, the ink jet recording ink of the invention further contains at least one compound selected from the group consisting of polyalcohols and compounds of formula (1) set forth below, thereby the dispersion stability and ejection stability of the ink can be improved.

$$R\text{-EO}n\text{-PO}m\text{-M} \tag{1}$$

wherein R represents a $C_{4-12}$ alkanol, cycloalkanol, phenol and/or naphthol group, which is linear and/or another isomer; EO represents an ethyleneoxy group; PO represents a propyleneoxy group; n and m each indicate the mean value of the repetitive units in the whole system; the indication of EO and PO merely represent the presence thereof in the molecule, not limiting their order; M represents a hydrogen atom, a sulfonate group, a phosphate group and/or a borate group, and the counter ion of the sulfonate group, the phosphate group and/or the borate group is a hydrogen atom, an alkali metal, an inorganic base and/or an organic amine.

With regard to M of formula (1) above, the alkali metal includes, for example, lithium, sodium, and potassium; the inorganic base may be ammonia; and the organic amine includes, for example, monoethanolamine, diethanolamine, triethanolamine, monoisopropanolamine, and mono-s-butanolamine.

In formula (1), preferably, n falls between 0 and 10 and m falls between 1 and 5. Since m and n each indicate the mean value in the ink system, it is presumed that the molecules of formula (1) have a molecular weight distribution. However, they may be monodispersed.

Starting from alcohols, the compounds of formula (1) are prepared by adding a target amount of ethylene oxide or propylene oxide to the alcohol in an alkali or the like atmosphere, or by adding thereto any of (mono, di, tri, . . . )propylene glycol or (mono, di, tri, . . . )ethylene glycol through dehydration. In general, therefore, the compounds are not monodispersed, but there is no problem in making it monodispersed through an additional process such as distillation or the like for use herein. However, the residual alcohol content in the ink is preferably at most 1% by weight. If larger than 1% by weight, it involves some problems such that the ink wets the nozzle surface of a head to readily deteriorate the print quality and that a smell of alcohol is generated.

Preferably, the mean molecular weight of the compounds of formula (1) is at most 2000. If their mean molecular weight is larger than 2000, adverse effects such as deterioration in penetration effect and an increase in the ink viscosity are readily caused. More preferably, the mean molecular weight is at most 1000, further preferably at most 500.

In case where the ink jet recording ink contains at most 5% by weight of the acetylene glycol surfactant, the ratio of the compound of formula (1) to the acetylene glycol surfactant preferably falls between 1:0.1 and 1:3 from the view point of print quality. Examples of the acetylene glycol surfactant include Surfynol series manufactured by Air Products (USA) and Olfin series manufactured by Nisshin Chemical Industry.

Preferably, the addition amount of the compound of formula (1) in the ink falls between 0.5% by weight and 30% by weight.

In case where the ink jet recording ink contains at most 10% by weight of (di)propylene monoglycol butyl ether as the glycol ethers, the ratio by weight of the compound of formula (1) to the glycol ether preferably falls between 1:0.1 and 1:10.

In case where the ink jet recording ink contains at most 20% by weight of di(tri)ethylene glycol monobutyl ether as the glycol ethers, the ratio by weight of the compound of formula (1) to the glycol ether preferably falls between 1:0.1 and 1:10.

Also preferably, the ratio by weight of the compound of formula (1) to the 1,2-alkylene glycol in the ink jet recording ink falls between 1:0.1 and 1:10.

Also preferably, the polyalcohols are $C_{3-12}$ alkyldiols and/or $C_{3-12}$ alkyltriols. Specifically, for example 1,2-propanediol (1,2-PD), 1,3-propanediol (1,3-PD), 1,3-butanediol (1,3-BD), 1,4-butanediol (1,4-BD), 2,3-pentanediol (2,3-PeD), 1,5-pentanediol (1,5-PeD), 2-methyl-2,4-pentanediol, 1,6-hexanediol, 2-ethyl-1,3-hexanediol, and 1,2,6-hexanetriol are on the market.

Also preferably, the ink jet recording ink of the invention further contains a saccharide and glycerin. The use of the saccharide and glycerin, which are soluble in water and have an effect of water retention, in combination, an effect of suppressing the evaporation of water is enhanced, to thereby prevent the viscosity increase or solidification of the ink due to drying up at the nozzle tips of a head. Accordingly, clogging with the ink can be surely prevented (that is, the clogging reliability can be improved), and satisfactory long-term ejection stability can be ensured.

The saccharide for use in the invention includes monosaccharides, oligosaccharides, polysaccharides and glycosides.

Including monosaccharides, oligosaccharides, polysaccharides and glycosides, the saccharide may be in any form of aldehydes, ketones or glycoalcohols. Specifically, examples thereof include erythrose, threose, erythrulose, erythritol, arabinose, xylose, ribulose, xylulose, xylitol, glucose, mannose, galactose, talose, fructose, psicose, tagatose, sorbose, sorbitol, mannitol, trehalose, kojibiose, nigrose, maltose, isomaltose, isotrehalose, sophorose, laminaribiose, cellobiose, gentibiose, multidextrin, linear oligosaccharides, isomaltooligosaccharides, isomerized saccharides, gentioligosaccharides, polydextrose, maltitol, fructooligosaccharides, palatinose, palatinose oligosaccharides, emulsified oligosaccharides, lactitol, lactulose, lactosucrose, galactooligosaccharides, soybean oligosaccharides, xylooligosaccharides, chitin-chitosan oligosaccharides, pectin oligosaccharides, agarooligosaccharides, inulooligosaccharides, paranichit, reduced starch syrup, carrageenan, alginic acid, pullulan, xanthan gum, gellan gum, curdlan, polydextrose and polydextrose. Of these saccharides, those having a large molecular weight increase the viscosity of the ink, and hence their amount to be added is limited. Therefore, monosaccharides and disaccharides having a relatively small molecular weight are preferred. Addition of the polysaccharide in a large amount is not preferred since it increases the ink viscosity.

Accordingly, at least 80% by weight of the saccharide added to the ink preferably comprises aldose, ketose and/or glycoalcohol each having at most 12 carbon atoms.

Particularly preferred examples of the saccharide for use in the invention include glucose, mannose, maltitol, fructose, ribose, xylose, arabinose, lactose, galactose, aldonic acid, glucitose, maltose, cellobiose, sucrose, trehalose, erythritol, maltotriose, isomaltooligosaccharides, mannitol, sorbitol, fructose, and xylitol. In the invention, the addition amount of the saccharide preferably falls between 0.05% by weight and 30% by weight, more preferably between 3% by weight and 20% by weight. If the amount of the saccharide is smaller than 0.05% by weight, the effect of recovering from the phenomenon that the ink is dried up at the nozzle tip portion of a head to clog the nozzle, i.e., a so-called clogging phenomenon, is small. On the other hand, if larger than 30% by weight, the viscosity of the ink is increased to cause a problem in the ejection stability, such as the occurrence of an ejection defect, etc., thus not being preferred.

Preferably, the ink jet recording ink of the invention contains glycerin, and at least one member selected from saccharides and compounds of a formula (2) set forth below. Particularly since the color development of the images can be improved thereby, the print quality can be further improved. In addition, the ink is more surely prevented from clogging head nozzles (the clogging reliability can be improved).

$$A\text{-}(EP)n \tag{2}$$

wherein A represents a glycerin skeleton; EP represents an ethyleneoxy group (terminal OH) and/or a propyleneoxy group (terminal OH), but may be an OH group; and n indicates the repetitive units.

In formula (2), n preferably falls between 0.5 and 10. If n is smaller than 0.5, the effect of improving print quality is small and, on the other hand, if larger than 10, an adverse effect such as viscosity increase is caused. However, in the case where the compound is used in combination with the saccharide described above, n in formula (2) is not limited to the range, though depending on the addition amount thereof. For example, n may be smaller than 0.5, or may be larger than 10 not exceeding 30.

Preferably, the repetitive units (EP) indicated with n in formula (2) are ethyleneoxy and/or propyleneoxy groups, and the compounds preferably have a molecular weight distribution. (EP) is preferably ethyleneoxy and/or propyleneoxy. Particularly, when the ink is desired to have a low viscosity, ethyleneoxy is preferably used, whereas when the ink is desired to have a relatively high viscosity, propyleneoxy is preferably used. The amounts thereof can be appropriately selected. These additives are preferred since they improve the ejection stability of the ink.

Preferably, the mean molecular weight of the compound of formula (2) is at most 1000. If the mean molecular weight is larger than 1000, it becomes hard to surely improve the clogging reliability. Regarding the degree of the molecular weight distribution, it is preferred that the ratio of weight-average molecular weight (Mw)/number-average molecular weight (Mn) is at least 1.5, but this does not deny the ratio of smaller than 1.5.

Preferably, the dye for use in the invention is insoluble or hardly soluble in water. For use in the colorant in the present invention, examples thereof include, for example, oil-soluble dyes, basic dyes, disperse dyes, vat dyes, sulfide dyes, organic solvent-soluble dyes, and reactive dyes.

The pigment for use in the invention is not particularly limited, and any of inorganic dyes and organic dyes can be used. The inorganic dyes include, for example, metallic dyes such as copper oxides, iron oxides, and titanium oxides; and carbon blacks such as furnace black, lamp black, acetylene black, and channel black. The organic pigments include, for example, azo pigments (including azo lakes, insoluble azo pigments, condensed azo pigments, chelate azo pigments), polycyclic pigments (e.g., phthalocyanine pigments, perylene pigments, perinone pigments, anthraquinone pigments, quinacridone pigments, dioxane pigments, thioindigo pigments, isoindolinone pigments, quinofuranone pigments), dye chelates (e.g., basic dye chelates, acid dye chelates), nitro pigments, nitroso pigments, and aniline black.

As the pigment for black ink, C.I. Pigment Black 11 which is an iron oxide; C.I. Pigment Black 7 which is a carbon black; and C.I. Pigment Black 1 which is an aniline black can be mentioned. More specifically, the following carbon blacks can be exemplified: Mitsubishi Chemical's No. 2300, No. 900, MCF88, No. 33, No. 40, No. 45, No. 52, MA7, MA8, MA100, No. 2200B; Columbia's Raven 5750, Raven 5250, Raven 5000, Raven 3500, Raven 1255, Raven 700; Cabot's Regal 400$, Regal 330R, Regal 660R, Mogul L, Monarch 700, Monarch 800, Monarch 880, Monarch 900, Monarch 1000, Monarch 1100, Monarch 1300, Monarch 1400; Dexxa's Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4.

Examples of the pigment for yellow ink include C.I. Pigment Yellow 1 (Fast Yellow G), 2, 3, 12 (Disazo Yellow AAA), 13, 14, 16, 17, 24, 34, 35, 37, 42 (yellow iron oxide), 53, 55, 73, 74, 75, 81, 83 (Disazo Yellow HR), 93, 95, 97, 98, 100, 101, 104, 108, 109, 110, 114, 117, 120, 128, 129, 138, 151, 153 and 154.

Examples of the pigment for magenta ink include C.I. Pigment Red 1, 2, 3, 5, 7. 12, 17, 22 (Brilliant Fast Scarlet Red), 23, 31, 38, 48 (Ca), 48 (Mn), 48:2 (Permanent Red 2B (Ba)), 48:2 (Permanent Red 2B (Ca)), 48:3 (Permanent Red 2B (Sr)), 48:3 (Permanent Red 2B (Mn)); 49:1, 52:2, 53:1, 57)Ca), 57:1 (Brilliant Carmine 6B), 60:1, 63:1, 63:2, 64:1, 81 (Rhodamine 6G Lake), 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 209 and 219.

Examples of the pigment for cyan ink include C.I. Pigment Blue 1, 2, 3, 15 (Phthalocyanine Blue R), 15:1, 15:2, 15:3 (Phthalocyanine Blue G), 15:4, 15:6 (Phthalocyanine Blue E), 15:34, 16, 17:1, 22, 56, 60 and 63, C.I. Vat Blue 4, and C.I. Vat Blue 60.

Examples of the pigment for green ink include C.I. Pigment Green 1, 4, 7, 8, 10, 17, 18 and 36.

With regard to the particle size of the pigment, pigments comprising particles of at most 0.5 μm are preferred, and pigments comprising particles falling between 0.01 and 0.15 μm are more preferred.

The addition amount of the colorant of such pigment and/or dye enveloped in a polymer preferably falls between 0.5% by weight and 30% by weight, more preferably between 1.0% by weight and 12% by weight. If the addition amount is smaller than 0.5% by weight, printed density tends to become hardly ensued. On the other hand, if larger than 30% by weight, there is a tendency that a viscosity increase of the ink or a structural viscosity in the viscosity characteristics is caused to thereby deteriorate the ejection stability.

In the colorant of the pigment and/or dye enveloped in a polymer, the content of the polymer is preferably at least 10% by weight, more preferably at least 20% by weight, still more preferably at least 30% by weight with respect to the whole amount of the colorant. When the polymer content is not smaller than 10% by weight, in particular, the property of recovering from nozzle clogging becomes good. In case of color inks (e.g., cyan ink, magenta ink, yellow ink, etc.), the color transparency through transparent sheets such as OHP sheet becomes further good.

When the polymer content in the colorant is smaller than 10% by weight, the above-mentioned acetylene alcohol surfactants, acetylene glycol surfactants, glycol ethers, polyalcohols and substances of formula (2) may partially swell the polymer. In such a case, the polymer readily peels off from the pigment, sometime resulting in an increase viscosity of the ink.

The colorant of the pigment and/or dye enveloped in a polymer is described in more detail below. The term "enveloping" as used in the present invention means that the pigment and/or dye for the colorant is completely enveloped in a polymer.

The polymer that envelops the pigment and/or dye therein preferably comprises, as a main component, at least one member selected from the group consisting of vinyl polymers such as polyacrylates, styrene-acrylic acid copolymers, polystyrenes; and polyesters, polyamides, polyimides, silicon-containing polymers and sulfur-containing polymers.

If an ordinary pigment (not enveloped in a polymer) is dispersed in water by a dispersant, and a compound selected from acetylene glycol surfactants, acetylene alcohol surfactants, glycol ethers and 1,2-alkylene glycols is added to the aqueous dispersion, then the dispersant readily drops off from the pigment surface, and the compound may adhere to the pigment in place of the dropped dispersant. As a result, a phenomenon that the dispersant having dropped off from the pigment disturbs the printing readily occurs. In contrast, where the above-described polymer is used for enveloping the pigment and/or dye therein, the polymer can stably envelop the colorant therein, making it difficult to cause the phenomenon mentioned above. Therefore, the use of the colorant of the pigment and/or dye enveloped in the polymer as a colorant of an ink composition makes it possible to attain stable ejection and satisfactory images.

In one particularly preferred embodiment of the invention, suitable examples of the polymer include those prepared by polymerizable monomers or oligomers having a double bond of an acryloyl, methacryloyl, vinyl or allyl group through ordinary polymerization using a polymerization initiator.

The monomers include, for example, styrene, tetrahydrofurfuryl acrylate, butyl methacrylate, ($\alpha$, 2, 3 or 4)-alkylstyrenes, ($\alpha$, 2, 3 or 4)-alkoxystyrenes, 3,4-dimethylstyrene, $\alpha$-phenylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth) acrylate, propyl (meth)acrylate, ethylhexyl (meth)acrylate, other alkyl (meth)acrylates, methoxydiethylene glycol (meth)acrylate, ethoxy, propoxy or butoxy-having diethylene glycol or polyethylene glycol (meth)acrylates, cyclohexyl (meth)acrylate, benzyl (meth)acrylate, phenoxyethyl (meth)acrylate, isobornyl (meth)acrylate, hydroxyalkyl (meth)acrylates, fluorine, chlorine or bromine-containing (meth)acrylates, (meth)acrylamides, maleic acid amides; and for additionally introducing a crosslinked structure to monofunctional (meth)acrylic acids, examples thereof include acryl or methacryl group-having compounds such as (mono, di, tri, tetra, polyethylene glycol di(meth)acrylates, 1,4-butanediol, 1,5-pentanediol, 1,6-hexanediol, 1,8-octanediol and 1,10-decanediol (meth)acrylates, trimethylolpropane tri(meth)acrylate, glycerin (di, tri)(meth)acrylates, bisphenol A or bisphenol F-ethylene oxide adduct di(meth) acrylates, neopentyl glycol di(meth)acrylate, pentaerythritol tetra(meth)acrylate and dipentaerythritol hexa(meth)acrylate.

The polymerization initiator may be any ordinary one generally used in radical polymerization, including, for example, potassium persulfate, ammonium persulfate, as well as hydrogen persulfate, azobisisobutyronitrile, benzoyl peroxide, dibutyl peroxide, peracetic acid, cumemehydroperoxide, t-butylhydroxyperoxide, paramenthanehydroxyperoxide. However, preferred for use herein are water-soluble polymerization initiators.

Examples of the method for enveloping the pigment and/or dye in such a polymer include phase conversion emulsification, acid deposition and forced emulsification.

One known example of the phase conversion emulsification comprises: dissolving a self-water-dispersible resin (self-water-dispersible polymer), in which a part of the acid group is neutralized with a base, in an organic solvent; dispersing or dissolving a pigment and/or dye in the resulting solution to give a colorant resin solution; and mixing it with an aqueous medium essentially comprising water, to thereby undergo phase conversion emulsification. Upon the phase conversion emulsification, colorant particles in which the pigment and/or dye is enveloped in the resin are generated. Therefore, by subsequently removing the organic solvent from the aqueous medium, a colorant enveloping the pigment and/or dye can be suitably obtained. Preferred examples of the self-water-dispersible resin include copolymers of at least one monomer selected from the group consisting of styrene, substituted styrenes and (meth)acrylates, having an acid value of from 20 to 200 KOH mg/g, with (meth)acrylic acid.

Another known example of the phase conversion emulsification comprises adding a polyester to a ketone solvent together with the pigment and/or dye, adding a neutralizing agent to the ketone solution to thereby ionize the carboxyl group in the polyester, and adding water thereto to undergo phase conversion emulsification. By evaporating away the ketone solvent from the mixed solvent, and a colorant enveloping the pigment and/or dye in a polyester can be suitably obtained.

One example of the acid deposition process comprises adding an acidic compound to an aqueous dispersion of the pigment and/or dye finely dispersed by a "resin (polymer) having a carboxyl group neutralized with a basic compound" to make the pH of the aqueous dispersion neutral or acidic, thereby making the resin hydrophobic so that the pigment can be firmly fixed onto the resin. By subsequently adding a basic compound to the aqueous dispersion so as to neutralize again the carboxyl group in the resin, an aqueous dispersion of a colorant enveloping the pigment and/or dye in a resin (polymer) can be suitably obtained.

One known example of the forced emulsification process comprises adding a vinyl polymer having a silicon macromer as a copolymerizable component, and the pigment and/or dye to an organic solvent, adding a neutralizing agent to the resulting solution or dispersion to thereby ionize the salt-forming group in the vinyl polymer, and adding water thereto to emulsify it. By subsequently evaporating away the organic solvent, a colorant enveloping the pigment and/or dye in the polymer can be suitably obtained.

The polymer that envelops pigment and/or dye therein is typically a copolymer of a polymerizable group-having dispersant and a copolymerizable monomer, which will be described in detail below. The colorant of the pigment and/or dye enveloped in such a copolymer of a polymerizable group-having dispersant and a copolymerizable monomer can be suitably obtained by dispersing the pigment and/or dye in water by a polymerizable group-having dispersant, followed by adding a copolymerizable monomer and a polymerization initiator thereto to undergo polymerization.

It is preferred that the particles in the ink jet recording ink have a relatively uniform particle size from the views points of clogging and ejection stability. Therefore, the colorant of the pigment and/or dye enveloped in the polymer is preferably prepared through emulsion polymerization.

In case where a pigment is used, the pigment colorant enveloped in a polymer is preferably prepared by dispersing the pigment in water by a polymerizable group-having dispersant followed by conducting emulsion polymerization in water using a monomer copolymerizable with the dispersant (copolymerizable monomer) and a polymerization initiator.

The colorant of the dye enveloped in a polymer is preferably prepared by directly dissolving a water-insoluble or hardly water-soluble dye such as oil-soluble dye, disperse dye, vat dye or reactive dye in a monomer, followed by conducting emulsion polymerization.

The emulsion polymerization may be effected in any ordinary manner, and the polymerization is proceeded with free radicals that are formed through thermal decomposition of a water-soluble polymerization initiator in the presence of an emulsifier.

The copolymerizable monomer is preferably a compound having an unsaturated group in its structure. The unsaturated group is preferably selected from the group consisting of a vinyl group, an allyl group, an acryloyl group, a methacryloyl group, a propenyl group, an acrylamido group, a vinylamido group, a vinylidene group and a vinyl group.

More specifically, the copolymerizable monomer is may be any of those having high copolymerizability with a polymerizable group-having dispersant, and commonly used radically polymerizable monomers can be used therefor. Examples of the radically polymerizable monomer include those containing, in its molecule, at least one radically polymerizable unsaturated hydrocarbon group such as vinyl, allyl, acryloyl or methacryloyl, propenyl, acrylamido, vinylamido, vinylidene and vinylene groups. Specific examples of the radically polymerizable monomer include styrene and styrene derivatives such as methylstyrene, dimethylstyrene, chlorostyrene, dichlorostyrene, bromostyrene, p-chloromethylstyrene, divinylbenzene; acrylic acid and mono-functional acrylates such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate; methacrylic acid and monofunctional methacrylates such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate; allyl compounds such as aminoethyl acrylate, aminopropyl acrylate, methylaminoethyl acrylate, methylaminopropyl acrylate, ethylaminoethyl acrylate, ethylaminopropyl acrylate, acrylic aminoethylamide, acrylic aminopropylamide, acrylic methylaminoethylamide, acrylic methylaminopropylamide, acrylic ethylaminoethylamide, acrylic ethylaminopropylamide, methacrylamide, aminoethyl methacrylate, aminopropyl methacrylate, methylaminoethyl methacrylate, methylaminopropyl methacrylate, ethylaminoethyl methacrylate, ethylaminopropyl methacrylate, methacrylic aminoethylamide, methacrylic aminopropylamide, methacrylic methylaminoethylamide, methacrylic methylaminopropylamide, methacrylic ethylaminoethylamide, methacrylic ethylaminopropylamide, hydroxymethyl acrylate, hydroxymethyl methacrylate, N-methylolacrylamide, allyl alcohol, allylbenzene, allyl 3-cyclohexanepropionate, 1-allyl-3,4-dimethoxybenzene, allyl phenoxyacetate, allyl phenylacetate, allylcyclohexane, and allyl esters of polycarboxylic acids; fumaric acid, maleic acid, itaconic acid, and their esters; and other radically polymerizable group-having monomers such as acrylonitrile, methacrylonitrile, maleic anhydride, N-substituted maleimides, and cyclic olefins.

In particular, monomers having a hydrophilic group is preferably used as the copolymerizable monomer. Examples of a carboxyl group-having monomer include, for example, acrylic acid, methacrylic acid, crotonic acid, ethacrylic acid, propylacrylic acid, isopropylacrylic acid, 2-acryloyloxyethylsuccinic acid, 2-acryloyloxyethylphthalic acid, 2-methacryloyloxyethylsuccinic acid, 2-methacryloyloxyethylphthalic acid, itaconic acid, fumaric acid, and maleic acid. Of these, preferred are acrylic acid and methacrylic acid. Examples of a sulfonic acid group-having monomer include, for example, 4-methylsulfonic acid and its salts, vinylsulfonic acid and its salts, sulfoethyl acrylate and its salts, sulfoethyl methacrylate and its salts, sulfoalkyl acrylates and their salts, sulfoalkyl methacrylates and their salts, sulfopropyl acrylate and its salts, sulfopropyl methacrylate and its salts, sulfoaryl acrylates and their salts, sulfoaryl methacrylates and their salts, butylacrylamidosulfonic acid and its salts, 2-acrylamido-2-methylpropanesulfonic acid and its salts. Examples of a hydroxyl group-having monomer include, for example, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, polyethylene glycol 400 acrylate, polyethylene glycol 400 methacrylate, N-hydroxyethyl acrylate, and N-hydroxyethyl methacrylate. Examples of an amido group-having monomer include, for example, acrylamide, methacrylamide, acrylic aminopropylamide, methacrylic aminoproylamide, acrylic aminoethylamide, methacrylic aminoethylamide, and vinylpyrrolidone. Examples of a phosphone group-having monomer include phosphoethyl methacrylate.

Polymerizable surfactants of formula (I) (mentioned in detail below) that are preferred for the polymerizable group-having dispersant are monomers of high electron donating ability. Therefore, the copolymerizable monomers to be used are preferably those of high electron acceptability. Examples of the copolymerizable monomer of high electron acceptability include acrylonitrile, fumaronitrile, fumaric diesters such as dibutyl fumarate; maleic diesters such as dibutyl maleate; maleimides such as N-phenylmaleimide; and vinylidene cyanide. These may be used singly or as a mixture of two of more thereof.

The addition amount of the copolymerizable monomer preferably falls between around 2 and 15 times, more preferably between around 3 and 12 times, in terms of molar ratio with respect to the polymerizable group-having dispersant. With a molar ratio of at least 2 times the dispersant, the encapsulated pigment particles formed have excellent dispersion stability in an aqueous medium. With a molar ratio of at most 15 times the dispersant, the monomer can be sufficiently dissolved in the adsorbing layer of the polymerizable group-having dispersant to suppress the formation of water-insoluble polymers and the relative reduction in the amount of ionic repulsive groups, thereby making it possible to enhance the dispersion stability.

Suitable examples of the polymerization initiator to be used in preparing the copolymer of the polymerizable group-having dispersant and the copolymerizable monomer include potassium persulfate, ammonium persulfate, sodium persulfate, 2,2-azobis(2-methylpropionamidine) dihydrochloride, and 4,4-azobis(4-cyanovaleric acid).

In the emulsion polymerization, a chain transfer agent can be also used. Examples thereof include t-dodecylmercaptan, as well as n-dodecylmercaptan, n-octylmercaptan, xanthogens such as dimethylxanthogen disulfide, diisobutylxanthogen disulfide; and dipentene, indene, 1,4-cyclohexadiene, dihydrofuran, and xanthene.

For dispersing the pigment and/or dye in water, for example, employable are dispersion methods with ultrasonic waves, or in bead mills, sand mills or roll mills. In particular, in the case where a pigment is used, the use of a disperser such as bead mill, sand mill or roll mill is preferred, since the pigment colorant can be formed into fine particles thereby.

The polymer that envelops the pigment and/or dye therein include a polymer having a crosslinked structure.

The colorant of the pigment and/or dye enveloped in such a crosslinked structure-having polymer for use in the invention may be prepared through phase conversion emulsification of the pigment and/or dye with a polymer having a crosslinking reactive group and a hydrophilic group to thereby make the pigment and/or dye enveloped in the polymer, followed by crosslinking reaction with a crosslinking agent.

Specifically, the "pigment and/or dye", the polymer having a crosslinking reactive group and a hydrophilic group, and a crosslinking agent are added to an organic solvent to prepare a solution or dispersion, to which are added a neutralizing agent and optionally a surfactant (this surfactant is preferably a polymerizable surfactant described in detail below), to obtain the resulting mixture as an organic solvent phase. While either of the organic solvent phase or water is stirred, water is put into the organic solvent phase or the organic solvent phase is put into water to undergo phase conversion emulsification, thereby enveloping the "pigment and/or dye" in the organic phase that comprises the polymer having a crosslinking reactive group and a hydrophilic group and the crosslinking agent. In this process, a catalyst to initiate the crosslinking reaction may be added to either the organic solvent phase or the aqueous phase. When the catalyst is soluble in oil, it is preferably added to the organic solvent phase; but when soluble in water, it is preferably added to the aqueous phase. Next, the polymer is crosslinked at a predetermined temperature, at which crosslinking reaction takes place, for a predetermined period of time, and then the organic solvent is evaporated away by a general method of, for example, ordinary distillation or reduced pressure distillation, to thereby obtain an aqueous dispersion in which the colorant of a coloring material enveloped in a polymer having a crosslinked structure is dispersed.

The polymer having a crosslinking reactive group and a hydrophilic group is not particularly limited so long as it has at least a crosslinking reactive group and a hydrophilic group. Examples thereof include, for example, vinyl polymers, polyacrylates, styrene-acrylic acid copolymers, polyesters, polyamides, polyimides, polyurethanes, amino polymers, silicon-containing polymers, sulfur-containing polymers, fluorine-containing polymers, epoxy resins and their mixtures, having a crosslinking reactive group and a hydrophilic group.

The hydrophilic group of the polymer having a crosslinking reactive group and a hydrophilic group includes a sulfone group, a sulfonic acid group, a carboxyl group, a hydroxyl group and their salts and quaternary ammonium salts, and is preferably selected therefrom.

The crosslinking reactive group of the polymer having a crosslinking reactive group and a hydrophilic group includes a glycidyl group, an isocyanate group, a hydroxyl group, a carboxyl group and an unsaturated hydrocarbon group, and is preferably selected therefrom.

The unsaturated hydrocarbon group of the polymer having a crosslinking reactive group and a hydrophilic group includes a vinyl group, an allyl group, an acryloyl group, a methacryloyl group, a propenyl group, a vinylidene group and a vinylene group, and is preferably selected therefrom.

In one preferred embodiment of the invention, vinyl polymers, poly(meth)acrylates, and styrene-(meth)acrylic acid copolymers are used for the polymer having a crosslinking reactive group and a hydrophilic group. These polymers may be prepared by polymerizing: a (meth)acrylate monomer having at least one hydrophilic group selected from the group consisting of a sulfone group, a sulfonic acid group, a carboxyl group, a hydroxyl group and their salts and quaternary ammonium salts; a (meth)acrylate monomer having a crosslinking reactive group such as a glycidyl group or an isocyanate group; and a monomer capable of copolymerizable with these monomers, in a mode of solution polymerization in an solvent such as an aliphatic hydrocarbon solvent, an aromatic hydrocarbon solvent, an ester solvent, a ketone solvent, an alcohol solvent or an aprotic solvent, in the presence of a polymerization initiator of, for example, peroxides such as t-butyl peroxybenzoate, di-t-butyl peroxide, cumene perhydroxide, acetyl peroxide, benzoyl peroxide or lauroyl peroxide, or azo compounds such as azobisisobutyronitrile, azobis-2,4-dimethylvaleronitrile or azobiscyclohexanecarbonitrile. Upon the solution polymerization, optionally added is a polymer chain transfer agent, examples of which includes, for example, mercaptans such as octylmercaptan, n-dodecylmercaptan, t-dodecylmercaptan, n-hexadecylmercaptan, n-tetradecylmercaptan, t-tetradecylmercaptan; xanthogen disulfides such as dimethylxanthogen disulfide, diethylxanthogen disulfide, diisopropylxanthogen disulfide; thiuram disulfides such as tetramethylthiuram disulfide, tetraethylthiuram disulfide, tetrabutylthiuram disulfide; halogenohydrocarbons such as carbon tetrachloride, ethylene bromide; hydrocarbons such as pentaphenylethane; acrolein, methacrolein, allyl alcohol, 2-ethylhexyl thioglycolate, terbinolene, α-terpinene, γ-terpinene, dipentene, α-methylstyrene dimer (preferably containing at least 50 parts by weight of 2,4-diphenyl-4-methyl-1-pentene); unsaturated cyclic hydrocarbon compounds such as 9,10-dihydroanthracene, 1,4-dihydronaphthalene, indene, 1,4-cyclohexadiene; unsaturated heterocyclic compounds such as xanthene, 2,5-dihydrofuran. These may be used singly or as a mixture of two or more thereof.

The polymerization may be effected generally at 30 to 100° C., preferably at 50 to 80° C., for 1 to 10 hours. The polymerization condition may be appropriately determined, depending on the kinds of the radical polymerization initiator, monomers and solvent to be used. Preferably, the polymerization is effected in an inert gas atmosphere such as nitrogen. After thus polymerized, the copolymer may be isolated from the reaction mixture in any known method of, for example, reprecipitation or solvent evaporation. The thus-obtained copolymer may be purified by removing the unreacted monomer and the like through repeated reprecipitation, membrane separation, chromatography or extraction.

The weight-average molecular weight of the thus-obtained polymer preferably falls between 1000 and 50000, more preferably between 1000 and 30000, from the view point of easiness of enveloping the coloring material and easiness of crosslinking.

Of the hydrophilic group-having (meth)acrylate monomers, examples of a carboxyl group-having acrylic monomer include, for example, acrylic acid, methacrylic acid, crotonic acid, ethacrylic acid, propylacrylic acid, isopropylacrylic acid, itaconic acid, and fumaric acid. Of those, preferred are acrylic acid and methacrylic acid. Examples of a sulfonic acid group-having (meth)acrylic monomer include, for example, sulfoethyl methacrylate, butylacrylamidosulfonic acid, and 2-acrylamido-2-methylpropanesulfonic acid. Examples of a phosphone group-having (meth)acrylic monomer include, for example, phosphoethyl methacrylate.

Examples of a crosslinking reactive group-having (meth)acrylate monomer include, for example, blocked isocyanate group-having polymerizable monomers, epoxy group-having monomers, and 1,3-dioxolan-2-on-4-yl group-having monomers. The blocked isocyanate group-having polymerizable monomers may be readily prepared, for example, by reacting an isocyanate group-having polymerizable monomer such as 2-methacryloyloxyethyl isocyanate with a known blocking agent in a mode of addition reaction. Alternatively, they may also be prepared by reacting a vinyl copolymer having a hydroxyl group and a carboxyl group with a compound having an isocyanate group and a blocked isocyanate group in a mode of addition reaction. Examples of the epoxy group-having monomer include, for example, glycidyl (meth)acrylate, and alicyclic epoxy group-having (meth)acrylate monomers. Examples of the 1,3-dioxolan-2-on-4-yl group-having monomer include, for example, 1,3-dioxolan-2-on-4-ylmethyl (meth)acrylate, and 1,3-dioxolan-2-on-4-ylmethyl vinyl ether.

The monomer copolymerizable with these monomers includes, for example, (meth)acrylates such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate, benzyl methacrylate; adducts of oil-fatty acids and oxirane structure-having (meth)acrylate monomers, such as adduct of stearic acid and glycidyl methacrylate; adducts of oxirane compounds with an alkyl group having at least 3 carbon atoms, and (meth)acrylic acid; styrene monomers such as styrene, α-methylstyrene, o-methylstyrene, m-methylstyrene, p-methylstyrene, p-tert-butylstyrene; itaconates such as benzyl itaconate, ethyl itaconate; maleates such as dimethyl maleate, diethyl maleate; fumarates such as dimethyl fumarate, diethyl fumarate; and acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, acrylic aminoethylamide, acrylic aminopropylamide, acrylic methylaminoethylamide, acrylic methylaminopropylamide, acrylic ethylaminoethylamide, acrylic ethylaminopropylamide, methacrylic amide, aminoethyl methacrylate, aminopropyl methacrylate, methylaminoethyl methacrylate, methylaminopropyl methacrylate, ethylaminoethyl methacrylate, ethylaminopropyl methacrylate, methacrylic aminoethylamide, methacrylic aminopropylamide, methacrylic methylaminoethylamide, methacrylic methylaminopropylamide, methacrylic ethylaminoethylamide, methacrylic ethylaminopropylamide, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylolacrylamide, allyl alcohol.

As the crosslinking agent, those which react with the crosslinking reactive group of the polymer having a crosslinking reactive group and a hydrophilic group to undergo crosslinking and which have, in its molecular structure, at least two functional groups capable of reacting with the crosslinking reactive group of the polymer can be used. In case where the crosslinking reactive group of the polymer is a glycidyl group, preferably used is a compound having at least two functional groups of at least one kind selected from an amino group, a carboxyl group, a hydroxyl group, an N-methylol group and an N-methylol ether group. Examples thereof include, for example, aliphatic amines such as ethyleneamines, N-aminoethylpiperazine, metaxylenediamine, 1,3-bis(aminomethyl)cyclohexane, polyamides; cycloaliphatic amines such as paramenthanediamine, mesophoronediamine, bis(4-amino-3-methylcyclohexyl)methane, 2-ethyl-4-methylimidazole; aromatic amines such as meta-phenylenediamine, 4,4'-diaminodiphenylamine, 4,4'-diaminodiphenylsulfone, dicyanediamide; and acid anhydrides such as phthalic anhydride, pyromellitic anhydride, nadic anhydride. In case where the crosslinking reactive group of the polymer having a crosslinking reactive group and a hydrophilic group is an isocyanate group, preferably used is a compound having at least two functional groups of at least one kind selected from a carboxyl group, a hydroxyl group, an amino group and a mercapto group. Examples thereof include, for example, polyols such as polyether polyols, polytetramethylene ether glycols, alkyleneoxide copolyols, epoxy resin-modified polyols, lactone-polyester polyols, condensed polyester polyols, polycarbonate diols, acrylic polyols, polybutadiene polyols, phosphorus-containing polyols, halogen-containing polyols; polyamines such as polyether polyamines, polytetramethylene-ether diamines, alkyleneoxide copolyamines, epoxy-modified polyamines, condensed polyester polyamines, polycarbonate polyamines, acrylic polyamines; and polythiols such as polyether polythiols, polytetramethylene-ether diols, alkyleneoxide copolythiols, epoxy resin-modified polythiols, lactone-polyester polythiols, condensed polyester polythiols, polycarbonate dithiols, acrylic polythiols, polybutadiene polythiols, phosphorus-containing polythiols, halogen-containing polythiols. In case where the crosslinking reactive group of the polymer is a hydroxyl group, preferably used is a compound having at least two functional groups of at least one kind selected from a glycidyl group and an isocyanate group. In case where the crosslinking reactive group of the polymer is an unsaturated hydrocarbon group, preferably used is a compound having at least two unsaturated hydrocarbon groups of at least one kind selected from a vinyl group, an allyl group, an acryloyl group, a methacryloyl group, a propenyl group, a vinylidene group, and a vinylene group. Examples thereof include, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentylglycol) adipate, 1,3-butylene glycol diacrylate, 1,6-hexanediol diacrylate, neopentylglycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy.diethoxy)phenyl]propane, 2,2-bis[4-(acryloxyethoxy.polyethoxy)phenyl]propane, hydroxypivalic neopentylglycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentylglycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic neopentylglycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, and diethylene glycol bisallylcarbonate.

Preferably, the crosslinking agent is added to the organic solvent phase in a ratio by weight falling between 0.01 and 0.1 with respect to the polymer having a crosslinking reactive group and a hydrophilic group. When the ratio is smaller than 0.01, a viscosity increase with time, nozzle clogging, an ejection stability defect, etc. take place, thus not being preferred. On the other hand, when the ratio is larger than 0.1, deterioration in the rubbing resistance, enlargement of the particle size, etc. take place, thus not being preferred.

The catalyst to be used in the crosslinking reaction is not particularly limited so long as it has an effect of initiating or promoting the reaction. In case where the crosslinking reactive group of the polymer is an unsaturated hydrocarbon group and the crosslinking agent is a compound having at least two unsaturated hydrocarbon groups of at least one kind selected from a vinyl group, an allyl group, an acryloyl group, a methacryloyl group, a propenyl group, a vinylidene group and a vinylene group, usable are any of oil-soluble radical-polymerization initiators, for example, peroxides such as t-butyl peroxybenzoate, di-t-butyl peroxide, cumene perhydroxide, acetyl peroxide, benzoyl peroxide, lauroyl peroxide and azo compounds such as azobisisobutyronitrile, azobis-2,4-dimethylvaleronitrile, azobiscyclohexanecarbonitrile; and also water-soluble radical-polymerization initiators such as potassium persulfate, ammonium persulfate, sodium persulfate, 2,2-azobis(2-methylpropionamidine) dihydrochloride, and 4,4-azobis(4-cyanovaleric acid). The addition amount of the catalyst may be appropriately determined.

The organic solvent for use in the organic solvent phase is not particularly limited, so long as it can dissolve the polymer having a crosslinking reactive group and a hydrophilic group. Preferred are low-boiling-point organic solvents, considering the easiness of evaporating away. Examples thereof include, for example, ketone-type organic solvents such as acetone, methyl ethyl ketone; ester-type organic solvents such as ethyl acetate; alcohol-type organic solvents such as ethanol, isopropyl alcohol; and aromatic hydrocarbon-type organic solvents such as benzene.

The ratio by weight of the polymer having a crosslinking reactive group and a hydrophilic group with respect to the pigment and/or dye can be appropriately determined within the range between 0.3 and 1.5. Preferably, it is so determined that the mean particle size of the colorant particles be at most 400 nm, more preferably at most 200 nm, and the amount of the water-soluble substance that results from the polymer having a crosslinking reactive group and a hydrophilic group in the aqueous phase after production be at most 1000 ppm.

The mixed solution that contains at least the "polymer having a crosslinking reactive group and a hydrophilic group", the "crosslinking agent" and the "pigment and/or dye" in an organic solvent may be prepared, for example, according to a method of dispersing the pigment and/or dye in an organic solvent that contains the polymer having a crosslinking reactive group and a hydrophilic group dissolved therein by the use of a various disperser such as a bead mill, a roll mill or a sand mill, followed by dissolving a crosslinking agent and optionally an oil-soluble catalyst therein; or a method of flushing and dispersing an aqueous dispersion of the pigment and/or dye (for example, a wet cake of the pigment) in the polymer having a crosslinking reactive group and a hydrophilic group by the use of a various disperser, followed by dissolving or dispersing a crosslinking agent and optionally an oil-soluble catalyst therein. For improving the pigment dispersion, generally employed are dispersants and surfactants. In the invention, preferably used is a reactive surfactant for that purpose. The reactive surfactant referred to herein is the same as the polymerizable surfactant described below. As the reactive surfactant, those capable of reacting with the polymer having a crosslinking reactive group and a hydrophilic group or with the crosslinking agent can be used. The use of the reactive surfactant improves defects likely accompanied with the use of ordinary ink compositions which are prepared by the use of an ordinary dispersant or surfactant, such as deterioration in the printed images, e.g., occurrence of bleeding on plain paper, and an ejection defect due to the wetting at the periphery of the nozzles of a printer head.

For dispersing the colorant into fine particles, it is desirable that the phase conversion emulsification is carried out while applying ultrasonic waves.

Another preferred embodiment of the crosslinked structure-having polymer is a copolymer of at least a polymerizable group-having dispersant and a crosslinking monomer.

Naturally, the crosslinked structure-having polymer encompasses polymers prepared through copolymerization of a polymerizable group-having dispersant, a crosslinking monomer and a monomer copolymerizable with these crosslinking monomers.

The colorant of pigment and/or dye enveloped in the crosslinked structure-having copolymer of at least a polymerizable group-having dispersant and a crosslinking monomer is meant to indicate completely encapsulated, fine and stable particles of the pigment and/or dye.

The colorant of the pigment and/or dye enveloped in the crosslinked structure-having copolymer of such a polymerizable group-having dispersant and a crosslinking monomer has excellent dispersion stability in various aqueous media comprising a various water-soluble organic solvent and water. In particular, it has good dispersion stability in the aqueous media used in the invention that comprise a compound selected from acetylene glycol surfactants and acetylene alcohol surfactants, a compound selected from glycol ethers and 1,2-alkylene glycols, and water. The reason therefor has not yet been clarified, it can be attributed to that the colorant particles are encapsulated as in the manner mentioned above, and therefore, as compared with the case where a dispersant is adsorbed on the coloring material surfaces by a mere Van der Waals force, the enveloping polymer adheres thereto more firmly by the action of the coloring material, and that the polymer has a crosslinked structure to thereby improve the solvent resistance. This theory is referred to herein merely for explaining the contents of the invention, which, therefore, should not whatsoever restrict the scope of the invention.

The crosslinking monomer for use in the invention is not particularly limited, so long as it has high copolymerizability with the polymerizable group-having dispersant.

The crosslinking monomer for use in the invention is preferably a compound having at lest two unsaturated hydrocarbon groups of at least one kind selected from a vinyl group, an allyl group, an acryloyl group, a methacryloyl group, a propenyl group, a vinylidene group and a vinylene group. Examples thereof include, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentylglycol) adipate, 1,3-butylene glycol diacrylate, 1,6-hexanediol diacrylate, neopentylglycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy.diethoxy)phenyl]propane, 2,2-bis[4-(acryloxyethoxy.polyethoxy)phenyl]propane, hydroxypivalic neopentylglycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentylglycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic neopentylglycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, and diethylene glycol bisallylcarbonate.

The addition amount of the crosslinking monomer preferably falls between 0.1 and 20% by weight, more preferably between 0.1 and 10% by weight of the polymer to be obtained. If the addition amount is smaller than 0.1% by weight, viscosity increase with time, nozzle clogging, an ejection stability defect, etc. take place, thus not being preferred. On the other hand, if it is larger than 20% by weight, an objective colorant is hardly obtained, thus being not preferred.

As the monomer copolymerizable with the polymerizable group-having dispersant and the crosslinking monomer, commonly used radically polymerizable monomers can be used. The radically polymerizable monomer include monomers having, in their molecules, at least one radically polymerizable unsaturated hydrocarbon group, such as vinyl, allyl, acryloyl, methacryloyl, propenyl, vinylidene and vinylene groups. Examples of the radically polymerizable monomer include styrene and styrene derivatives such as methylstyrene, dimethylstyrene, chlorostyrene, dichlorostyrene, bromostyrene, p-chloromethylstyrene, divinylbenzene; acrylic acid and mono-functional acrylates such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethyl succinate, 2-acryloyloxyethyl phthalate, caprolactone acrylate, glycidyl acrylate; methacrylic acid and monofunctional methacrylates such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethyl succinate, 2-methacryloyloxyethyl phthalate, caprolactone methacrylate, glycidyl methacrylate; allyl compounds such as allylbenzene, allyl-3-cyclohexane propionate, 1-allyl-3,4-dimethoxybenzene, allyl phenoxyacetate, allyl phenylacetate, allylcyclohexane, and allyl esters of polycarboxylic acids; fumaric acid, maleic acid, itaconic acid, and their esters; and other radically polymerizable group-having monomers such as acrylonitrile, methacrylonitrile, maleic anhydride, N-substituted maleimides, and cyclic olefins.

Polymerizable surfactants of formula (I) (described in detail below) that are preferred for the polymerizable group-having dispersant are monomers of high electron donating ability. Therefore, the monomers to be used herein are preferably those of high electron acceptability. Examples of monomers of high electron acceptability include acrylonitrile, fumaronitrile, fumaric diesters such as dibutyl fumarate; maleic diesters such as dibutyl maleate; maleimides such as N-phenylmaleimide; and vinylidene cyanide. These may be used singly or as a mixture of two or more thereof.

The addition amount of the monomer preferably falls between around 2 and 15 times, more preferably between around 3 and 12 times, in terms of the molar ratio with respect to the polymerizable group-having dispersant. With a molar ratio of at least 2 times the dispersant, the colorant (encapsulated colorant particles) formed has excellent dispersion stability in aqueous media. With a molar ratio of at most 15 times the dispersant, the monomer can be sufficiently dissolved in the adsorbing layer of the polymerizable group-having dispersant to suppress the formation of water-insoluble polymers and the relative reduction in the amount of ionic repulsive groups, thereby making it possible to enhance the dispersion stability.

The colorant of the pigment enveloped in the crosslinked structure-having polymer that is constituted by a polymerizable group-having dispersant, a crosslinking monomer and a monomer copolymerizable with these monomers may be prepared in the manner set forth below.

A pigment and/or dye, and a polymerizable group-having dispersant are added to an aqueous organic solvent and/or water, and wet-ground in a disperser such as an ultrasonic disperser, a ball mill or a sand grinder, and then transferred into a reactor equipped with an ultrasonic generator, a stirrer, a dropping unit, a reflux condenser, a thermometer and a temperature controller. To this are added a crosslinking monomer, another copolymerizable monomer, a polymerization initiator and optionally water and/or an aqueous organic solvent, and they are allowed to undergo polymerization reaction at 40 to 100° C. for 10 to 60 hours to give a colorant of a pigment and/or dye enveloped in a crosslinked structure-having polymer. The addition amount of the polymerization initiator preferably falls between 0.1 and 5% by weight, more preferably between 0.1 and 3% by weight with respect to the total amount of the polymerizable group-having dispersant, the crosslinking monomer and the copolymerizable monomer. More preferably, the preparation can be carried out according to the method described in Japanese Patent Laid-Open No. 316909/1998.

As the polymerization initiator to be used to prepare the crosslinked structure-having polymer, suitably used are water-soluble polymerization initiators such as potassium persulfate, sodium persulfate, ammonium persulfate, 2,2-azobis(2-methylpropionamidine) dihydrochloride, and 4,4-azobis(4-cyanovaleric acid).

The "polymerizable group-having dispersant" is not particularly limited so long as it has, in its molecular structure, at least a polymerizable group, a hydrophobic group and a hydrophilic group and, particularly, suitable examples thereof include polymerizable surfactants having, in their molecular structures, at least a polymerizable group, a hydrophobic group and a hydrophilic group (surfactants having introduced therein a polymerizable group), and polymer dispersant having, in their molecular structures, at least a polymerizable group, a hydrophobic group and a hydrophilic group (polymer dispersants having introduced therein a polymerizable group).

The polymerizable group is not particularly limited so long as it is a functional group that causes polymerization reaction in a mode of, for example, radical polymerization, addition polymerization or polycondensation. Examples of the radically polymerizable group include, for example, unsaturated hydrocarbon groups including vinyl, allyl, acryloyl, methacryloyl, vinylidene and vinylene groups. Examples of the addition-polymerizable group include, for example, an isocyanate or isothiocyanate group, and other groups capable of reacting therewith, such as a hydroxyl group, an amino group, a mercapto group, and a carboxyl group. The polycondensing group is a functional group capable of polymerizing through condensation, including, for example, a carboxyl group, a hydroxyl group, an amino group and an alkoxy group.

As the polymerizable group, preferred are radically polymerizable unsaturated hydrocarbon groups, which are preferably selected from vinyl, allyl, acryloyl, methacryloyl, propenyl, vinylidene and vinylene groups.

The hydrophilic group is preferably selected from carboxyl, carbonyl, hydroxyl, sulfone and sulfonic acid groups and their salts and quaternary ammonium salts.

As the polymer dispersant having introduced therein a polymerizable group, usable herein are those prepared by introducing a polymerizable group into the following synthetic polymers. Examples of the synthetic polymers include polyvinyl alcohols; polyvinylpyrrolidones; acrylic resins and their salts such as polyacrylic acids, acrylic acid-acrylonitrile copolymers, potassium acrylate-acrylonitrile copolymers, vinyl acetate-acrylate copolymers, acrylic acid-acrylate copolymers; styrene-acrylic resins and their salts such as styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers; styrene-maleic acid copolymers, styrene-maleic anhydride copolymers, vinylnaphthalene-acrylic acid copolymers, vinylnaphthalene-maleic acid copolymers, and their salts; and vinyl acetate copolymers and their salts such as vinyl acetate-ethylene copolymers, vinyl acetate-fatty acid vinylethylene copolymers, vinyl acetate-maleate copolymers, vinyl acetate-crotonic acid copolymers, vinyl acetate-acrylic acid copolymers. Of those, particularly preferred are copolymers of a hydrophobic group-having monomer and a hydrophilic group-having monomer, and polymers of a monomer having both a hydrophobic group and a hydrophilic group in its molecular structure.

In one preferred embodiment of the present invention, a polymerizable surfactant is used as the polymerizable group-having dispersant.

The polymerizable surfactant for use in the invention preferably has a hydrophilic group selected from sulfone, sulfonic acid, carboxyl, carbonyl and hydroxyl groups and their salts and quaternary ammonium salts. In addition, the polymerizable group thereof is preferably an unsaturated hydrocarbon group, more specifically, a group selected from vinyl, allyl, acryloyl, methacryloyl, propenyl vinylidene and vinylene groups. Specific examples of such a polymerizable surfactant include the anionic allyl derivatives as described in Japanese Patent Publication Nos. 46291/1974 and 21442/1989, and Japanese Patent Laid-Open No. 104802/1987; the anionic propenyl derivatives as described in Japanese Patent Laid-Open No. 221431/1987; the anionic acrylic acid derivatives as described in Japanese Patent Laid-Open Nos. 34947/1987 and 11525/1980; the anionic itaconic acid derivatives as described in Japanese Patent Publication No. 34898/1971, Japanese Patent Laid-Open No. 30284/1976; the anionic maleic acid derivatives as described in Japanese Patent Publication No. 4157/1976, Japanese Patent Laid-Open No. 30284/1976; the nonionic allyl derivatives as described in Japanese Patent Laid-Open No. 104802/1987; the nonionic propenyl derivatives as described in Japanese Patent Laid-Open No. 100502/1987; the nonionic acrylic acid derivatives as described in Japanese Patent Laid-Open No. 28208/1981; the nonionic itaconic acid derivatives as described in Japanese Patent Publication No. 12681/1984; the nonionic maleic acid derivatives as described in Japanese Patent Laid-Open No. 74102/1984; and the cationic allyl derivatives as described in Japanese Patent Publication No. 65824/1992.

The polymerizable surfactant is adsorbed on the surface of the coloring material surface, and is excellent in dispersion stability even in the subsequent polymerization conditions (that is, the particles can be prevented from aggregating together). Therefore, the polymerizable surfactant is advantageous in the easiness of forming encapsulated particles.

In the invention, the polymerizable surfactant is preferably a compound of formula (I) or (II) set forth below. The use of the polymerizable surfactant of formula (I) or (II) makes it possible to form fine and stable encapsulated particles of a polymer-enveloped colorant of a pigment and/or dye, and makes it possible to stably disperse the colorant particles in aqueous media. Since the polymerizable surfactants of formula (I) or (II) are excellent particularly in the adsorption property onto the surface of the pigment and/or dye and in the dispersion stability under the subsequent polymerization conditions (that is, the particles can be prevented from aggregating together), they are advantageous in the easiness of forming encapsulated particles. Incidentally, the polymerizable surfactant of formula (I) corresponds to those disclosed in Japanese Patent Laid-Open Nos. 320276/1993 and 316909/1998.

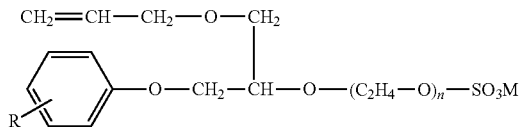

(I)

wherein R represents a hydrogen atom, or a hydrocarbon group having from 1 to 12 carbon atoms; n indicates a number falling between 2 and 20; M represents an alkali metal, an ammonium salt, or an alkanolamine.

By appropriately selecting R and the value of n in formula (I), the compound can be fitted to the degree of hydrophilicity or hydrophobicity of the coloring material surface. Preferred examples of the polymerizable surfactant of formula (I) include compounds of formulae (III) to (VI) set forth below. These may be used singly or as a mixture of two or more thereof.

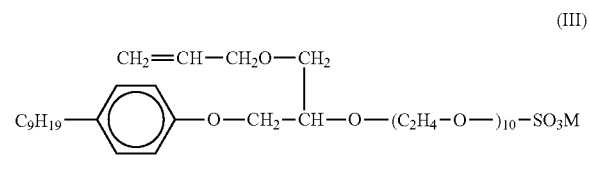

(III)

M = NH$_4$

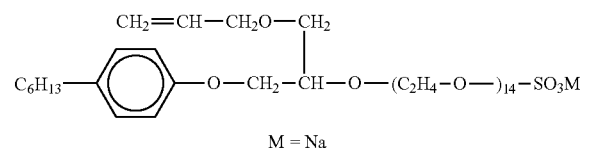

(IV)

M = Na

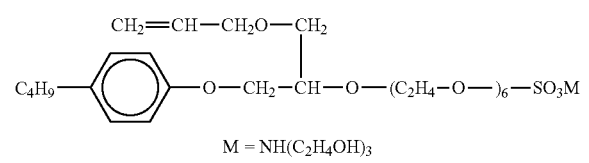

(V)

M = NH(C$_2$H$_4$OH)$_3$

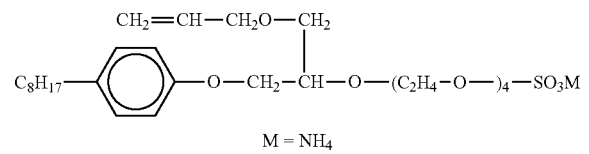

(VI)

M = NH$_4$

As the polymerizable surfactant of formula (I), commercially products can also be used. For example, SE-10N of Adekarea Soap SE Series manufactured by Asahi Denka Kogyo K.K. is a polymerizable surface-active agent of formula (I) wherein R is C$_9$H$_{19}$, n is 10 and M is NH$_4$, which corresponds to formula (III). Also, SE-20N of the same series is the same as SE-10N, but n is 20.

The polymerizable surfactant of formula (II) is as follows:

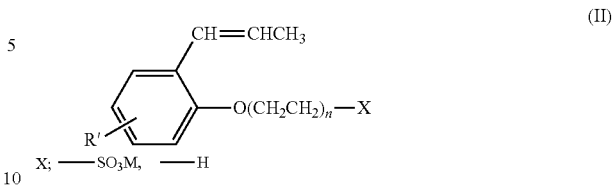

(II)

X: —SO$_3$M, —H wherein R' represents a hydrogen atom, or a hydrocarbon group having from 1 to 12 carbon atoms; n indicates a number falling between 2 and 20; M represents an alkali metal, an ammonium salt, or an alkanolamine.

R' is preferably C$_9$H$_{19}$— or C$_8$H$_{17}$—.

Except those mentioned above, other commercial products can also be used as the polymerizable surfactant. Examples thereof include, for example, Aquaron HS Series (Aquaron HS-05, HS-10, HS-20, and HS-1025), Aquaron RN Series (RN-10, RN-20, RN-30, RN-50, and RN-2025), New Frontier Series (New Frontier 177E, and S-510), manufactured by Daiichi Kogyo Yakuhin Co., Ltd.; Adekarea Soap NE Series (NE-10, NE-20, NE-30, NE-40, and NE-50) manufacture by Asahi Denka Kogyo K.K.

The addition amount of the polymerizable surfactant preferably falls between around 10 and 150% by weight, more preferably between around 20 and 100% by weight, with respect to the pigment and/or dye. By controlling the addition amount to at least 10% by weight, the dispersion stability of the ink composition can be improved.

By controlling the addition amount to at most 150% by weight, the generation of the polymerizable surfactant not adsorbed onto the pigment and/or dye can be suppressed, and the generation of polymers besides the encapsulated particles can be prevented. As the result, this makes it possible to obtain satisfactory ejection stability of the ink composition.

The colorant of a pigment enveloped in a polymer includes, for example, the encapsulated fine particles of pigments as disclosed in Japanese Patent Publication No. 94634/1995, Japanese Patent Laid-Open No. 59715/1996; the pigment having a polymer group bonded to its surface as disclosed in WO9951690; and the modified particles having bonded thereto a polymer group having a halogen group as disclosed in U.S. Pat. No. 6,103,380.

Preferred embodiments of the physical properties of the polymer that envelops the pigment and/or dye therein are described below.

Firstly, it is preferred that the solubility parameter of the "polymer that envelops the pigment and/or dye therein" (hereinafter designated by "SPp") falls between 11 and 14 cal/cm$^3$, and the difference between the solubility parameter of the liquid component and that of the polymer (hereinafter designated by "ASP") is at least 1.0 cal/cm$^3$. Herein, the liquid component is an aqueous mixed liquid (aqueous medium) comprising water and a water-soluble organic solvent.

SPp indicates the hydrophilicity or hydrophobicity of the polymer. When SPp thereof is smaller than 11 cal/cm$^3$, the hydrophobicity of the polymer is too high and the colorant of the pigment and/or dye enveloped in the polymer has poor dispersibility in the aqueous medium. On the other hand, when SPp thereof is larger than 14 cal/cm$^3$, the polymer swells in the aqueous medium to expand the hydrate layer and enlarge the polymer-enveloped colorant particles, where a viscosity increase may sometime be observed, and deterioration in ejection stability and nozzle clogging readily take place. Accordingly, SPp of the polymer preferably falls within the range as defined above.

When ΔSP is smaller than 1.0 cal/cm³, the mixed solvent penetrates into the polymer to dissolve and/or swell it, thereby causing a viscosity increase, etc. As the result, the storage stability is not ensured, and deterioration in ejection stability and nozzle clogging readily take place. Accordingly, the difference between the solubility parameter of the mixed solvent and that of the polymer preferably falls within the range as defined above.

The solubility parameter (δ) is a value obtained according to the Fedors formula set forth below, based on the evaporation energy ($\Delta e_i$) of the atoms or the atomic groups constituting the chemical structure and the molar volume ($\Delta v_i$) thereof.

$$\delta = (\Sigma \Delta e_i / \Sigma \Delta v_i)^{1/2} \qquad \text{<Fedors formula>}$$

(Yuji Harazaki, *Basic Science of Coating* (Maki Shoten, 1980), pp. 54-55)

Incidentally, the solubility parameter can also be obtained, for example, through calculation from the heat of evaporation, calculation from the refractive index, calculation from the kauri-butanol value, or calculation from the surface tension.

The acid value of the "polymer that envelops pigment and/or dye therein" preferably falls between 20 and 200 KOH mg/g, more preferably between 60 and 140 KOH mg/g. In general, the acid value indicates the amount (mg) of potassium hydroxide needed for neutralizing the free fatty acids contained in 1 g of oils and fats. In the invention, the acid value is defined to indicate the amount (mg) of potassium hydroxide needed for neutralizing the acid group such as carboxyl group and sulfonic acid group contained in 1 g of the polymer.

If the acid value of the polymer is smaller than 20 KOH mg/g, the dispersion stability of the colorant in aqueous media is insufficient; but if larger than 200 KOH mg/g, aggregation readily takes place upon production of the colorant, and the hydrate layers of the colorant particles expands to thereby readily cause deterioration in ejection stability and nozzle clogging. Accordingly, the above-defined range is preferred.

The glass transition temperature of the "polymer that envelops pigment and/or dye therein" is preferably not higher than 25° C. When the ink of the invention is used in printing at room temperature on plain paper or on media exclusively for ink jet recording, the aqueous medium (comprising water and/or water-soluble organic solvent) existing around the colorant particles penetrates into the plain paper or media exclusively for ink jet recording and therefore leaves from the vicinity of the colorant particles, thereby making the colorant particles close to one another. In such a situation, if the glass transition temperature of the colorant particles at the particle surface is not higher than 25° C., the polymers on the colorant particle surfaces fuse one another owing to the capillary pressure caused in the space between the neighboring colorant particles. Since the film formation proceeds in the state where the coloring material (the pigment and/or dye) is encapsulated (enveloped) inside, the rubbing resistance of the image can be particularly improved. In general, when a polymer solid, especially an amorphous polymer solid is heated from a low temperature up to a high temperature, it is observed a phenomenon of an abrupt change from a state where extremely large force is required for slight deformation (glass state) to a state where significant deformation is caused even with small force. The temperature at which the polymer undergoes the phenomenon is referred to as a glass transition temperature. In general, the glass transition temperature is defined as follows: Using a differential scanning calorimeter, a polymer is heated to obtain its DTA curve, on which a tangential line is drawn from the bottom of the endothermic peak toward the endothermic change starting point, and the temperature at which the tangential line crosses the base line is defined as the glass transition temperature. It is known that the other physical properties such as elastic modulus, specific heat and refractive index also abruptly change at the glass transition temperature. Therefore, also known are methods of determining the glass transition temperature by measuring these physical properties. In the invention, the glass transition temperature obtained with a heat-up measurement of differential scanning calorimeter (DSC) was employed. When the ink is used in printing on plain paper or on media exclusively for ink jet recording, the glass transition temperature of the "polymer that envelops pigment and/or dye therein" is more preferably not higher than 15° C., even more preferably not higher than 10° C., in order that the colorant more favorably undergoes film formation at room temperature. Accordingly, the "polymer that envelops pigment and/or dye therein" for use in the invention is preferably so designed that its glass transition temperature is not higher than 25° C., more preferably not higher than 15° C., still more preferably not higher than 10° C. The glass transition temperature of the polymer can be controlled to fall within those ranges by appropriately selecting the kind and molecular weight of the polymer. In the case where it is possible to heat the printed matter, depending on the glass transition temperature of the "polymer that envelops pigment and/or dye therein", to a temperature higher the glass transition temperature of the polymer, the glass transition temperature may be higher than 25° C. since the film formation can be accomplished so long as the glass transition temperature is not higher than the heating temperature. However, such an embodiment causes a necessity such that the ink jet recording apparatus should be equipped with a heating unit, and causes a problem such as an increased cost for the apparatus. Accordingly, the glass transition temperature is preferably not higher than 25° C.

As so mentioned hereinabove, when the ink of the invention is used in printing at room temperature on plain paper or on media exclusively for ink jet recording, a film is formed on the surface of the printed areas and the rubbing resistance of the printed image can be particularly improved. In the invention, the film-forming temperature on the recording medium is preferably not higher than 25° C., more preferably not higher than 15° C., still more preferably not higher than 10° C. The film-forming temperature of the ink of the invention on a recording medium is determined as follows: Using an ink jet printer under a predetermined temperature environment, an ink jet recording medium of a plastic film coated with inorganic particles together with a small amount of binder (for example, superfine-exclusive glossy film, produced by Seiko Epson Corporation) is printed with an ink sample of the invention, at 100% duty in a region of 10 mm×10 mm of the film to form a solid print. After allowing it stands for 1 hour at a predetermined temperature, the printed region is rubbed with an aqueous yellow fluorescent ink pen, ZEBRA PEN2 (trademark) manufactured by Zebra K.K., under a load of 500 g at a speed of 10 mm/sec. The temperature at which no stain is generated is regarded as the film-forming temperature.

The colorant of a pigment and/or dye enveloped in a polymer preferably contains a hardly water-soluble substance. As the hardly water-soluble substance, substances generally used as film-forming promoters or film-making promoters are preferably used.

The solubility in water of the hardly water-soluble substance is preferably at most 10% by weight. The presence of such a hardly water-soluble substance having a low solubility in water, particularly having a solubility in water of at most 10% by weight, in the colorant of pigment and/or dye enveloped in a polymer improves the fixing property of the ink jet recording ink on recording media. The reason therefor is that the hardly water-soluble substance existing in the polymer of the colorant according to the invention therein can lower the glass transition temperature of the polymer, therefore improving the film formability of the polymer.

The colorant of a pigment and/or dye enveloped in a polymer has been described hereinabove. By combining the colorant with at least one compound selected from the group consisting of acetylene glycol surfactants, acetylene alcohol surfactants, glycol ethers and 1,2-alkylene glycols, it becomes possible to accomplish stable printing with excellent dispersion stability and ejection stability and free from nozzle clogging for a long period of time. In addition, with a recording medium such as plain paper, regenerated paper or coated paper, it can be obtained a high-quality image having good drying property after printing, being free from bleeding, having a high printed density and excellent color development property.

When a pigment is dispersed in water, a dispersant such as a surfactant or a polymer dispersant is generally used. However, since these dispersants are merely adsorbed on the pigment particles, there is a tendency that the dispersant is usually readily released off from the colorant particles by some environmental factor.

As opposed to this, in the colorant of a pigment and/or dye enveloped in a polymer, particularly the colorant of a pigment and/or dye enveloped in a crosslinked structure-having polymer, for use in the invention, the polymer firmly adheres to the colorant of the pigment and/or dye and, presumably, is hardly released off from the pigment and/or dye, to provide a satisfactory solvent resistance. Therefore, even by the contact with the penetrant selected from acetylene glycol surfactants, acetylene alcohol surfactants, glycol ethers and 1,2-alkylene glycols, the polymer is hardly released off from the pigment and/or dye, and is hardly swollen by the penetrant. Accordingly, the colorant for use in the present invention has excellent dispersion stability for a long period of time.

On the other hand, with an ink that contains a pigment dispersion, in which a pigment is dispersed by the use of a dispersant such as a surfactant or a polymer dispersant, and has improved penetrating property, there is a tendency that the ink viscosity is increased by dispersants not adsorbed on the pigment surface originally from the time of the dispersing step but dissolved in the liquid and by dispersants released off from the pigment after the dispersing step. Therefore, the pigment content is limited in many cases. For this reason, a sufficient printed density cannot be obtained particularly on plain paper and regenerated paper, and satisfactory color development cannot be attained in many cases. As opposed to this, in the colorant for use in the invention, the polymer firmly adheres to the pigment and/or dye and is hardly released off from the coloring material, and therefore it hardly causes an increase in the ink viscosity. Thus, the ink involves an advantage that since the viscosity of the ink can be easily lowered, a larger amount of the colorant can be contained, thereby making it possible to obtain sufficient printed density on plain paper or regenerated paper. These reasons are referred to herein merely for explaining the contents of the invention, which therefore should not whatsoever restrict the scope of the invention.

Preferably, the ink jet recording ink of the invention contains a preservative, a sequestrant and a rust preventive. The preservative preferably comprises at least one compound selected from the group consisting of alkylisothiazolones, chloroalkylisothiazolones, benzisothiazolones, bromonitroalcohols, oxazolidines and chloroxylenols. The sequestrant is preferably a salt of ethylenediaminetetraacetic acid. The rust preventive is preferably dicyclohexylammonium nitrate and/or benzotriazole.

Provided that the above-mentioned preservative, sequestrant and rust preventive are contained, the ink jet recording ink of the invention may additionally contain any other preservatives, sequestrants and rust preventives.

Specific examples of the preservative are as follows. For example, as the alkylisothiazolone, products containing octylisothiazolone as the effective component are commercially available (for example, NS-800H, NS-800G, and NS-800P, manufactured by Nagase Kasei Kogyo K.K.). As the chloroalkylisothiazolone, products containing chloroisomethylthiazolone as the effective component are commercially available (for example, NS-500W, NS-80D, NS-CG, NS-TM, and NS-RS, manufactured by Nagase Kasei Kogyo K.K.). Products containing benzisothiazolone as the effective component are commercially available (for example, Proxel XL-2, Proxel BDN, Proxel BD20, Proxel GXL, Proxel LV, and Proxel TN, manufactured by Zeneca Ltd. (England); Deniside BIT and Deniside NIPA, manufactured by Nagase Kasei Kogyo K.K.). Products containing bromonitroalcohol as the effective component are commercially available (for example, Bronopole, Miaside BT, and Miaside AS, manufactured by Nagase Kasei Kogyo K.K.). Also, a product containing chloroxylenol as the effective component is commercially available (for example, PCMX: manufactured by Nagase Kasei Kogyo K.K.). Also, products containing oxazolidine-based compound as the effective component are commercially available (for example, NS-BP, Deniside BIT-20N, Deniside SPB, Saniset HP, Microstat 5520, Saniset SK2, Deniside NS-100, Deniside C3H, Saniset 161, Deniside CSA, Deniside CST, Deniside C3, Deniside OMP, Deniside XR-6, Deniside NM, Mordenise N769, Denisat P4, Denisat P-8, and Denisat CHR, manufactured by Nagase Kasei Kogyo K.K.). Of these products, the products containing the oxazolidine-based compound as the effective component, the products containing chloroisomethylthiazolone as the effective component, and the products containing benzisothiazolone as the effective component have a large effect.

These preservatives are preferably composite components using two or more kinds of structures, which do not so resemble each other, than a single component since the former can restrain resistant bacteria.

For the sequestrant, particularly preferred is a salt of ethylenediaminetetraacetic acid.

Examples of the salt of ethylenediaminetetraacetic acid include, for example, disodium salt of ethylenediaminetetraacetic acid, trisodium salt of ethylenediaminetetraacetic acid, tetrasodium salt of ethylenediaminetetraacetic acid, dipotassium salt of ethylenediaminetetraacetic acid, tripotassium salt of ethylenediaminetetraacetic acid, tetrapotassium salt of ethylenediaminetetraacetic acid, diammonium salt of ethylenediaminetetraacetic acid, triammonium salt of ethylenediaminetetraacetic acid, and tetraammonium salt of ethylenediaminetetraacetic acid. In the ink jet recording ink of the invention that contains at least the colorant of a pigment and/or dye enveloped in a polymer, and water, preferably used are disodium salt of ethylenediaminetetraacetic acid and dipotassium salt of ethylenediaminetetraacetic acid.

The salt of ethylenediaminetetraacetic acid is effective for suppressing the deterioration of the dispersion stability of the polymer-enveloped colorant of a pigment and/or dye according to the invention by the influence of a minute amount of metal ion existing in ink cartridges or in the ink pathways in heads.

For the rust preventive, effective are dicyclohexylammonium nitrate and/or benzotriazole. These rust preventives are for preventing metal heads from being rusted, and are effective for the plated faces of heads which are readily rusted (in particular, nozzle tip portions are readily rusted, whereby the ejection of an ink readily becomes inferior).

Preferably, the addition amount (A) of the preservative falls between 0.01% by weight and 0.1% by weight, the addition amount (B) of the sequestrant falls between 0.01% by weight and 0.5% by weight, the addition amount (C) of the rust preventive falls between 0.01% by weight and 0.2% by weight, and A+B+C falls between 0.03% by weight and 0.8% by weight.

If the addition amount (A) of the preservative is smaller than 0.01% by weight, the ink preservation effect is small. On the other hand, if larger than 0.1%, since the preservative gives an adverse influence on the colorant stability in the ink and the long-term storage stability of the ink tends to be deteriorated, thus not being preferred.

If the amount (B) of the sequestrant in the ink of the invention is smaller than 0.01% by weight, foreign substance may be generated when the ink is filled in the ink cartridges in which the ink chamber is made of an urethane foam that may contain a minute amount of metal ions. On the other hand, if the amount thereof is larger than 0.5% by weight, the stability of the colorant in the ink tends to be deteriorated, making it hard to store the ink for a long period of time.

If the amount (C) of the rust preventive is smaller than 0.01% by weight, the ink tends to rust the metallic part of heads, particularly the vicinity of the nozzle tip portions when the ink jet recording apparatus is used for a long time. On the other hand, if the amount thereof is larger than 0.2% by weight, the stability of the colorant in the ink tends to be deteriorated, making it hard to store the ink for a long period of time.

By containing such a preservative, a sequestrant and a rust preventive as described above, the storage stability of the ink can be further improved and stable ejection can be further surely attained for a long period of time.

For ensuring the storage stability, the clogging preventing property, the ejection stability and the long-term storage stability, the ink jet recording ink in the present invention may further contain any other various additives such as wetting agent, moisturizer, dissolution promoter, penetration inhibitor, viscosity-controlling agent, pH-controlling agent, dissolution promoter, antioxidant, antifungal agent, corrosion inhibitor, and other sequestrants.

For suppressing the ink from drying up at the nozzle tip portions of a head, a water-soluble organic solvent that is soluble in water and has the ability to retain water is preferably added as a wetting agent (or moisturizer). Examples thereof include glycerin, ethylene glycol, diethylene glycol, triethylene glycol, polyethylene glycol having a molecular weight of at most 2000, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. In the invention, particularly preferred are glycerin, ethylene glycol, diethylene glycol, and polyethylene glycol having a molecular weight of at most 2000.

In addition, examples of the component for improving the solubility of the ink ingredients and improving the penetrating property of the ink into recording media such as paper, or preventing nozzles from being clogged, include, for example, alkyl alcohols having from 1 to 4 carbon atoms such as ethanol, methanol, butanol, propanol, isopropanol, as well as formamide, acetamide, dimethylsulfoxide, sorbitol, sorbitan, acetin, diacetin, triacetin, and sulforane. These compounds can be appropriately selected and used.

For controlling the penetrating property, the ink of the invention may contain any other surfactants. The additional surfactants are preferably well miscible with the ink of the invention, particularly those of high penetrating property and high stability. Examples thereof include, for example, ampholytic surfactants and nonionic surfactants. Examples of the ampholytic surfactants include lauryl dimethylaminoacetate betaine, 2-alkyl-N-carboxymethyl-N-hydroxyethyl-imidazolinium betaine, cocoylamidopropyl dimethylaminoacetate betaine, polyoctylpolyaminoethylglycine and other imidazole derivatives. Examples of the nonionic surfactants include ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, polyoxyalkylene alkyl ether; polyoxyethyleneoleic acid; esters such as polyoxyethylene oleate, polyoxyethylene distearate, sorbitan laurate, sorbitan monostearate, sorbitan monooleate, sorbitan sesquioleate, polyoxyethylene monooleate, polyoxyethylene stearate; as well as fluorine-containing surfactants such as fluoroalkyl esters and salts of perfluoroalkylcarboxylic acids.

In addition, included are pH-controlling agents, amines such as diethanolamine, triethanolamine, propanolamine, morpholine and their modified derivatives; inorganic hydroxides such as potassium hydroxide, sodium hydroxide, lithium hydroxide; ammonium hydroxide, quaternary ammonium salts (e.g., tetramethylammonium); carbonates such as potassium carbonate, sodium carbonate, lithium carbonate; and phosphates.

As still other additives, ureas such as urea, thiourea, tetramethylurea; allophanates such as allophanate, methylallophanate; biurets such as biuret, dimethylbiuret, tetramethylbiuret; L-ascorbic acid and its salts; and commercially-available antioxidants and UV absorbents can also be used.

Preferably, the surface tension of the ink jet recording ink of the invention is at most 45 mN/m, more preferably falling between 25 and 45 mN/m. If the surface tension is higher than 45 mN/m, satisfactory images are hardly obtained, since the drying property of the printed image becomes poor, bleeding is readily caused, and color bleeding is caused. On the other hand, if the surface tension thereof is lower than 25 mN/m, the periphery of the nozzles of a printer tends to be subjected to wetting, thereby readily causing problems in the ejection stability such as occurrence of curving of the ejected ink droplets. The surface tension of the ink can be measured with any ordinary surface tension meter.

The surface tension of the ink can be controlled to fall within the above range, by appropriately adjusting the constituent components of the ink and the composition ratio thereof.

Since the colorant of the ink of the invention is a pigment or dye enveloped in a polymer, the weather resistance including light resistance and gas resistance of the formed images becomes satisfactory. In addition, according to the colorant of the ink of the invention, the characteristics of the polymer that envelops the pigment or dye can be designed with broadened latitude by appropriately selecting the polymerizing monomers and other reactants. Therefore, it is possible to make the ink have various functions (light resistance, gas resistance, coloring property, gloss, fixing property).

In ordinary ink prepared by dispersing a pigment with an ordinary dispersant (e.g., surfactant or polymer dispersant), the dispersant basically is merely adsorbed on the pigment, and therefore it is readily released from the pigment by some environmental factors. Thus released, the dispersant likely increases the ink viscosity excessively. Therefore, the colorant content is limited, and it has heretofore been considered that it is difficult to obtain sufficient color development of images. However, in the polymer-enveloped colorant of a pigment and/or dye in the ink of the invention, the polymer is hardly released off from the pigment and/or dye. Therefore, even when the colorant is added in a large amount, it does not increase the ink viscosity, or that is, the viscosity of the ink of the invention can be easily lowered. As compared with ordinary ink in which the pigment is dispersed with an ordinary dispersant, the colorant content of the ink of the invention can be increased, and hence it is easy to obtain images having sufficient color development.

The constitution of the ink jet recording ink of the invention has been described hereinabove. The ink jet recording ink set of the invention comprises a plurality of the inks. In general, it is composed of a combination of the inks of three or more different colors. For example, for the ink set, four ink compositions of magenta ink, yellow ink, cyan ink and black ink may be combined; or seven ink compositions of dark and light magenta inks, dark and light yellow inks, dark and light cyan inks and black ink may be combined. If desired, orange ink and green ink may be further combined with those compositions.

The long-term storage stability of the ink jet recording ink and the ink jet recording ink set of the invention is excellent.

The recording method of the invention comprises ejecting ink droplets to attach a recording medium to thereby perform printing, and has a feature that the ink jet recording ink and/or the ink jet recording ink set of the invention is used in the method. The recording method can be suitably carried out by mounting an ink cartridge containing ink jet recording ink of the invention (in the case where the ink set comprising a plurality of ink jet recording inks is to be used, an ink cartridge separately containing the respective ink jet recording inks) on a known ink jet recording apparatus, and performing printing with respect to a recording medium.

One preferred embodiment of the ink jet recording apparatus for use herein is so designed that an electrostrictive unit capable of vibrating based on an electronic signal is mounted and the ink jet recording ink of the invention or the inks constituting the ink set of the invention can be ejected according to the vibration of the electrostrictive unit.

As the ink cartridge (storage case) for storing the ink jet recording ink, a known cartridge can be suitably used.

According to the ink jet recording ink, the ink jet recording ink set and the recording method of the present invention, it can be obtained a high-quality image having excellent dispersion stability and ejection stability, being free from bleeding even on plain paper or regenerated paper, and having high printed density and excellent color development property. In addition, an image having sufficient rubbing resistance can be obtained not only on plain paper and regenerated paper but also on other recording media such as coated paper.

Since the recorded matter of the invention is obtained by printing according to the recording method of the present invention, it has an image having sufficient rubbing resistance not only with plain paper and regenerated paper but also with other recording media such as coated paper.

EXAMPLES

The present invention will be illustrated in greater detail with reference to the following Examples, but the invention should not be construed as being limited thereto.

<Preparation of Colorant of Pigment Enveloped in Polymer (Copolymer) of Polymerizable Group-Having Dispersant and Monomer (Copolymerizable Monomer)>

The colorants set forth below were prepared by well dispersing a pigment in an aqueous organic solvent and/or water in the presence of a polymerizable group-having dispersant, followed by polymerizing the polymerizable group-having dispersant alone or together with other copolymerizable monomer in the presence of a polymerization initiator at a predetermined temperature for a predetermined period of time in a reactor equipped with a stirrer, a thermometer, a temperature controller, a reflux condenser and a dropping funnel. The mean particle size of the colorant particles was measured with a Doppler-laser particle size distribution analyzer, Microtrac UPA 150 manufactured by Leeds & Northrup. The glass transition temperature of the polymer of the colorant was measured with a heat-scanning type calorimeter (differential scanning calorimeter: DSC) manufactured by Seiko Electronics, according to the method described above.

(Colorant 1-1: Black Colorant)

Colorant 1-1 was prepared according to the same method as in Example 1 described in Japanese Patent Laid-Open No. 316909/1998. Specifically, 100 parts by weight of carbon black (Raven C, manufactured by Columbia Carbon) and 60 parts by weight of a polymerizable surfactant of formula (IV), Adekarea Soap SE-10N (manufactured by Asahi Denka) were added to 250 parts by weight of water, exposed to ultrasonic waves, and subjected to dispersion treatment in a sand mill (manufactured by Yasukawa Seisakusho) for about 2 hours. This dispersion having the carbon black dispersed with the polymerizable surfactant was put into a reactor equipped with an ultrasonic generator, a stirrer, a temperature controller, a reflux condenser and a dropping funnel. On the other hand, 30 parts by weight of acrylonitrile, 9 parts by weight of styrene, 51 parts by weight of n-butyl acrylate, 10 parts by weight of methacrylic acid, 10 parts by weight of the same polymerizable surfactant as above, 1 part by weight of potassium persulfate and 100 parts by weight of water were mixed to prepare an emulsion. The emulsion was gradually and dropwise put into the above-described reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 µm filter to remove coarse particles. Through the process, an intended colorant dispersion was obtained. The mean particle size thereof was measured with a Doppler-laser particle size distribution analyzer, Microtrac UPA 150 manufactured by Leeds & Northrup, and found to be 105 nm. The glass transition temperature of colorant 1-1 was measured with a differential scanning calorimeter (DSC), DSC 200 manufactured by Seiko Electronics, and the glass transition temperature of the polymer of the colorant was found to be 10° C.

(Colorant 1-2: Cyan Colorant)

An intended colorant dispersion was obtained in the same manner as that for preparing colorant 1-1, except that C.I. Pigment Blue 15:3 (copper phthalocyanine pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 85 nm. The glass transition temperature of colorant 1-2 was measured with a differential scanning calorimeter (DSC), DSC 200 manufactured by Seiko Electronics, and the glass transition temperature of the polymer of the colorant was found to be 10° C.

(Colorant 1-3: Magenta Colorant)

An intended colorant dispersion was obtained in the same manner as that for preparing colorant 1-1, except that C.I. Pigment Red 122 (dimethylquinacridone pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 90 nm. The glass transition temperature of colorant 1-3 was measured with a differential scanning calorimeter (DSC), DSC 200 manufactured by Seiko Electronics, and the glass transition temperature of the polymer of the colorant was found to be 10° C.

(Colorant 1-4: Yellow Colorant)

An intended colorant dispersion was obtained in the same manner as that for preparing colorant 1-1, except that C.I. Pigment Yellow 180 (diketopyrrolopyrole, manufactured by Clariant) was used in place of the carbon black pigment. The mean particle size thereof was measured with a Doppler-laser particle size distribution analyzer, Microtrac UPA 150 manufactured by Leeds & Northrup, and found to be 80 nm. The glass transition temperature of colorant 1-4 was measured with a differential scanning calorimeter (DSC), DSC 200 manufactured by Seiko Electronics, and the glass transition temperature of the polymer of the colorant was found to be 10° C.

(Colorant 1-5: Black Colorant)

Colorant 1-5 was prepared according to the same method as in Example 1 described in Japanese Patent Laid-Open No. 316909/1998. Specifically, 100 parts by weight of carbon black (Raven C, manufactured by Columbia Carbon) and 60 parts by weight of a polymerizable surfactant of formula (II), Aquaron HS-10 (manufactured by Daiichi Yakuhin Kogyo) were added to 250 parts by weight of water, exposed to ultrasonic waves, and dispersed in a sand mill (manufactured by Yasukawa Seisakusho) for about 2 hours. The dispersion having carbon black dispersed with the polymerizable surfactant was put into a reactor equipped with an ultrasonic generator, a stirrer, a temperature controller, a reflux condenser and a dropping funnel. On the other hand, 30 parts by weight of acrylonitrile, 9 parts by weight of styrene, 51 parts by weight of n-butyl acrylate, 10 parts by weight of methacrylic acid, 10 parts by weight of the same polymerizable surfactant as above, 1 part by weight of potassium persulfate and 100 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 µm filter to remove coarse particles. Through the process, an intended colorant dispersion was obtained. The mean particle size thereof was measured with a Doppler-laser particle size distribution analyzer, Microtrac UPA 150 manufactured by Leeds & Northrup, and found to be 110 nm. The glass transition temperature of the colorant was measured with a differential scanning calorimeter (DSC), DSC 200 manufactured by Seiko Electronics, and the glass transition temperature of the polymer of the colorant was found to be 10° C.

(Colorant 1-6: Cyan Colorant)

An intended colorant dispersion was obtained in the same manner as that for preparing colorant 1-5, except that C.I. Pigment Blue 15:3 (copper phthalocyanine pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 90 nm. The glass transition temperature of the colorant was measured with a differential scanning calorimeter (DSC), DSC 200 manufactured by Seiko Electronics, and the glass transition temperature of the polymer of the colorant was found to be 10° C.

(Colorant 1-7: Magenta Colorant)

An intended colorant dispersion was obtained in the same manner as that for preparing colorant 1-5, except that C.I. Pigment Red 122 (dimethylquinacridone pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 95 nm. The glass transition temperature of the colorant was measured with a differential scanning calorimeter (DSC), DSC 200 manufactured by Seiko Electronics, and the glass transition temperature of the polymer of the colorant was found to be 10° C.

(Colorant 1-8: Yellow Colorant)

An intended colorant dispersion was obtained in the same manner as that for preparing colorant 1-5, except that C.I. Pigment Yellow 180 (diketopyrrolopyrole, manufactured by Clariant) was used in place of the carbon black pigment. The mean particle size thereof was measured with a Doppler-laser particle size distribution analyzer, Microtrac UPA 150 manufactured by Leeds & Northrup, and found to be 85 nm. The glass transition temperature of the colorant was measured with a differential scanning calorimeter (DSC), DSC 200 manufactured by Seiko Electronics, and the glass transition temperature of the polymer of the colorant was found to be 10° C.

(Colorant 1-9: Black Colorant)

This colorant was prepared according to the same method as in Example 1 described in Japanese Patent Laid-Open No. 316909/1998. Specifically, 5 parts by weight of carbon black (Raven C, manufactured by Columbia Carbon) and 3 parts by weight of a polymerizable surfactant of formula (IV), SE-10N (manufactured by Asahi Denka) were added to 80 parts by weight of water, and dispersed through exposure to ultrasonic waves for 4 hours. 1.6 parts by weight of acrylonitrile and 0.05 parts by weight of potassium persulfate were added thereto, and a polymerization reaction was carried out at 60° C. for 48 hours. The resulting dispersion was filtered through a 0.4 µm filter to remove coarse particles. Through the process, an intended colorant dispersion was obtained.

(Colorant 1-10: Black Colorant)

An intended colorant dispersion was obtained in the same manner as that for preparing colorant 1-9, except that a polymerizable surfactant of formula (II), Aquaron HS-10, was used in place of the polymerizable surfactant of formula (IV), Adekarea Soap SE-10N (manufactured by Asahi Denka).

(Colorant 1-11: Cyan Colorant)

An intended colorant dispersion was obtained in the same manner as that for preparing colorant 1-9, except that C.I. Pigment Blue 15:3 was used in place of the carbon black.

(Colorant 1-12: Magenta Colorant)

An intended colorant dispersion was obtained in the same manner as that for preparing colorant 1-9, except that C.I. Pigment Red 122 was used in place of the carbon black.

(Colorant 1-13: Magenta Colorant)

An intended colorant dispersion was obtained in the same manner as that for preparing colorant 1-9, except that C.I. Pigment Red 180 was used in place of the carbon black.

(Colorant 1-14: Black Colorant)

The intended colorant dispersion was obtained in the same manner as that for preparing colorant 1-9, except that 2 parts by weight of dibutyl fumarate was used in place of the acrylonitrile.

(Colorant 1-15: Black Colorant)

5 parts by weight of carbon black (Raven C, manufactured by Columbia Carbon) and 3 parts by weight of a polymerizable surfactant of formula (IV), SE-10N (manufactured by Asahi Denka) were added to 80 parts by weight of water, exposed to ultrasonic waves, and dispersed in a sand mill (manufactured by Yasukawa Seisakusho) for about 2 hours. The dispersion having carbon black dispersed with the polymerizable surfactant was put into a reactor equipped with an ultrasonic generator, a stirrer, a temperature controller, a reflux condenser and a dropping funnel. 2 parts by weight of 2-hydroxyethyl acrylate and 0.05 parts by weight of potassium persulfate were added thereto, and a polymerization reaction was carried out at 60° C. for 48 hours. The resulting dispersion was filtered through a 0.4 μm filter to remove coarse particles. Through the process, an intended colorant dispersion was obtained.

(Colorant 1-16: Black Colorant)

10 parts by weight of carbon black (Raven C, manufactured by Columbia Carbon) and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The dispersion having carbon black dispersed with the polymerizable surfactant was put into a reactor equipped with an ultrasonic generator, a stirrer, a temperature controller, a reflux condenser and a dropping funnel. On the other hand, 2 parts by weight of benzyl methacrylate, 2 parts by weight of n-butyl acrylate, 1 part by weight of methacrylic acid, 0.1 parts by weight of the same polymerizable surfactant as above, 0.05 parts by weight of potassium persulfate and 10 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was filtered through a 0.4 μm filter to remove coarse particles. Through the process, an intended colorant dispersion was obtained.

(Colorant 1-17: Black Colorant)

10 parts by weight of carbon black (Raven C, manufactured by Columbia Carbon) and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The resulting dispersion was put into a reactor equipped with an ultrasonic generator, a stirrer, a temperature controller, a reflux condenser and a dropping funnel. On the other hand, 1 part by weight of benzyl methacrylate, 2 parts by weight of n-butyl methacrylate, 1 part by weight of methacrylic acid, 0.1 parts by weight of the same polymerizable surfactant as above, 0.05 parts by weight of potassium persulfate and 10 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 μm filter to remove coarse particles. Through the process, an intended colorant dispersion was obtained. The acid value of the colorant was 101 KOH mg/g. The acid value of the colorant can be considered as the acid value of the polymer.

(Colorant 1-18: Black Colorant)

10 parts by weight of carbon black (Raven C, manufactured by Columbia Carbon) and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The resulting dispersion was put into a reactor equipped with an ultrasonic generator, a stirrer, a temperature controller, a reflux condenser and a dropping funnel. On the other hand, 1 part by weight of benzyl methacrylate, 2 parts by weight of n-butyl methacrylate, 3 parts by weight of methacrylic acid, 0.1 parts by weight of the same polymerizable surfactant as above, 0.05 parts by weight of potassium persulfate and 10 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 μm filter to remove coarse particles. Through the process, an intended colorant dispersion was obtained. The acid value of the colorant was 168 KOH mg/g. The acid value of the colorant can be considered as the acid value of the polymer. The solubility parameter (6) of the polymer was 11.3. The mean particle size thereof was measured with a Doppler-laser particle size distribution analyzer, Microtrac UPA 150 manufactured by Leeds & Northrup, and found to be 110 nm. The glass transition temperature of the colorant was measured with a differential scanning calorimeter (DSC), DSC 200 manufactured by Seiko Electronics, and the glass transition temperature of the polymer of the colorant was found to be 17° C.

(Colorant 1-19: Black Colorant)

10 parts by weight of carbon black (Raven C, manufactured by Columbia Carbon) and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The resulting dispersion was put into a reactor equipped with an ultrasonic generator, a stirrer, a temperature controller, a reflux condenser and a dropping funnel. On the other hand, 2 parts by weight of acrylonitrile, 1 part by weight of acrylamide, 3 parts by weight of n-butyl methacrylate, 1 part by weight of methacrylic acid, 0.1 parts by weight of the same polymerizable surfactant as above, 0.05 parts by weight of potassium persulfate and 10 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 μm filter to remove coarse particles. Through the process, an intended colorant dispersion was obtained. The acid value of the colorant was 101 KOH mg/g. The acid value of the colorant can be considered as the acid value of the polymer. The solubility parameter (δ) of the polymer was 13.8. The mean particle size thereof was measured with a Doppler-laser particle size distribution analyzer, Microtrac UPA 150 manufactured by Leeds & Northrup, and found to be 105 nm. The glass transition temperature of the colorant was measured with a differential scanning calorimeter (DSC), DSC 200 manufactured by Seiko Electronics, and the glass transition temperature of the polymer of the colorant was found to be 13° C.

(Colorant 1-20: Black Colorant)

In the same manner as in Example 1 described in Japanese Patent Laid-Open No. 316909/1998, 5 parts by weight of a carbon black pigment, Raven C (manufactured by Columbia Carbon) and 3 parts by weight of a polymerizable surfactant of formula (IV), Adekarea Soap SE-10N (manufactured by Asahi Denka) were added to 80 parts of ion-exchanged water in a reactor equipped with an ultrasonic generator, a stirrer, a dropping unit, a water-cooling reflux condenser, a thermometer and a temperature controller, and a dispersion treatment was carried out with applying ultrasonic waves for 4 hours. 1.6 parts by weight of acrylonitrile and 0.05 parts by weight of potassium persulfate were added thereto, and a polymerization reaction was carried out at 60° C. for 48 hours. The resulting dispersion was filtered through a 0.4 μm membrane filter to remove coarse particles.

Next, 27 parts by weight of ion-exchanged water and 0.06 parts by weight of sodium laurylsulfate were put into the reactor, to which were added 100 parts by weight of ion-exchanged water and 0.5 parts by weight of a polymerization initiator, and kept at 70° C. in a nitrogen atmosphere. Then, after 3 parts by weight of Adekarea Soap SE-10N was added thereto and stirred, a mixture prepared by mixing 15 parts by weight of styrene, 6 parts by weight of tetrahydrofurfuryl methacrylate, 45 parts by weight of n-butyl acrylate and 0.02 parts by weight of t-dodecylmercaptan was dropwise put into the reactor and reacted. This was neutralized with sodium hydroxide to have a pH of 8, and filtered through 0.3 μm filter to obtain an intended colorant dispersion. The mean particle size thereof was measured with a Doppler-laser particle size distribution analyzer, Microtrac UPA 150 manufactured by Leeds & Northrup, and found to be 105 nm.

(Colorant 1-21: Film-Forming Promoter-Containing Black Colorant)

Colorant 1-21 was prepared in the same manner as in Example 1 described in Japanese Patent Laid-Open No. 316909/1998. Specifically, 100 parts by weight of carbon black (Raven C, manufactured by Columbia Carbon) and 60 parts by weight of a polymerizable surfactant of formula (IV), SE-10N (manufactured by Asahi Denka) were added to 250 parts by weight of water, exposed to ultrasonic waves, and dispersed in a sand mill (manufactured by Yasukawa Seisakusho) for about 2 hours. The carbon black dispersion in the polymerizable surfactant was put into a reactor equipped with an ultrasonic generator, a stirrer, a temperature controller, a reflux condenser and a dropping funnel. On the other hand, 30 parts by weight of acrylonitrile, 50 parts by weight of styrene, 15 parts by weight of n-butyl methacrylate, 10 parts by weight of methacrylic acid, 10 parts by weight of the same polymerizable surfactant as above, 15 parts by weight of ADEKA PLANON MPC-709 (manufactured by Asahi Denka), 1 part by weight of potassium persulfate and 100 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was neutralized with potassium hydroxide to have a pH of around 8, and filtered through a 0.4 μm filter to remove coarse particles. Through the process, an intended colorant dispersion was obtained. The mean particle size thereof was measured with a Doppler-laser particle size distribution analyzer, Microtrac UPA 150 manufactured by Leeds & Northrup, and found to be 105 nm. The glass transition temperature of the colorant was measured with a differential scanning calorimeter (DSC), DSC 200 manufactured by Seiko Electronics, and the glass transition temperature of the polymer of colorant 1-21 was 25° C.

(Colorant 1-22: Film-Forming Promoter-Containing Cyan Colorant)

An intended colorant dispersion was obtained in the same manner as that for preparing colorant 1-21, except that C.I. Pigment Blue 15:3 (copper phthalocyanine pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 85 nm.

(Colorant 1-23: Film-Forming Promoter-Containing Magenta Colorant)

An intended colorant dispersion was obtained in the same manner as that for preparing colorant 1-21, except that C.I. Pigment Red 122 (dimethylquinacridone pigment, manufactured by Clariant) was used in place of the carbon black pigment. The mean particle size thereof was measured with a Doppler-laser particle size distribution analyzer, Microtrac UPA 150 manufactured by Leeds & Northrup, and found to be 90 nm.

(Colorant 1-24: Film-Forming Promoter-Containing Yellow Colorant)

An intended colorant dispersion was obtained in the same manner as that for preparing colorant 1-21, except that C.I. Pigment Yellow 180 (diketopyrrolopyrole, manufactured by Clariant) was used in place of the carbon black pigment. The mean particle size thereof was measured with a Doppler-laser particle size distribution analyzer, Microtrac UPA 150 manufactured by Leeds & Northrup, and found to be 80 nm.

<Preparation of Colorant of Pigment Enveloped in Cross-linked Structure-Having Polymer>

(Colorant 2-1: Black Colorant)

Prepared was a mixture of 84 parts by weight of benzyl methacrylate, 85 parts by weight of n-butyl methacrylate, 35 parts by weight of 2-hydroxyethyl methacrylate, 25 parts by weight of methacrylic acid, 13 parts by weight of glycidyl methacrylate and 20.0 parts by weight of t-hexylperoxy-2-ethyl hexanoate.

On the other hand, 300 parts by weight of methyl ethyl ketone was put into a reactor, and, while sealed in nitrogen, this was heated up to 75° C. with stirring. Then, the mixture prepared in the above was dropwise added thereto over a period of 2 hours. After the dropwise addition, this was further reacted for 20 hours at the same temperature, and then methyl ethyl ketone was evaporated away to obtain polymer (A). Through GPC, polymer (A) was found to have a weight-average molecular weight of about 13000. The acid value of polymer (A) was 76 KOH mg/g.

6 parts by weight of polymer (A) prepared in the process of producing colorant 2-1 was dissolved in 50 parts by weight of toluene added thereto. Then, 20 parts by weight of carbon black, Raven C (manufactured by Columbia Carbon) was added thereto, and dispersed in a bead mill disperser, and the beads used were removed through filtration. To the resulting filtrate, added was 0.3 parts by weight of paramenthanediamine, and dissolved by stirring with a stirrer.

Next, while stirred and exposed to ultrasonic waves, the organic solvent phase was emulsified with 60 parts by weight of ion-exchanged water dropwise added thereto. Toluene was completely removed from the resulting emulsion at 60° C. under reduced pressure, and a crosslinking reaction was carried out at 80° C. for 5 hours. Next, the pH thereof. was controlled to around 8 with potassium hydroxide, and this was filtered through a 0.4 µm filter to obtain an intended colorant dispersion. The mean particle size thereof was measured with a Doppler-laser particle size distribution analyzer, Microtrac UPA 150 manufactured by Leeds & Northrup, and found to be 180 nm. The solid content thereof was 30.5%.

(Colorant 2-2: Black Colorant)

30 parts by weight of polymer (A) prepared in the process of producing colorant 2-1 was dissolved in 100 parts by weight of toluene added thereto. Then, 20 parts by weight of carbon black, Raven C (manufactured by Columbia Carbon) was added thereto, and dispersed in a bead mill disperser, and the beads used were removed through filtration. To the resulting filtrate, added was 1.5 parts by weight of paramenthanediamine, and dissolved by stirring with a stirrer.

Next, while stirred and exposed to ultrasonic waves, the organic solvent phase was emulsified with 100 parts by weight of ion-exchanged water dropwise added thereto. Toluene was completely removed from the resulting emulsion at 60° C. under reduced pressure, and a crosslinking reaction was carried out at 80° C. for 5 hours. Next, the pH thereof was controlled to around 8 with potassium hydroxide, and this was filtered through a 0.4 µm filter to obtain an intended colorant dispersion. The mean particle size thereof was measured with a Doppler-laser particle size distribution analyzer, Microtrac UPA 150 manufactured by Leeds & Northrup, and found to be 180 nm. The solid content thereof was 34%.

A part of the dispersion was centrifuged to separate the colorant from the liquid phase, and the liquid phase was analyzed through GPC, which confirmed that the amount of the water-soluble substance derived from the polymer was 600 ppm.

(Colorant 2-3: Cyan Colorant)

Prepared was a mixture of 84 parts by weight of benzyl methacrylate, 85 parts by weight of n-butyl acrylate, 35 parts by weight of 2-hydroxyethyl methacrylate, 25 parts by weight of methacrylic acid and 20.0 parts by weight of t-hexylperoxy-2-ethyl hexanoate.

On the other hand, 300 parts by weight of methyl ethyl ketone was put into a reactor, and, while sealed in nitrogen, this was heated up to 75° C. with stirring. Then, the mixture prepared in the above was dropwise added thereto over a period of 2 hours. After the dropwise addition, this was further reacted for 20 hours at the same temperature to obtain a solution of a polymer having a weight-average molecular weight of 13000. To the polymer solution, added were 5 parts by weight of 2-methacryloyloxyethyl isocyanate (Karenzu MOI manufactured by Showa Denko), 0.1 parts by weight of dibutyltin laurate and 200 ppm of hydroquinone, and again reacted under heat at 70° C. for 5 hours to obtain polymer (B) having an unsaturated hydrocarbon group as a crosslinking reactive group.

30 parts by weight of polymer (B) was dissolved in 50 parts by weight of toluene added thereto, to which was added 20 parts by weight of C.I. Pigment Blue 15:3. The mixture was subjected to dispersion treatment with a bead mill disperser, then the beads used were removed through filtration, and the resulting filtrate was mixed with 0.3 parts by weight of diethylene glycol dimethacrylate added thereto in a mixer, and dissolved therein.

Next, while stirred and exposed to ultrasonic waves, the organic solvent phase was emulsified with 60 parts by weight of ion-exchanged water dropwise added thereto. The ion-exchanged water contained 1% by weight of a polymerization initiator, potassium persulfate, dissolved therein. The emulsion was subjected to crosslinking reaction at 75° C. for 10 hours, and toluene was completely removed therefrom at 60° C. under reduced pressure. The pH of the emulsion was controlled to around 8 with potassium hydroxide, and this was filtered through a 0.4 µm filter to obtain an intended colorant dispersion. The mean particle size thereof was measured with a Doppler-laser particle size distribution analyzer, Microtrac UPA 150 manufactured by Leeds & Northrup, and found to be 180 nm. The solid content thereof was 30.5%.

(Colorant 2-4: Magenta Colorant)

30 parts by weight of polymer (B) prepared in the process of producing colorant 2-3 was dissolved in 50 parts by weight of toluene added thereto. Then, 20 parts by weight of C.I. Pigment Red 122 and 2 parts by weight of a reactive (or polymerizable) surfactant, Adekarea Soap NE-10 manufactured by Asahi Denka, were added thereto, and the mixture was subjected to dispersion treatment in a bead mill disperser, and the beads used were removed through filtration. To the resulting filtrate, added was 2 parts by weight of diethylene glycol dimethacrylate, and dissolved by stirring with a stirrer.

Next, while stirred and exposed to ultrasonic waves, the organic solvent phase was emulsified with 60 parts by weight of ion-exchanged water dropwise added thereto. The ion-exchanged water contained 1% by weight of a polymerization initiator, potassium persulfate, dissolved therein. The emulsion was subjected to crosslinking reaction at 75° C. for 10 hours, and toluene was completely removed therefrom at 60° C. under reduced pressure. The pH of the emulsion was controlled to around 8 with potassium hydroxide, and this was filtered through a 0.4 µm filter to obtain an intended colorant dispersion. The mean particle size thereof was measured with a Doppler-laser particle size distribution analyzer, Microtrac UPA 150 manufactured by Leeds & Northrup, and found to be 150 nm. The solid content thereof was 30%.

(Colorant 2-5: Black Colorant)

Prepared was a mixture of 85 parts by weight of benzyl methacrylate, 85 parts by weight of n-butyl acrylate, 40 parts by weight of 2-hydroxyethyl methacrylate, 55 parts by weight of methacrylic acid, 15 parts by weight of glycidyl methacrylate and 20.0 parts by weight of t-hexylperoxy-2-ethyl hexanoate.

On the other hand, 300 parts by weight of methyl ethyl ketone was put into a reactor, and, while sealed in nitrogen, this was heated up to 75° C. with stirring. Then, the mixture prepared in the above was dropwise added thereto over a period of 2 hours. After the dropwise addition, this was further reacted for 20 hours at the same temperature, and then methyl ethyl ketone was evaporated away to obtain a polymer. Through GPC, the polymer was found to have a weight-average molecular weight of about 13000. The acid value of the polymer was 145 KOH mg/g.

6 parts by weight of the polymer was dissolved in 50 parts by weight of toluene added thereto. Then, 20 parts by weight of carbon black, Raven C (manufactured by Columbia Carbon), was added thereto, and the mixture was subjected to dispersion treatment in a bead mill disperser, and the beads used were removed through filtration. To the resulting filtrate, added was 0.3 parts by weight of paramenthanediamine, and dissolved by stirring with a stirrer.

Next, while stirred and exposed to ultrasonic waves, the organic solvent phase was emulsified with 60 parts by weight of ion-exchanged water dropwise added thereto. Toluene was completely removed from the resulting emulsion at 60° C. under reduced pressure, and a crosslinking reaction was carried out at 80° C. for 5 hours. Next, the pH thereof was controlled to around 8 with potassium hydroxide, and this was filtered through a 0.4 μm filter to obtain an intended colorant dispersion. The solubility parameter (δ) of the polymer was 11.0. The mean particle size was measured with a Doppler-laser particle size distribution analyzer, Microtrac UPA 150 manufactured by Leeds & Northrup, and found to be 180 nm. The glass transition temperature of the colorant was measured with a differential scanning colorimeter (DSC), DSC 200 manufactured by Seiko Electronics, and the glass transition temperature of the polymer of the colorant was found to be 21° C.

The colorant of a pigment enveloped in a crosslinked structure-having polymer can be obtained also by a different method that comprises well dispersing a pigment in an aqueous organic solvent and/or water together with a polymerizable group-having dispersant, and carrying out a polymerization reaction of the polymerizable group-having dispersant with a crosslinking monomer in the presence of a polymerization initiator in a reactor equipped with a stirrer, a thermometer, a temperature controller, a reflux condenser and a dropping funnel, at a predetermined temperature for a predetermined period of time. Examples of colorants produced according to the method are set forth below.

(Colorant 2-6: Black Colorant)

Colorant 2-6 was prepared according to the same method as in Example 1 described in Japanese Patent Laid-Open No. 316909/1998. Specifically, 50 parts by weight of carbon black (Raven C, manufactured by Columbia Carbon) and 30 parts by weight of a polymerizable surfactant of formula (IV), SE-10N (manufactured by Asahi Denka) were added to 200 parts by weight of water, exposed to ultrasonic waves, and subjected to dispersing treatment in a sand mill (manufactured by Yasukawa Seisakusho) for about 2 hours. The dispersion having carbon black dispersed in the polymerizable surfactant was put into a reactor equipped with an ultrasonic generator, a stirrer, a temperature controller, a reflux condenser and a dropping funnel. On the other hand, 16 parts by weight of acrylonitrile, 2.4 parts by weight of divinylbenzene, 1 part by weight of potassium persulfate and 100 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was controlled to have a pH of around 8 with potassium hydroxide, and then filtered through a 0.4 μm filter to remove coarse particles. Through the process, an intended colorant dispersion was obtained. The mean particle size thereof was measured with a Doppler-laser particle size distribution analyzer, Microtrac UPA 150 manufactured by Leeds & Northrup, and found to be 110 nm. The glass transition temperature of the colorant was measured with a differential scanning calorimeter (DSC), DSC 200 manufactured by Seiko Electronics, and the glass transition temperature of the polymer of the colorant was found to be 20° C.

(Colorant 2-7: Black Colorant)

An intended colorant dispersion was obtained in the same manner as above, except that a polymerizable surfactant of formula (II), Aquaron HS-10 was used in place of the polymerizable surfactant of formula (IV), Adekarea Soap SE-10 (manufactured by Asahi Denka) used in preparing colorant 2-6.

(Colorant 2-8: Magenta Colorant)

Colorant 2-8 was prepared according to the same method as in Example 1 described in Japanese Patent Laid-Open No. 316909/1998. Specifically, 50 parts by weight of C.I. Pigment Red 122 and 30 parts by weight of a polymerizable surfactant of formula (IV), SE-10N (manufactured by Asahi Denka) were added to 200 parts by weight of water, exposed to ultrasonic waves, and subjected to dispersion treatment in a sand mill (manufactured by Yasukawa Seisakusho) for about 2 hours. The dispersion having C.I. Pigment Red 122 dispersed with the polymerizable surfactant was put into a reactor equipped with an ultrasonic generator, a stirrer, a temperature controller, a reflux condenser and a dropping funnel. On the other hand, 16 parts by weight of acrylonitrile, 5 parts by weight of diallyl isophthalate, 1 part by weight of potassium persulfate and 100 parts by weight of water were mixed to prepare an emulsion. The emulsion was gradually and dropwise put into the reactor through its dropping funnel. After the dropwise addition, a polymerization reaction was carried out at 60° C. for 48 hours. The resulting colorant dispersion was controlled to have a pH of around 8 with potassium hydroxide, and then filtered through a 0.4 μm filter to remove coarse particles. Through the process, an intended colorant dispersion was obtained. The mean particle size thereof was measured with a Doppler-laser particle size distribution analyzer, Microtrac UPA 150 manufactured by Leeds & Northrup, and found to be 115 nm.

(Colorant 2-9: Cyan Colorant)

50 parts by weight of C.I. Pigment Blue 15:3 and 30 parts by weight of a polymerizable surfactant of formula (IV), SE-10N (manufactured by Asahi Denka) were added to 300 parts by weight of water in a reactor equipped with an ultrasonic generator, a stirrer, a temperature controller, a reflux condenser and a dropping funnel, and ultrasonically dispersed for 4 hours. Next, 16 parts by weight of 2-acrylamido-2-methylpropanesulfonic acid, 3 parts by weight of acrylonitrile, 5 parts by weight of divinylbenzene and 0.5 parts by weight of potassium persulfate were added thereto, and a polymerization reaction was carried out at 60° C. for 48 hours. The pH thereof was controlled to around 8 with potassium hydroxide, and this was filtered through a 0.4 μm filter to remove coarse particles. The process gave an intended colorant dispersion.

(Colorant 2-10: Black Colorant)

50 parts by weight of carbon black (Raven C, manufactured by Columbia Carbon) and 30 parts by weight of a polymerizable surfactant of formula (IV), SE-10N (manufactured by Asahi Denka) were added to 800 parts by weight of water in a reactor equipped with an ultrasonic generator, a stirrer, a temperature controller, a reflux condenser and a dropping funnel, and ultrasonically dispersed for 4 hours. Next, 16 parts by weight of acrylonitrile, 2.4 parts by weight of divinylbenzene, 5 parts by weight of fumaric acid and 0.5 parts by weight of potassium persulfate were added thereto, and a polymerization reaction was carried out at 60° C. for 48 hours. The pH thereof was controlled to around 8 with potassium hydroxide, and this was filtered through a 0.4 μm filter to remove coarse particles. The process gave an intended colorant dispersion. The acid value of the colorant was 126 KOH mg/g.

(Colorant 2-11: Black Colorant)

50 parts by weight of carbon black (Raven C, manufactured by Columbia Carbon) and 30 parts by weight of a polymerizable surfactant of formula (IV), SE-10N (manufactured by Asahi Denka) were added to 800 parts by weight of water in a reactor equipped with an ultrasonic generator, a stirrer, a temperature controller, a reflux condenser and a dropping funnel, and ultrasonically dispersed for 4 hours. Next, 16 parts by weight of acrylonitrile, 2.4 parts by weight of divinylbenzene and 0.5 parts by weight of potassium persulfate were added thereto, and a polymerization reaction was carried out at 60° C. for 48 hours. The pH thereof was controlled to around 8 with potassium hydroxide, and this was filtered through a 0.4 μm filter to remove coarse particles. The process gave an intended colorant dispersion. The acid value of the colorant was 45 KOH mg/g. The solubility parameter (δ) of the polymer was 13.7.

(Colorant 2-12: Black Colorant)

50 parts by weight of carbon black (Raven C, manufactured by Columbia Carbon) and 30 parts by weight of a polymerizable surfactant of formula (IV), SE-10N (manufactured by Asahi Denka) were added to 800 parts by weight of water in a reactor equipped with an ultrasonic generator, a stirrer, a temperature controller, a reflux condenser and a dropping funnel, and ultrasonically dispersed for 4 hours. Next, 16 parts by weight of acrylonitrile, 2.4 parts by weight of divinylbenzene, 3 parts by weight of fumaric acid and 0.5 parts by weight of potassium persulfate were added thereto, and a polymerization reaction was carried out at 60° C. for 48 hours. The pH thereof was controlled to around 8 with potassium hydroxide, and this was filtered through a 0.4 μm filter to remove coarse particles. The process gave an intended colorant dispersion. The acid value of the colorant was 95 KOH mg/g. The solubility parameter (δ) of the polymer was 13.9.

(Colorant 2-13: Magenta Colorant)

10 parts by weight of C.I. Pigment Red 122 and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The dispersion was put into a reactor equipped with an ultrasonic generator, a stirrer, a temperature controller, a reflux condenser and a dropping funnel. On the other hand, 1 part by weight of benzyl methacrylate, 2 parts by weight of n-butyl methacrylate, 0.2 parts by weight of dicyclopentanyl dimethacrylate, 1 part by weight of methacrylic acid, 0.1 parts by weight of the same polymerizable surfactant as above, 0.05 parts by weight of potassium persulfate and 10 parts by weight of water were mixed to prepare an emulsion. This was gradually and dropwise put into the reactor through its dropping funnel. After the dropwise addition, a polymerization reaction was carried out at 60° C. for 48 hours. The resulting colorant dispersion was controlled to have a pH of around 8 with potassium hydroxide, and then filtered through a 0.4 μm filter to remove coarse particles. The process gave an intended colorant dispersion. The acid value thereof was 100 KOH mg/g.

(Colorant 2-14: Magenta Colorant)

10 parts by weight of C.I. Pigment Red 122 and 6 parts by weight of a polymerizable surfactant of formula (IV), SE-10N (manufactured by Asahi Denka) were added to 160 parts by weight of water, exposed to ultrasonic waves, and dispersed in a sand mill (manufactured by Yasukawa Seisakusho) for about 2 hours. The dispersion was put into a reactor equipped with an ultrasonic generator, a stirrer, a temperature controller, a reflux condenser and a dropping funnel. On the other hand, 1 part by weight of benzyl methacrylate, 2 parts by weight of n-butyl methacrylate, 0.2 parts by weight of 1,6-hexanediol dimethacrylate, 2 parts by weight of methacrylic acid, 0.1 parts by weight of the same polymerizable surfactant as above, 0.05 parts by weight of potassium persulfate and 10 parts by weight of water were mixed to prepare an emulsion. This was gradually and dropwise put into the reactor through its dropping funnel. After the dropwise addition, a polymerization reaction was carried out at 60° C. for 48 hours. The resulting colorant dispersion was controlled to have a pH of around 8 with potassium hydroxide, and then filtered through a 0.4 μm filter to remove coarse particles. The process gave an intended colorant dispersion. The acid value thereof was 165 KOH mg/g. The solubility parameter (δ) of the polymer was 11.0.

(Colorant 2-15: Cyan Colorant)

50 parts by weight of C.I. Pigment Blue 15:3 and 30 parts by weight of a polymerizable surfactant of formula (IV), SE-10N (manufactured by Asahi Denka) were added to 800 parts by weight of water in a reactor equipped with an ultrasonic generator, a stirrer, a temperature controller, a reflux condenser and a dropping funnel, and ultrasonically dispersed for 4 hours. Next, 16 parts by weight of 2-acrylamido-2-methylpropanesulfonic acid, 3 parts by weight of acrylonitrile, 5 parts by weight of divinylbenzene and 0.5 parts by weight of potassium persulfate were added thereto, and a polymerization reaction was carried out at 60° C. for 48 hours. The colorant dispersion was controlled to have a pH of around 8 with potassium hydroxide, and this was filtered through a 0.4 μm filter to remove coarse particles. The process gave an intended colorant dispersion. The acid value of the colorant was 98 KOH mg/g.

(Colorant 2-16: Cyan Colorant)

50 parts by weight of C.I. Pigment Blue 15:3 and 20 parts by weight of a polymerizable surfactant of formula (IV), SE-10N (manufactured by Asahi Denka) were added to 800 parts by weight of water in a reactor equipped with an ultrasonic generator, a stirrer, a temperature controller, a reflux condenser and a dropping funnel, and ultrasonically dispersed for 4 hours. Next, 12 parts by weight of acrylonitrile, 30 parts by weight of 2-acrylamido-2-methylpropanesulfonic acid, 45 parts by weight of benzyl methacrylate, 45 parts by weight of n-butyl methacrylate and 0.5 parts by weight of potassium persulfate were added thereto, and a polymerization reaction was carried out at 60° C. for 48 hours. The colorant dispersion was controlled to have a pH of around 8 with potassium hydroxide, and this was filtered through a 0.4 μm filter to remove coarse particles. The process gave an intended colorant dispersion. The acid value of the colorant was 137 KOH mg/g. The solubility parameter (δ) of the polymer was 11.1

<Preparation of Colorant of Dye Enveloped in Polymer (Copolymer) of Polymerizable Group-Having Dispersant and Monomer (Copolymerizable Monomer)>

Examples of colorants using a disperse dye as the dye are set forth below. Water-insoluble dyes can be preferably used.

Also, oil-soluble dyes, vat dyes, sulfide dyes, organic solvent-soluble dyes, and reactive dyes can be used.

(Colorant 3-1: Black Colorant)

100 parts by weight of ion-exchanged water was put into a reactor equipped with an ultrasonic generator, a stirrer, a temperature controller, a reflux condenser and a dropping funnel. While it was stirred at 70° C. in a nitrogen atmosphere, 0.2 parts by weight of a polymerization initiator, potassium persulfate, was added thereto, and kept at the temperature. In a different vessel, 25 parts by weight of styrene, 20 parts by weight of benzyl methacrylate, 35 parts by weight of n-butyl acrylate and 5 parts by weight of methacrylic acid were mixed and dissolved to prepare a monomer solution. 130 parts by weight of a disperse dye, Disperse Black 1, was added to the monomer solution and dissolved therein. To this were added 300 parts by weight of ion-exchanged water and 3 parts by weight of a polymerizable surfactant (polymerizable group-having dispersant), Adekarea Soap SE-10N (manufactured by Asahi Denka), and ultrasonically stirred for 30 minutes to prepare an emulsion. The emulsion was dropwise added to the reactor, and after the dropwise addition, a polymerization reaction was carried out at the above-describe temperature for 8 hours. The colorant dispersion thus obtained was neutralized to have a pH of around 8 with potassium hydroxide, and then filtered through a 0.4 μm filter to remove coarse particles. The process gave an intended colorant dispersion. The mean particle size thereof was measured with a Doppler-laser particle size distribution analyzer, Microtrac UPA 150 manufactured by Leeds & Northrup, and found to be 120 nm. The glass transition temperature of the colorant was measured with a differential scanning calorimeter (DSC), DSC 200 manufactured by Seiko Electronics, and the glass transition temperature of the polymer of the colorant was found to be 13° C.

(Colorant 3-2: Cyan Colorant)

An intended colorant dispersion was obtained in the same manner as that for preparing colorant 3-1, except that Disperse Blue 3 was used in place of Disperse Black 1. The glass transition temperature of the polymer of colorant 3-2 was 13° C.

(Colorant 3-3: Magenta Colorant)

An intended colorant dispersion was obtained in the same manner as that for preparing colorant 3-1, except that Disperse Red 60 was used in place of Disperse Black 1. The glass transition temperature of the polymer of colorant 3-3 was 13° C.

(Colorant 3-4: Yellow Colorant)

An intended colorant dispersion was obtained in the same manner as that for preparing colorant 3-1, except that Disperse Yellow 3 was used in place of Disperse Black 1. The glass transition temperature of the polymer of colorant 3-4 was 13° C.

(Colorant 3-5: Film-Forming Promoter-Containing Black Colorant)

100 parts by weight of ion-exchanged water was put into a reactor equipped with a dropping unit, a thermometer, a water-cooling reflux condenser and a stirrer. While it was stirred at 70° C. in a nitrogen atmosphere, 0.2 parts by weight of a polymerization initiator, potassium persulfate was added thereto, and kept at the temperature. On the other hand, 130 parts by weight of a disperse dye 1 was dissolved in a monomer solution comprising 15 parts by weight of styrene, 2 parts by weight of glycidyl methacrylate, 16 parts by weight of benzyl methacrylate, 50 parts by weight of n-butyl methacrylate, 15 parts by weight of a film-forming promoter, ADEKA PLANON MPC-709 (manufactured by Asahi Denka) and 0.02 parts by weight of t-dodecylmercaptan, and this was added to 80 parts by weight of ion-exchanged water having added thereto 0.05 parts by weight of sodium laurylsulfate, to prepare an emulsion. The emulsion was dropwise added to the reactor kept at 70° C., through its dropping funnel. After the dropwise addition, the pH thereof was controlled to around 8 with potassium hydroxide. This was filtered through a 0.4 μm filter to remove coarse particles to obtain an intended colorant dispersion. The glass transition temperature of the colorant was measured with a differential scanning calorimeter (DSC), DSC 200 manufactured by Seiko Electronics, and found to be 25° C.

(Colorant 3-6: Cyan Colorant)

An intended colorant dispersion was obtained in the same manner as that for preparing colorant 3-5, except that Disperse Blue 3 was used in place of Disperse Black 1.

(Colorant 3-7: Magenta Colorant)

An intended colorant dispersion was obtained in the same manner as that for preparing colorant 3-5, except that Disperse Red 60 was used in place of Disperse Black 1.

(Colorant 3-8: Yellow Colorant)

An intended colorant dispersion was obtained in the same manner as that for preparing colorant 3-5, except that Disperse Yellow 3 was used in place of Disperse Black 1.

<Preparation of Colorant of Pigment Enveloped in Polymer>

(Colorant 4-1: Black Pigment Prepared Through Phase Conversion Emulsification)

A colorant of a pigment enveloped in a polymer was prepared in the same manner as that described in Japanese Patent Laid-Open No. 191972/2000. Specifically, 20 parts by weight of a polymerization catalyst, methyl ethyl ketone, 15 parts by weight of styrene, 12 parts by weight of n-butyl acrylate, 3 parts by weight of 2-hydroxyethyl methacrylate, 6 parts by weight of silicone macromer FM-0711 manufactured by Chisso, 5 parts by weight of styrene-acrylonitrile macromer AN-6 manufactured by To a Gosei, 5 parts by weight of dimethylaminoethyl methacrylate, and 0.6 parts by weight of a polymer chain transfer agent, n-dodecylmercaptan were fed into a reactor equipped with a stirrer, a temperature controller, a reflux condenser and a dropping funnel, and well purged with nitrogen. On the other hand, 15 parts by weight of styrene, 12 parts by weight of n-butyl acrylate, 3 parts by weight of 2-hydroxyethyl methacrylate, 6 parts by weight of silicone macromer FM-0711 manufactured by Chisso, 5 parts by weight of styrene-acrylonitrile macromer AN-6 manufactured by Toa Gosei, 5 parts by weight of dimethylaminoethyl methacrylate, 2.4 parts by weight of a polymer chain transfer agent, n-dodecylmercaptan in 60 parts by weight of methyl ethyl ketone, and 0.1 parts by weight of a polymerization initiator, 2,2'-azobis(2, 4-dimethylvaleronitrile) were dissolved in 5 parts by weight of methyl ethyl ketone in a separate vessel. This was put into the reactor, reacted at 65° C. for 2 hours, and then aged at 70° C. for 2 hours to obtain a methyl ethyl ketone solution of a copolymer. The number-average molecular weight of the copolymer was about 10,000 (measured through gel permeation chromatography). The copolymer solution was dried under reduced pressure to isolate the copolymer. 20 parts by weight of the copolymer was dissolved in 100 parts by weight of methyl ethyl ketone, to which was added aqueous 30% gluconic acid to partially neutralize the salt-forming group of the copolymer. 400 parts by weight of ion-exchanged water and 80 parts by weight of carbon black were added thereto, and kneaded in a bead mill. From the mixture, the organic solvent was completely removed at 60° C. under reduced pressure. This was filtered through a 0.4 µm filter to remove coarse particles to obtain an intended colorant dispersion. The mean particle size thereof was measured with a Doppler-laser particle size distribution analyzer, Microtrac UPA 150 manufactured by Leeds & Northrup, and found to be 120 nm. The glass transition temperature of the colorant was measured with a differential scanning calorimeter (DSC), DSC 200 manufactured by Seiko Electronics, and the glass transition temperature of the polymer of the colorant was 8° C.

(Colorant 4-2: Black Pigment Prepared Through Phase Conversion Emulsification)

A colorant of a pigment enveloped in a polymer was prepared in the same manner as that described in Japanese Patent Laid-Open No. 43636/1999. Specifically, 300 parts by weight of methyl ethyl ketone was fed into a flask reactor equipped with a stirrer, a temperature controller, a reflux condenser and a dropping funnel, and heated up to 75° C. with stirring in a nitrogen atmosphere. On the other hand, 50 parts by weight of styrene, 150 parts by weight of n-butyl methacrylate, 70 parts by weight of butyl acrylate, 35 parts by weight of 2-hydroxyethyl methacrylate, 25 parts by weight of methacrylic acid, and 6.5 parts by weight of a polymerization initiator, Perbutyl O (tert-butyl peroxyoctoate by Nippon Yushi) were mixed in a separate vessel, and the resulting mixture was fed into the dropping funnel of the reactor and dropwise added to the reactor over a period of 2 hours. After the dropwise addition, this was reacted for 15 hours at the temperature to obtain a methyl ethyl ketone solution of a carboxyl group-having vinyl copolymer. The acid value of the solid component of the copolymer solution was 70 KOH mg/g; and the number-average molecular weight of the copolymer was about 12500 (measured through gel permeation chromatography). Next, 15 parts by weight of C.I. Pigment Blue 15:3, 15 parts by weight of the carboxyl group-having vinyl copolymer solution in methyl ethyl ketone, 0.8 parts by weight of dimethylethanolamine, and 44.2 parts by weight of ion-exchanged water were mixed with stirring to prepare a primary mixture, and this was put into a bead mill to disperse it. The dispersion was diluted two-fold with water added thereto. While this was stirred with a stirrer, 1 N HCl was added thereto to make it have pH of from 3 to 5. Through the process, the carboxyl group-having vinyl copolymer in the dispersion was insolubilized and fixed to the C.I. Pigment Blue 15:3. The process thus gave a dispersion of C.I. Pigment Blue 15:3 enveloped in a carboxyl group-having vinyl copolymer. This was filtered under suction, and the residue was washed with water to obtain a wet cake of C.I. Pigment Blue 15:3 enveloped in the carboxyl group-having vinyl copolymer. While the wet cake was stirred with a stirrer, aqueous 10% sodium hydroxide solution was added thereto to make it have pH of from 8.5 to 9.5. This was further stirred for 1 hour, and water was added thereto to make it have a nonvolatile content of 25%. Filtered through a 0.4 µm filter to remove coarse particles, this gave an intended colorant dispersion. The mean particle size thereof was measured with a Doppler-laser particle size distribution analyzer, Microtrac UPA 150 manufactured by Leeds & Northrup, and found to be 100 nm. The glass transition temperature of the colorant was measured with a differential scanning calorimeter (DSC), DSC 200 manufactured by Seiko Electronics, and the glass transition temperature of the polymer of the colorant was 16° C.

<Preparation of Colorant of Oil-Soluble Dye Enveloped in Crosslinked Structure-Having Polymer>

(Colorant 5-1: Cyan Colorant)

30 parts by weight of polymer (A) prepared for colorant 2-1 was dissolved in 100 parts by weight of toluene added thereto, and 20 parts by weight of an oil-soluble dye, Vail Fast Blue 2606 (by Orient Chemical) was added thereto and dispersed with a bead mill disperser. The beads used were removed through filtration, and 1.5 parts by weight of paramenthanediamine was added to the filtrate and dissolved by stirring with a stirrer.

Next, while stirred and exposed to ultrasonic waves, the organic solvent phase was emulsified with 100 parts by weight of ion-exchanged water dropwise added thereto. Toluene was completely removed from the resulting emulsion at 60° C. under reduced pressure, and a crosslinking reaction was carried out at 80° C. for 5 hours. Next, the pH thereof was controlled to around 8 with potassium hydroxide, and this was filtered through a 0.4 µm filter to obtain an intended colorant dispersion. The mean particle size thereof was measured with a Doppler-laser particle size distribution analyzer, Microtrac UPA 150 manufactured by Leeds & Northrup, and found to be 180 nm. The solid content was 34%.

<Preparation of Pigment Having Polymer Group Bonded to Its Surface>

(Colorant 6-1: Black Pigment)

An intended pigment having a polymer group bonded to its surface was prepared according to the method described in Example III and Example IV in WO995169 and Japanese Patent Laid-Open No. 95987/2000. The details thereof are described below.

11.4 g of sodium nitrite, 28.0 g of sulfanilic acid and 1200 g of 0° C. water were fed into a reactor to form diazonium sulfanilate, to which was added 200 g of a carbon black pigment, Raven C. When the generation of nitrogen ceased, the reaction mixture was concentrated, and further reacted at an elevated temperature. The resulting mixture was extracted with ethanol for 12 hours in a Soxhlet's extractor to remove unreacted compounds and side products, and this was again dissolved in water and filtered to obtain a dispersion of about 20 wt. % sulfanilate-processed carbon black pigment. On the other hand, 3.6 g of aminostyrene, 2.1 g of sodium nitrite and 150 g of water were fed into a separate reactor to form a diazonium salt of 4-aminostyrene, and this was dissolved in 10 g of ethanol. The sulfanilate-processed carbon black pigment dispersion was added to the diazonium salt solution and reacted for 18 hours with stirring. Then, this was filtered and purified through Soxhlet extraction to obtain a dispersion of a carbon black pigment having 4-aminostyrene added to its surface. Next, 30 g of deionized water was degassed in a nitrogen atmosphere at 90° C. in a reactor, and a mixture of 28.13 g of the 4-aminostyrene-added carbon black pigment dispersion, 2.0 g of methyl methacrylate, 2.0 g of butyl acrylate, and 1.0 g of polyethylene glycol 2000 monomethyl ether acrylate dissolved in 3.0 g of deionized water was dropwise added thereto over a period of 20 minutes. 0.22 g of potassium persulfate was added thereto and reacted at 80° C. for 18 hours. The resulting product was concentrated under reduced pressure, and extracted with acetone in an Soxhlet's extractor to remove the non-added polymer. The process gave an intended dispersion of a pigment having a polymer group bonded to its surface.

<Preparation of Inks>

Inks having the composition set forth below (see Table 1 to Table 32) were produced according to the following process. An aqueous medium prepared beforehand was gradually and dropwise added to the above-obtained dispersion of the colorant with stirring. After the dropwise addition, this was fully stirred, and filtered through a 5 μm membrane filter to obtain an ink.

In Table 1 below, "Ex. 1" indicates the ink of Example 1; and "Comp. 1" indicates the ink of Comparative Example 1. The same shall apply to the other example numbers in Table 1 and also to the example numbers in the other Tables.

In Tables 1 to 32 below, the numerals relating to the compositions of the inks indicate the contents of the respective constituent components in terms of % by weight with respect to the whole amount of each ink composition. The colorant is added in the form of a dispersion. Accordingly, the amount of the colorant dispersion added is calculated from the colorant content in the ink and from the solid concentration of the colorant dispersion.

Olfin E1010 (manufactured by Nisshin Chemical Industry), Olfin STG (manufactured by Nisshin Chemical Industry), and Surfynol 465 (manufactured by Air Product) are acetylene glycol surfactants. Surfynol 61 (manufactured by Air Product) is an acetylene alcohol surfactant.

The surface tension in Tables 1 to 31 below was measured with an automatic surface tension balance, Model CBVP-Z manufactured by Kyowa Kaimen Gagaku.

The inks of the Examples all have ΔSP of at least 1.0 cal/cm$^3$.

Regarding the colorants, the compounds of formula (1) and the compounds of formula (2), the numeral in the upper row indicates the content thereof, and the code in the lower row indicates the kind of the colorant, the compound of formula (1) or the compound of formula (2).

Specifically, the codes of the compounds shown in the Tables are as follows:

[1-1]: compound of formula (1), wherein R is neopentyl group, n is 1.0, m is 1.5, and M is hydrogen atom.

[1-2]: compound of formula (1), wherein R is t-butyl group, n is 1.0, m is 2.0, and M is hydrogen atom.

[1-3]: compound of formula (1), wherein R is 1,3-dimethylbutyl group, n is 0, m is 4.5, and M is hydrogen atom.

[1-4]: compound of formula (1), wherein R is isobutyl group, n is 3.0, m is 1.0, and M is hydrogen atom.

[1-5]: compound of formula (1), wherein R is a mixture of 50% n-hexyl group and 50% 2-ethylhexyl group; n and m for n-hexyl are 4.0 and 1.0, respectively, and n and m for 2-ethylhexyl are 2.0 and 1.0, respectively; and M is potassium phosphate for both n-hexyl and 2-ethylhexyl.

[1-6]: compound of formula (1), wherein R is 1,1-dimethylbutyl, n is 7.0, m is 1.0, and M is sodium borate.

[1-7]: compound of formula (1), wherein R is a mixture of 50% cyclohexyl group and 50% n-heptyl group; n, m and M for cyclohexyl are 9.0, 1.0 and sodium sulfonate, respectively; and n, m and M for n-heptyl are 3.5, 2.0 and potassium phosphate, respectively.

[1-8]: compound of formula (1), wherein R is a mixture of is 50% neopentyl group, 30% n-pentyl group and 20% isopentyl group; n, m and M for neopentyl are 0, 1.0 and K$^+$, respectively; n, m and M for n-pentyl are 2.5, 1.0 and ammonium sulfonate, respectively; and n, m and M for isopentyl are 3.0, 1.5 and hydrogen atom, respectively.

[1-9]: compound of formula (1), wherein R is a mixture of 50% cyclohexyl group and 50% n-heptyl group; k, m and M for cyclohexyl are 9.0, 1.0 and ammonium borate, respectively; and k, m and M for n-heptyl are 3.5, 2.0 and triethanolamine borate, respectively.

[1-10]: compound of formula (1), wherein R is a mixture of 50% n-hexyl group and 50% 2-ethylhexyl group; n and m for n-hexyl are 4.0 and 1.0, respectively; n and m for 2-ethylhexyl are 2.0 and 1.0, respectively; and M is triethanolamine sulfonate for both h-hexyl and 2-ethylhexyl.

[1-11]: compound of formula (1), wherein R is a mixture of 50% cyclohexyl group and 50% n-heptyl group; n, m and M for cyclohexyl are 9.0, 1.0 and potassium borate, respectively; and n, m and M for n-heptyl are 3.5, 2.0 and ammonium borate, respectively.

[1-12]: compound of formula (1), wherein R is a mixture of 50% neopentyl group, 30% n-pentyl group and 20% isopentyl group; n, m and M for neopentyl are 0, 1.0 and K$^+$, respectively; n, m and M for n-pentyl are 2.5, 1.0 and ammonium sulfonate, respectively; and n, m and M for isopentyl are 3.0, 1.5 and sodium phosphate, respectively.

[1-13]: compound of formula (1), wherein R is a mixture of 50% n-hexyl group and 50% 2-ethylhexyl group; k and m for n-hexyl are 4.0 and 1.0, respectively; k and m for 2-ethylhexyl are 2.0 and 1.0, respectively; and M is potassium borate for both n-hexyl and 2-ethylhexyl.

[1-14]: compound of formula (1), wherein R is a mixture of 50% n-butyl group and 50% n-heptyl group; k, m and M for n-butyl are 9.0, 1.0 and ammonium phosphate, respectively; and k, m and M for n-heptyl are 3.5, 2.0 and triethanolamine phosphate, respectively.

[1-15]: compound of formula (1), wherein R is a mixture of 50% cyclohexyl group and 50% n-heptyl group; k, m and M for cyclohexyl are 9.0, 1.0 and ammonium borate, respectively; and k, m and M for n-heptyl are 3.5, 2.0 and triethanolamine borate, respectively.

[1-16]: compound of formula (1), wherein R is neopentyl group, n is 1.0, m is 1.5, and M is sodium.

[1-17]: compound of formula (1), wherein R is t-butyl group, n is 1.0, m is 2.0, and M is triethanolamine.

[1-18]: compound of formula (1), wherein R is isobutyl group, n is 3.0, m is 1.0, and M is ammonia.

[1-19]: 1:1 mixture of compound of formula (1) wherein R is n-hexyl group, n is 4.0 and m is 1.0 and compound of formula (1) wherein R is 2-ethylhexyl group, n is 2.0 and m is 1.0, in both of which M is potassium.

[1-20]: compound of formula (1), wherein R is a mixture of 50% cyclohexyl group and 50% n-heptyl group; n, m and M for cyclohexyl are 9.0, 1.0 and hydrogen atom, respectively; and n, m and M for h-heptyl is 3.5, 2.0 and sodium phosphate, respectively.

[1-21]: compound of formula (1), wherein R is a mixture of 50% neopentyl group, 30% n-pentyl group and 20% isopentyl group; n, m and M for neopentyl are 0, 1.0 and K$^+$, respectively; n, m and M for n-pentyl are 2.5, 1.0 and ammonium borate, respectively; and n, m and M for isopentyl are 3.0, 1.5 and hydrogen atom, respectively.

[1-22]: compound of formula (1), wherein R is a mixture of 50% n-hexyl group and 50% 2-ethylhexyl group mixed; n and m for n-hexyl are 4.0 and 1.0, respectively; n and m for 2-ethylhexyl are 2.0 and 1.0, respectively; and M is potassium sulfonate for both n-hexyl and 2-ethylhexyl.

[1-23]: compound of formula (1), wherein R is a mixture of 50% cyclohexyl group and 50% n-heptyl group; n, m and M for cyclohexyl are 9.0, 1.0 and hydrogen atom, respectively; n, m and M for n-heptyl are 3.5, 2.0 and sodium phosphate, respectively.

[1-24]: compound of formula (1), wherein R is a mixture of 50% neopentyl group, 30% n-pentyl group and 20% isopentyl group; n, m and M for neopentyl are 0, 1.0 and K$^+$, respectively; n, m and M for n-pentyl are 2.5, 1.0 and ammonium borate, respectively; and n, m and M for isopentyl are 3.0, 1.5 and hydrogen atom, respectively.

[1-25]: compound of formula (1), wherein R is a mixture of 50% cyclohexyl group and 50% n-heptyl group; n, m and M for cyclohexyl are 9.0, 1.0 and sodium borate, respectively; and n, m and M for n-heptyl are 3.5, 2.0 and ammonium borate, respectively.

[2-1]: compound of formula (2), wherein n is 2, and EP is ethyleneoxy alone.

[2-2]: compound of formula (2), wherein n is 0.8, and EP is ethyleneoxy alone.

[2-3]: compound of formula (2), wherein n is 4, and EP is ethyleneoxy and propyleneoxy in a ratio of 3:1.

[2-4]: compound of formula (2), wherein n is 1.5, and EP is ethyleneoxy alone.

[2-5]: compound of formula (2), wherein n is 2.8, and EP is ethyleneoxy alone.

[2-6]: compound of formula (2), wherein n is 3.5, and EP is ethyleneoxy alone.

[2-7]: compound of formula (2), wherein n is 10, and EP is ethyleneoxy alone.

[2-8]: compound of formula (2), wherein n is 4.5, and EP is ethyleneoxy alone.

[2-9]: compound of formula (2), wherein n is 4, and EP is ethyleneoxy alone.

[2-10]: compound of formula (2), wherein n is 5, and EP is ethyleneoxy and propyleneoxy in a ratio of 3:1.

[2-11]: compound of formula (2), wherein n is 3, and EP is ethyleneoxy alone.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| colorant | 7.5 | 4.5 | 5.5 | 5.0 | 7.5 | 4.5 | 5.5 | 5.0 |
|  | 1-1 | 1-2 | 1-3 | 1-4 | 1-1 | 1-2 | 1-3 | 1-4 |
| Olfin E1010 | 1.0 |  |  |  |  | 0.5 |  |  |
| Olfin STG |  |  | 1.0 |  |  |  |  | 0.7 |
| Surfynol 465 |  | 1.2 |  |  |  |  |  |  |
| Surfynol 61 |  |  |  | 0.5 | 1.0 | 1.0 | 0.5 | 0.3 |
| DEGmBE | 5.0 |  |  |  | 5.0 |  |  |  |
| TEGmBE |  | 10.0 |  | 5.0 |  |  | 4.0 |  |
| PGmBE |  |  |  |  |  |  | 1.0 |  |
| 1,2-pentanediol |  |  |  | 2.0 |  |  |  |  |
| 1,2-hexanediol |  | 3.0 | 5.0 | 3.0 |  | 5.0 |  | 5.0 |
| 1,6-hexanediol |  |  | 5.0 |  |  |  |  |  |
| glycerin | 14.0 | 9.0 | 9.0 | 14.0 | 14.0 | 9.0 | 12.0 | 12.0 |
| diethylene glycol |  | 5.0 | 7.0 |  |  | 5.0 |  |  |
| thiodiglycol |  |  | 3.5 |  |  |  | 3.5 |  |
| trimethylolpropane |  |  |  |  |  |  |  | 1.0 |
| 1,3-dimethyl-2-imidazolidinone |  |  |  | 2.0 | 2.0 | 2.0 | 2.0 | 2.0 |
| triethanolamine | 0.8 | 0.9 | 1.0 | 0.7 |  |  | 0.9 | 0.9 |
| potassium hydroxide |  |  | 0.1 |  | 0.1 | 0.1 |  |  |
| Proxel XL-2 | 0.03 | 0.03 | 0.03 | 0.03 | 0.03 | 0.03 | 0.03 | 0.03 |
| benzotriazole | 0.02 | 0.02 | 0.02 | 0.02 | 0.02 | 0.02 | 0.02 | 0.02 |
| water | balance | balance | balance | balance | balance | balance | balance | balance |
| surface tension (mN/m) | 34 | 32 | 34 | 34 | 35 | 33 | 32 | 32 |

TABLE 2

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Colorant | 7.0 | 7.0 | 7.5 | 4.5 | 5.5 | 7.5 | 7.5 | 5.5 |
|  | 1-1 | 1-1 | 1-1 | 1-2 | 1-3 | 1-1 | 1-1 | 1-1 |
| Olfin E1010 |  |  | 1.0 |  |  | 1.0 |  |  |
| Olfin STG |  | 1.0 |  |  | 1.0 |  |  |  |
| Surfynol 465 | 0.5 |  |  | 1.2 |  |  |  |  |
| Surfynol 61 | 0.6 |  |  |  |  |  |  |  |
| DEGmBE | 4.0 |  |  | 2.5 | 7.0 |  |  |  |
| TEGmBE |  |  | 5.0 |  |  |  | 8.0 |  |
| PGmBE |  | 2.0 |  |  |  |  |  |  |
| DPGmBE | 1.0 |  |  |  | 3.0 |  |  |  |
| 1,2-hexanediol | 3.0 | 7.0 | 5.0 | 4.5 | 1.0 |  |  | 5.0 |
| 1,6-hexanediol |  |  |  |  | 5.0 |  |  |  |
| Glycerin | 10.0 | 10.0 | 12.0 | 10.0 | 10.0 | 12.0 | 12.0 | 12.0 |
| diethylene glycol |  | 2.0 |  |  | 7.0 |  |  |  |
| tetraethylene glycol |  |  |  | 5.0 |  |  |  |  |
| Thiodiglycol |  | 3.0 |  |  | 3.5 |  |  |  |
| 1,3-dimethyl-2-imidazolidinone | 2.0 |  |  |  |  |  |  |  |
| Triethanolamine | 0.9 |  | 0.8 | 0.9 | 0.9 | 0.8 | 0.8 | 0.8 |
| potassium hydroxide |  | 0.1 |  |  |  |  |  |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 30 | 32 | 33 | 33 | 32 | 33 | 35 | 34 |

TABLE 3

|  | Ex. 17 | Ex. 18 | Ex. 19 | Ex. 20 | Ex. 21 | Ex. 22 | Ex. 23 | Ex. 24 |
|---|---|---|---|---|---|---|---|---|
| Colorant | 7.5 | 7.5 | 7.5 | 7.5 | 7.5 | 7.5 | 7.5 | 7.5 |
|  | 1-1 | 1-1 | 1-1 | 1-1 | 1-1 | 1-1 | 1-1 | 1-5 |
| Olfin E1010 |  |  |  |  |  | 1.0 |  | 1.0 |
| Surfynol 61 | 0.5 |  |  |  |  | 0.5 |  |  |
| DEGmBE |  | 8.0 |  |  |  |  |  | 5.0 |
| TEGmBE |  |  |  | 5.0 |  |  | 3.0 |  |
| PGmBE |  |  |  |  | 1.0 |  |  |  |
| 1,2-pentanediol |  |  | 4.0 |  |  | 2.0 |  |  |
| 1,2-hexanediol |  |  |  |  |  | 3.0 | 5.0 |  |
| Glycerin | 12.0 | 12.0 | 12.0 | 12.0 | 12.0 | 12.0 | 12.0 | 14.0 |
| 1,3-dimethyl-2-imidazolidinone | 2.0 |  |  | 2.0 |  | 1.0 |  |  |
| Triethanolamine | 0.8 | 0.8 | 0.8 | 0.8 | 0.8 |  |  | 0.8 |
| potassium hydroxide |  |  |  |  |  |  | 0.10 | 0.10 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 35 | 35 | 34 | 36 | 34 | 31 | 36 | 34 |

TABLE 4

|  | Ex. 25 | Ex. 26 | Ex. 27 | Ex. 28 | Ex. 29 | Ex. 30 | Ex. 31 | Ex. 32 |
|---|---|---|---|---|---|---|---|---|
| Colorant | 4.5 | 5.5 | 5.0 | 7.5 | 4.5 | 5.5 | 3.0 | 5.0 |
|  | 1-6 | 1-7 | 1-8 | 1-20 | 1-20 | 1-20 | 3-1 | 3-2 |
| Olfin E1010 |  |  |  | 0.5 | 1.0 |  |  | 1.0 |
| Olfin STG |  | 1.0 |  |  |  | 0.5 | 1.0 |  |
| Surfynol 465 | 1.2 |  |  |  | 1.2 |  |  |  |
| Surfynol 61 |  |  | 0.5 |  |  |  |  |  |
| DEGmBE |  |  |  | 5.0 |  |  | 7.0 |  |
| TEGmBE | 10.0 |  | 5.0 |  | 10.0 |  |  | 6.0 |
| PGmBE |  |  |  |  |  |  | 2.0 |  |
| 1,2-pentanediol |  |  | 2.0 |  |  |  |  |  |
| 1,2-hexanediol | 3.0 | 5.0 | 3.0 |  |  | 1.0 |  | 2.0 |
| 1,6-hexanediol |  | 5.0 |  |  |  | 5.0 |  |  |
| Glycerin | 9.0 | 9.0 | 14.0 | 10.0 | 9.0 | 9.0 | 14.0 | 15.0 |
| diethylene glycol | 5.0 | 7.0 |  |  | 5.0 | 7.0 |  |  |
| tetraethylene glycol |  |  |  |  |  | 3.5 |  |  |
| Thiodiglycol |  | 3.5 |  |  |  |  |  |  |
| 1,3-dimethyl-2-imidazolidinone |  |  | 2.0 |  |  | 2.0 |  |  |
| Triethanolamine | 0.9 | 1.0 | 0.7 | 0.8 | 0.9 | 0.8 |  | 0.9 |
| potassium hydroxide |  | 0.1 |  |  |  |  | 0.1 |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 32 | 34 | 31 | 33 | 32 | 32 | 32 | 34 |

TABLE 5

|  | Ex. 33 | Ex. 34 | Ex. 35 | Ex. 36 |
|---|---|---|---|---|
| Colorant | 5.0 | 5.5 | 5.0 | 5.5 |
|  | 3-3 | 3-4 | 3-4 | 3-4 |
| Olfin E1010 |  |  | 1.0 |  |
| Surfynol 465 | 1.0 |  |  |  |
| Surfynol 61 | 0.5 | 1.0 |  |  |
| DEGmBE | 8.0 | 8.0 |  |  |
| TEGmBE |  |  |  | 4.0 |
| PGmBE |  | 2.0 |  |  |
| 1,2-hexanediol |  |  | 5.0 | 5.0 |
| Glycerin | 15.0 | 7.0 | 15.0 | 15.0 |
| diethylene glycol |  | 5.0 |  |  |
| tetrapropylene glycol |  | 5.0 |  |  |
| Trimethylolpropane |  | 1.0 |  | 1.0 |
| 1,3-dimethyl-2-imidazolidinone |  | 2.0 |  |  |
| Triethanolamine | 0.5 | 0.9 | 0.9 | 0.3 |
| potassium hydroxide | 0.05 | 0.1 |  | 0.1 |
| Proxel XL-2 | 0.03 | 0.03 | 0.03 | 0.03 |
| Benzotriazole | 0.02 | 0.02 | 0.02 | 0.02 |
| Water | balance | balance | balance | balance |
| surface tension (mN/m) | 31 | 28 | 34 | 31 |

TABLE 6

|  | Ex. 37 | Ex. 38 | Ex. 39 | Ex. 40 | Ex. 41 | Ex. 43 | Ex. 43 | Ex. 44 |
|---|---|---|---|---|---|---|---|---|
| Colorant | 4.0 | 3.0 | 4.0 | 3.0 | 4.0 | 3.0 | 4.0 | 3.0 |
|  | 4-1 | 4-2 | 4-1 | 4-2 | 4-1 | 4-2 | 4-1 | 4-2 |
| Olfin E1010 | 1.0 |  |  |  |  |  | 0.5 |  |
| Olfin STG |  |  | 1.0 |  |  |  |  | 0.7 |
| Surfynol 465 |  | 1.2 |  |  |  |  |  |  |
| Surfynol 61 |  |  |  | 0.5 | 1.0 | 1.0 | 0.5 | 0.3 |

TABLE 6-continued

|  | Ex. 37 | Ex. 38 | Ex. 39 | Ex. 40 | Ex. 41 | Ex. 43 | Ex. 43 | Ex. 44 |
|---|---|---|---|---|---|---|---|---|
| DEGmBE | 5.0 |  |  |  | 5.0 |  |  |  |
| TEGmBE |  | 10.0 |  | 5.0 |  |  | 4.0 |  |
| PGmBE |  |  |  |  |  |  | 1.0 |  |
| DPGmBE |  |  |  |  |  |  |  |  |
| 1,2-pentanediol |  |  |  | 2.0 |  |  |  |  |
| 1,2-hexanediol |  | 3.0 | 5.0 | 3.0 |  | 5.0 |  | 5.0 |
| 1,6-hexanediol |  |  | 5.0 |  |  |  |  |  |
| Glycerin | 14.0 | 9.0 | 9.0 | 14.0 | 14.0 | 9.0 | 12.0 | 12.0 |
| diethylene glycol |  | 5.0 | 7.0 |  |  | 5.0 |  |  |
| tetraethylene glycol |  |  |  |  |  |  |  |  |
| thiodiglycol |  |  | 3.5 |  |  |  | 3.5 |  |
| trimethylolpropane |  |  |  |  |  |  |  | 1.0 |
| 1,3-dimethyl-2-imidazolidinone |  |  |  | 2.0 | 2.0 | 2.0 | 2.0 | 2.0 |
| triethanolamine | 0.8 | 0.9 | 1.0 | 0.7 |  |  | 0.9 | 0.9 |
| potassium hydroxide |  |  |  | 0.1 |  | 0.1 |  |  |
| Proxel XL-2 | 0.03 | 0.03 | 0.03 | 0.03 | 0.03 | 0.03 | 0.03 | 0.03 |
| benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 34 | 32 | 34 | 34 | 35 | 33 | 32 | 32 |

TABLE 7

|  | Ex. 45 | Ex. 46 | Ex. 47 | Ex. 48 | Ex. 49 | Ex. 50 | Ex. 51 | Ex. 52 |
|---|---|---|---|---|---|---|---|---|
| Colorant | 4.0 | 3.0 | 4.0 | 3.0 | 4.0 | 3.0 | 4.0 | 3.0 |
|  | 4-1 | 4-2 | 4-1 | 4-2 | 4-1 | 4-2 | 4-1 | 4-2 |
| Olfin E1010 |  |  | 1.0 |  |  |  |  |  |
| Olfin STG |  | 1.0 |  |  |  |  |  |  |
| Surfynol 465 | 0.5 |  |  |  |  |  |  |  |
| Surfynol 61 | 0.5 |  |  |  |  | 0.5 |  | 0.3 |
| DEGmBE | 4.0 |  |  |  |  |  | 8.0 |  |
| TEGmBE |  |  |  | 8.0 |  |  |  |  |
| PGmBE |  | 2.0 |  |  |  |  |  |  |
| DPGmBE | 1.0 |  |  |  |  |  |  |  |
| 1,2-pentanediol |  |  |  |  |  |  |  | 4.0 |
| 1,2-hexanediol | 3.0 | 7.0 |  |  | 5.0 |  |  |  |
| 1,6-hexanediol |  |  |  |  |  |  |  |  |
| Glycerin | 10.0 | 10.0 | 12.0 | 12.0 | 12.0 | 12.0 | 12.0 | 12.0 |
| diethylene glycol |  | 2.0 |  |  |  |  |  |  |
| thiodiglycol |  | 3.0 |  |  |  |  |  |  |
| 1,3-dimethyl-2-imidazolidinone | 2.0 |  |  |  |  | 2.0 |  |  |
| triethanolamine | 0.9 |  | 0.8 | 0.8 | 0.8 | 0.8 | 0.8 | 0.8 |
| potassium hydroxide |  | 0.1 |  |  |  |  |  |  |
| Proxel XL-2 | 0.03 | 0.03 | 0.03 | 0.03 | 0.03 | 0.03 | 0.03 | 0.03 |
| benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 30 | 32 | 33 | 35 | 34 | 35 | 35 | 34 |

TABLE 8

|  | Ex. 53 | Ex. 54 | Ex. 55 | Ex. 56 |
|---|---|---|---|---|
| Colorant | 4.0 | 3.0 | 7.0 | 7.0 |
|  | 4-1 | 4-2 | 6-1 | 6-1 |
| Olfin E1010 |  |  | 1.0 |  |
| Olfin STG |  |  |  | 1.0 |
| DEGmBE |  |  | 3.0 | 2.0 |
| TEGmBE | 5.0 |  |  | 1.0 |
| PGmBE | 1.0 |  |  |  |
| 1,2-pentanediol |  | 2.0 |  | 2.0 |
| 1,2-hexanediol |  |  | 3.0 | 2.0 |
| Glycerin | 12.0 | 12.0 | 12.0 | 12.0 |
| 1,3-dimethyl-2-imidazolidinone | 2.0 |  |  |  |
| triethanolamine | 0.8 | 0.8 | 0.5 | 0.9 |
| potassium hydroxide |  |  | 0.1 |  |
| Proxel XL-2 | 0.03 | 0.03 | 0.03 | 0.03 |
| benzotriazole | 0.02 | 0.02 | 0.02 | 0.03 |
| Water | balance | balance | balance | balance |
| surface tension (mN/m) | 36 | 34 | 33 | 29 |

TABLE 9

|  | Ex. 57 | Ex. 58 | Ex. 59 | Ex. 60 | Ex. 61 | Ex. 62 | Ex. 63 | Ex. 64 |
|---|---|---|---|---|---|---|---|---|
| Colorant | 7.5 | 4.5 | 5.5 | 5.5 | 5.0 | 7.5 | 4.5 | 5.5 |
|  | 1-1 | 1-2 | 1-3 | 1-3 | 1-4 | 1-1 | 1-2 | 1-3 |
| Olfin E1010 | 1.0 |  |  |  |  |  |  | 0.5 |
| Olfin STG |  |  | 1.0 | 1.0 |  |  |  |  |
| Surfynol 465 |  | 1.2 |  |  |  |  |  |  |
| Surfynol 61 |  |  |  |  | 0.5 | 1.0 | 1.0 | 0.5 |

TABLE 9-continued

|  | Ex. 57 | Ex. 58 | Ex. 59 | Ex. 60 | Ex. 61 | Ex. 62 | Ex. 63 | Ex. 64 |
|---|---|---|---|---|---|---|---|---|
| DEGmBE |  | 2.5 | 7.0 |  |  | 5.0 |  |  |
| TEGmBE | 5.0 |  |  |  | 5.0 |  |  | 4.0 |
| PGmBE |  |  |  |  |  |  |  | 1.0 |
| DPGmBE |  |  | 3.0 |  |  |  |  |  |
| 1,2-pentanediol |  |  |  |  |  | 2.0 |  |  |
| 1,2-hexanediol |  | 4.5 | 1.0 | 5.0 | 3.0 |  | 5.0 |  |
| 1,6-hexanediol |  |  |  | 5.0 | 5.0 |  |  |  |
| Glycerin | 12.0 | 10.0 | 7.0 | 7.0 | 10.0 | 10.0 | 7.0 | 10.0 |
| Maltitol | 3.5 | 2.5 |  |  |  |  |  |  |
| Maltose |  |  | 3.0 |  |  |  |  |  |
| erythritol |  | 2.5 |  |  |  |  |  |  |
| Isomalto-oligosaccharide |  |  | 2.0 |  |  |  |  |  |
| Sorbitol |  |  |  | 3.0 |  |  |  |  |
| Fructose |  |  |  |  | 3.0 |  |  |  |
| Xylitol |  |  |  |  |  |  | 5.0 |  |
| Glucose |  |  |  |  |  |  | 3.0 |  |
| Xylose |  |  |  |  |  |  |  | 5.0 |
| diethylene glycol |  |  | 7.0 |  |  |  | 5.0 |  |
| thiodiglycol |  | 3.5 | 3.5 |  |  |  |  | 3.5 |
| 1,3-dimethyl-2-imidazolidinone |  |  |  |  | 2.0 | 2.0 | 2.0 | 2.0 |
| triethanolamine | 0.8 | 0.9 | 1.0 | 1.0 | 0.7 |  |  | 0.9 |
| potassium hydroxide |  |  | 0.1 | 0.1 |  | 0.1 | 0.10 |  |
| Proxel XL-2 | 0.03 | 0.03 | 0.03 | 0.03 | 0.03 | 0.03 | 0.03 | 0.03 |
| benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 34 | 34 | 31 | 35 | 35 | 36 | 34 | 33 |

TABLE 10

|  | Ex. 65 | Ex. 66 | Ex. 67 | Ex. 68 | Ex. 69 | Ex. 70 | Ex. 71 | Ex. 72 |
|---|---|---|---|---|---|---|---|---|
| Colorant | 5.0 | 7.0 | 7.0 | 7.5 | 7.5 | 7.5 | 7.5 | 7.5 |
|  | 1-4 | 1-1 | 1-1 | 1-1 | 1-1 | 1-1 | 1-1 | 1-1 |
| Olfin E1010 |  |  |  | 1.0 |  |  |  |  |
| Olfin STG | 0.7 |  | 1.0 |  |  |  |  |  |
| Surfynol 465 |  | 0.5 |  |  |  |  |  |  |
| Surfynol 61 | 0.3 | 0.5 |  |  |  |  | 0.5 |  |
| DEGmBE |  | 4.0 |  |  |  |  |  | 8.0 |
| TEGmBE |  |  |  |  | 8.0 |  |  |  |
| PGmBE |  |  | 2.0 |  |  |  |  |  |
| DPGmBE |  | 1.0 |  |  |  |  |  |  |
| 1,2-hexanediol | 5.0 | 3.0 | 7.0 |  |  | 5.0 |  |  |
| Glycerin | 10.0 | 10.0 | 10.0 | 10.0 | 10.0 | 10.0 | 10.0 | 10.0 |
| Maltitol | 1.0 | 2.5 |  | 1.0 |  | 2.0 |  |  |
| Maltose |  |  |  | 3.0 |  |  | 2.0 |  |
| Erythritol |  |  |  |  | 2.0 |  |  |  |
| Mannitol | 2.0 |  |  |  |  |  | 1.0 |  |
| Sorbitol |  |  | 2.0 |  | 3.0 |  |  |  |
| Fructose |  |  |  |  |  | 2.0 |  |  |
| Xylitol |  | 2.5 |  | 1.0 |  |  |  |  |
| Xylose |  |  | 3.0 |  |  |  |  | 4.0 |
| diethylene glycol |  |  | 2.0 |  |  |  |  |  |
| Thiodiglycol |  |  | 3.0 |  |  |  |  |  |
| Trimethylolpropane | 1.0 |  |  |  |  |  |  |  |
| 1,3-dimethyl-2-imidazolidinone | 2.0 | 2.0 |  |  |  |  | 2.0 |  |
| Triethanolamine | 0.9 | 0.9 |  | 0.8 | 0.8 | 0.8 | 0.8 | 0.8 |
| potassium hydroxide |  |  | 0.1 |  |  |  |  |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 33 | 31 | 33 | 34 | 36 | 35 | 36 | 38 |

TABLE 11

|  | Ex. 73 | Ex. 74 | Ex. 75 | Ex. 76 | Ex. 77 | Ex. 78 | Ex. 79 | Ex. 80 |
|---|---|---|---|---|---|---|---|---|
| Colorant | 7.5 | 7.5 | 7.5 | 7.5 | 7.5 | 7.5 | 4.5 | 5.5 |
|  | 1-1 | 1-1 | 1-1 | 1-1 | 1-1 | 1-5 | 1-6 | 1-7 |
| Olfin E1010 |  |  |  | 1.0 |  | 1.0 |  |  |
| Olfin STG |  |  |  |  |  |  |  | 1.0 |
| Surfynol 465 |  |  |  |  |  |  | 1.2 |  |
| Surfynol 61 |  |  |  | 0.5 |  |  |  |  |
| DEGmBE |  |  |  |  |  | 6.0 |  |  |

TABLE 11-continued

|  | Ex. 73 | Ex. 74 | Ex. 75 | Ex. 76 | Ex. 77 | Ex. 78 | Ex. 79 | Ex. 80 |
|---|---|---|---|---|---|---|---|---|
| TEGmBE |  | 5.0 |  |  | 3.0 |  | 10.0 |  |
| PGmBE |  | 1.0 |  |  |  |  |  |  |
| 1,2-pentanediol | 4.0 |  | 2.0 |  |  |  |  |  |
| 1,2-hexanediol |  |  | 3.0 |  | 5.0 |  | 3.0 | 5.0 |
| 1,6-hexanediol |  |  |  |  |  |  |  | 5.0 |
| Glycerin | 10.0 | 10.0 | 10.0 | 10.0 | 10.0 | 10.0 | 9.0 | 9.0 |
| Maltitol |  |  | 2.0 | 2.0 |  |  | 2.0 |  |
| Maltose |  |  |  |  |  | 1.0 |  |  |
| Erythritol |  |  |  |  | 1.0 |  |  |  |
| isomalto-oligosaccharide |  |  |  | 1.0 |  |  |  | 1.0 |
| Sorbitol |  | 4.0 |  |  |  |  | 1.0 | 1.0 |
| Xylitol | 4.0 |  | 2.0 |  | 2.0 |  |  | 1.0 |
| Xylose |  |  |  |  |  | 2.0 | 1.0 |  |
| diethylene glycol |  |  |  |  |  |  | 5.0 | 7.0 |
| Thiodiglycol |  |  |  |  |  |  |  | 3.5 |
| 1,3-dimethyl-2-imidazolidinone |  | 2.0 |  | 1.0 |  |  | 2.0 |  |
| Triethanolamine | 0.8 | 0.8 | 0.8 |  |  | 0.8 | 0.9 | 1.0 |
| potassium hydroxide |  |  |  | 0.10 | 0.10 |  | 0.1 |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 35 | 37 | 35 | 32 | 37 | 35 | 33 | 35 |

TABLE 12

|  | Ex. 81 | Ex. 82 | Ex. 83 | Ex. 84 | Ex. 85 | Ex. 86 | Ex. 87 |
|---|---|---|---|---|---|---|---|
| Colorant | 5.0 | 3.0 | 5.0 | 5.0 | 5.5 | 5.0 | 5.0 |
|  | 1-8 | 3-1 | 3-2 | 3-3 | 3-4 | 3-2 | 3-3 |
| Olfin E1010 | 0.5 |  | 1.0 |  |  | 1.0 |  |
| Olfin STG |  | 1.0 |  |  |  |  |  |
| Surfynol 465 |  |  |  | 1.0 |  |  |  |
| Surfynol 61 | 0.5 |  |  | 0.5 | 1.0 |  |  |
| DEGmBE |  | 7.0 |  | 8.0 | 8.0 |  |  |
| TEGmBE | 5.0 |  | 6.0 |  |  |  | 4.0 |
| PGmBE |  | 2.0 |  |  | 2.0 |  |  |
| 1,2-pentanediol | 2.0 |  |  |  |  |  |  |
| 1,2-hexanediol | 3.0 |  | 2.0 |  |  | 5.0 | 5.0 |
| Glycerin | 10.0 | 11.0 | 11.0 | 11.0 | 7.0 | 10.0 | 10.0 |
| Maltitol | 1.0 |  | 1.0 |  | 2.0 |  | 2.0 |
| Maltose | 1.0 |  |  | 2.0 |  |  |  |
| Erythritol | 1.0 |  |  |  |  | 1.0 |  |
| isomalto-oligosaccharide |  |  | 1.0 |  |  | 1.0 |  |
| Sorbitol |  | 1.0 |  | 2.0 |  | 2.0 |  |
| Fructose |  |  | 1.0 |  |  |  | 2.0 |
| Xylitol |  | 1.0 |  |  | 2.0 |  |  |
| Xylose |  | 2.0 |  |  |  |  |  |
| diethylene glycol |  |  |  |  | 5.0 |  |  |
| tetrapropylene glycol |  |  |  |  | 5.0 |  |  |
| Trimethylolpropane |  |  |  | 1.0 |  |  | 1.0 |
| 1,3-dimethyl-2-imidazolidinone | 2.0 |  |  |  | 2.0 |  |  |
| Triethanolamine | 0.7 |  | 0.9 | 0.5 | 0.8 | 0.9 | 0.3 |
| potassium hydroxide |  | 0.1 |  | 0.05 | 0.1 |  | 0.1 |
| Proxel XL-2 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 |
| Water | balance | balance | balance | balance | balance | balance | balance |
| surface tension (mN/m) | 32 | 33 | 35 | 32 | 30 | 35 | 32 |

TABLE 13

|  | Ex. 88 | Ex. 89 | Ex. 90 | Ex. 91 | Ex. 92 | Ex. 93 | Ex. 94 | Ex. 95 |
|---|---|---|---|---|---|---|---|---|
| Colorant | 4.0 | 3.0 | 4.0 | 3.0 | 4.0 | 3.0 | 4.0 | 3.0 |
|  | 4-1 | 4-2 | 4-1 | 4-2 | 4-1 | 4-2 | 4-1 | 4-2 |
| Olfin E1010 | 1.0 |  | 1.0 |  |  |  | 0.5 |  |
| Olfin STG |  |  | 1.0 |  |  |  |  | 0.7 |
| Surfynol 465 |  | 1.2 |  |  |  |  |  |  |
| Surfynol 61 |  |  |  | 0.5 | 1.0 | 1.0 | 0.5 | 0.3 |
| DEGmBE | 5.0 |  |  |  | 5.0 |  |  |  |
| TEGmBE |  | 10.0 |  | 5.0 |  |  | 4.0 |  |
| PGmBE |  |  |  |  |  |  | 1.0 |  |
| 1,2-pentanediol |  |  |  | 2.0 |  |  |  |  |
| 1,2-hexanediol |  | 3.0 | 5.0 | 3.0 |  | 5.0 |  | 5.0 |

TABLE 13-continued

|  | Ex. 88 | Ex. 89 | Ex. 90 | Ex. 91 | Ex. 92 | Ex. 93 | Ex. 94 | Ex. 95 |
|---|---|---|---|---|---|---|---|---|
| 1,6-hexanediol |  |  | 5.0 |  |  |  |  |  |
| Glycerin | 10.0 | 7.0 | 7.0 | 12.0 | 12.0 | 7.0 | 10.0 | 10.0 |
| Maltitol | 3.5 | 2.5 |  |  |  |  |  |  |
| Maltose |  |  | 3.0 |  |  |  |  |  |
| Erythritol |  | 2.5 |  |  |  |  |  |  |
| isomalto-oligosaccharide |  |  | 2.0 |  |  |  |  |  |
| Sorbitol |  |  |  | 3.0 |  |  |  |  |
| Fructose |  |  |  |  | 3.0 |  |  |  |
| Xylitol |  |  |  |  |  |  | 5.0 |  |
| Glucose |  |  |  |  |  |  | 3.0 |  |
| Xylose |  |  |  |  |  |  |  | 5.0 |
| diethylene glycol |  | 5.0 | 7.0 |  |  | 5.0 |  |  |
| Thioglycol |  |  | 3.5 |  |  |  | 3.5 |  |
| Trimethylolpropane |  |  |  |  |  |  |  | 1.0 |
| 1,3-dimethyl-2-imidazolidinone |  |  |  | 2.0 | 2.0 | 2.0 | 2.0 | 2.0 |
| Triethanolamine | 0.8 | 0.9 | 1.0 | 0.7 |  |  | 0.9 | 0.9 |
| potassium hydroxide |  |  |  | 0.1 |  | 0.1 | 0.1 |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 35 | 33 | 35 | 35 | 36 | 34 | 33 | 33 |

TABLE 14

|  | Ex. 96 | Ex. 97 | Ex. 98 | Ex. 99 | Ex. 100 | Ex. 101 | Ex. 102 | Ex. 103 |
|---|---|---|---|---|---|---|---|---|
| Colorant | 4.0 4-1 | 3.0 4-2 | 4.0 4-1 | 3.0 4-2 | 4.0 4-1 | 3.0 4-2 | 4.0 4-1 | 3.0 4-2 |
| Olfin E1010 |  |  | 1.0 |  |  |  |  |  |
| Olfin STG |  | 1.0 |  |  |  |  |  |  |
| Surfynol 465 | 0.5 |  |  |  |  |  |  |  |
| Surfynol 61 | 0.5 |  |  |  |  | 0.5 |  |  |
| DEGmBE | 4.0 |  |  |  |  |  | 8.0 |  |
| TEGmBE |  |  |  | 8.0 |  |  |  |  |
| PGmBE |  | 2.0 |  |  |  |  |  |  |
| DPGmBE | 1.0 |  |  |  |  |  |  |  |
| 1,2-pentanediol |  |  |  |  |  |  |  | 4.0 |
| 1,2-hexanediol | 3.0 | 7.0 |  | 5.0 |  |  |  |  |
| 1,6-hexanediol |  |  |  |  |  |  |  |  |
| Glycerin | 8.0 | 8.0 | 10.0 | 10.0 | 10.0 | 10.0 | 10.0 | 10.0 |
| Maltitol | 1.0 | 2.5 |  | 1.0 |  | 2.0 |  |  |
| Maltose |  |  |  | 3.0 |  |  | 2.0 |  |
| Erythritol |  |  |  |  | 2.0 |  |  |  |
| isomalto-oligosaccharide |  |  |  |  |  |  |  |  |
| Mannitol | 2.0 |  |  |  |  |  | 1.0 |  |
| Sorbitol |  |  | 2.0 |  | 3.0 |  |  |  |
| Fructose |  |  |  |  |  | 2.0 |  |  |
| Xylitol |  | 2.5 |  | 1.0 |  |  |  |  |
| Glucose |  |  |  |  |  |  |  |  |
| Xylose |  |  | 3.0 |  |  |  |  | 4.0 |
| diethylene glycol |  |  |  |  |  |  |  |  |
| Thioglycol |  | 3.0 |  |  |  |  |  |  |
| Trimethylolpropane |  |  |  |  |  |  |  |  |
| 1,3-dimethyl-2-imidazolidinone | 2.0 |  |  |  |  | 2.0 |  |  |
| Triethanolamine | 0.9 |  | 0.8 | 0.8 | 0.8 | 0.8 | 0.8 | 0.8 |
| potassium hydroxide |  | 0.1 |  |  |  |  |  |  |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 31 | 33 | 34 | 36 | 35 | 36 | 36 | 35 |

TABLE 15

|  | Ex. 104 | Ex. 105 | Ex. 106 |
|---|---|---|---|
| Colorant | 4.0 4-1 | 3.0 4-2 | 7.0 6-1 |
| Surfynol 465 |  |  | 1.0 |
| TEGmBE | 5.0 |  | 3.0 |
| PGmBE | 1.0 |  |  |
| 1,2-pentanediol |  | 2.0 |  |
| 1,2-hexanediol |  | 3.0 | 3.0 |
| Glycerin | 10.0 | 10.0 | 12.0 |
| Maltitol |  |  | 3.0 |
| Sorbitol |  | 4.0 |  |
| Xylitol | 4.0 |  | 3.0 |
| 1,3-dimethyl-2-imidazolidinone | 2.0 |  |  |

TABLE 15-continued

|  | Ex. 104 | Ex. 105 | Ex. 106 |
|---|---|---|---|
| Triethanolamine | 0.8 | 0.8 | 0.5 |
| potassium hydroxide |  |  | 0.1 |
| Proxel XL-2 | 0.03 | 0.03 | 0.03 |
| Benzotriazole | 0.02 | 0.02 | 0.02 |
| Water | balance | balance | balance |
| surface tension (mN/m) | 37 | 35 | 33 |

TABLE 16

|  | Ex. 107 | Ex. 108 | Ex. 109 | Ex. 110 | Ex. 111 | Ex. 112 | Ex. 113 | Ex. 114 |
|---|---|---|---|---|---|---|---|---|
| Colorant | 7.5 | 4.5 | 5.5 | 5.0 | 3.0 | 5.0 | 5.0 | 5.5 |
|  | 1-1 | 1-2 | 1-3 | 1-4 | 3-1 | 3-2 | 3-3 | 3-4 |
| Olfin E1010 | 1.0 |  |  |  |  |  | 1.0 |  |
| Olfin STG |  |  | 0.5 |  |  |  |  | 1.0 |
| Surfynol 465 |  | 1.2 |  |  |  |  | 1.0 |  |
| Surfynol 61 |  |  |  | 0.5 |  |  |  | 0.5 |
| DEGmBE |  |  |  |  | 7.0 |  | 8.0 | 10.0 |
| TEGmBE |  |  |  | 3.0 |  | 6.0 |  |  |
| PGmBE |  |  |  |  |  |  |  | 2.0 |
| DPGmBE |  |  |  |  | 2.0 |  |  |  |
| DPDmBE |  |  |  |  | 2.0 |  |  |  |
| 1,2-pentanediol |  |  |  | 5.0 |  |  |  |  |
| 1,2-hexanediol |  |  | 1.0 |  |  |  |  |  |
| compound of formula (1) | 5.0 | 10.0 | 10.0 | 8.0 | 7.0 | 6.0 | 10.0 | 6.0 |
|  | 1-1 | 1-2 | 1-3 | 1-4 | 1-5 | 1-6 | 1-7 | 1-8 |
| Glycerin | 9.0 |  |  |  | 14.0 | 15.0 | 15.0 | 7.0 |
| diethylene glycol |  |  | 7.0 |  |  |  |  | 5.0 |
| dipropylene glycol |  | 5.0 |  |  |  |  |  |  |
| tetraethylene glycol |  |  |  | 9.0 |  |  |  |  |
| tetrapropylene glycol |  |  |  |  |  |  |  | 5.0 |
| Thiodiglycol |  |  | 3.5 |  |  | 2.0 |  |  |
| Trimethylolpropane |  |  |  |  |  |  | 1.0 |  |
| Maltitol |  |  |  |  |  |  | 1.0 |  |
| 1,3-dimethyl-2-imidazolidinone |  |  |  | 2.0 |  |  |  |  |
| Triethanolamine | 0.8 | 0.9 | 1.0 | 0.7 | 0.9 | 0.9 | 0.5 | 0.9 |
| potassium hydroxide |  |  | 0.1 | 0.1 |  |  | 0.05 | 0.1 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 32 | 32 | 32 | 34 | 31 | 32 | 32 | 31 |

TABLE 17

|  | Ex. 115 | Ex. 116 | Ex. 117 | Ex. 118 | Ex. 119 | Ex. 120 | Ex. 121 | Ex. 122 |
|---|---|---|---|---|---|---|---|---|
| Colorant | 7.5 | 4.5 | 5.5 | 5.0 | 3.0 | 5.0 | 5.0 | 5.5 |
|  | 1-1 | 1-2 | 1-3 | 1-4 | 3-1 | 3-2 | 3-3 | 3-4 |
| Olfin E1010 | 1.0 |  |  |  |  |  | 1.0 |  |
| Olfin STG |  |  | 3.5 |  |  |  |  | 1.0 |
| Surfynol 465 |  | 1.2 |  |  |  |  | 1.0 |  |
| Surfynol 61 |  |  |  | 0.5 |  |  |  | 0.5 |
| DEGmBE |  | 2.5 | 7.0 |  | 7.0 |  | 8.0 | 10.0 |
| TEGmBE | 5.0 |  |  | 3.0 |  | 6.0 |  |  |
| PGmBE |  |  |  |  |  |  |  | 2.0 |
| DPGmBE |  |  | 3.0 |  | 2.0 |  |  |  |
| DPDmBE |  |  | 3.0 |  | 2.0 |  |  |  |
| 1,2-propanediol |  |  |  |  |  | 6.0 |  |  |
| 1,2-pentanediol |  |  |  | 5.0 |  |  |  |  |
| 1,2-hexanediol |  | 4.5 | 1.0 |  |  |  |  |  |
| compound of formula (1) |  |  |  | 8.0 | 7.0 |  | 10.0 | 6.0 |
|  |  |  |  | 1-4 | 1-5 |  | 1-9 | 1-8 |
| 1,5-pentanediol | 5.0 |  |  | 2.0 |  | 1.0 |  |  |
| Glycerin | 9.0 | 8.0 | 7.0 | 8.0 | 14.0 | 10.0 | 10.0 | 7.0 |
| compound of formula (2) | 8.0 | 10.0 | 2.0 | 8.0 | 10.0 | 6.0 | 10.0 | 6.0 |
|  | 2-1 | 2-2 | 2-3 | 2-4 | 2-5 | 2-6 | 2-7 | 2-8 |
| Maltose |  |  |  | 3.0 |  |  |  |  |
| diethylene glycol |  |  |  |  |  |  |  | 5.0 |
| dipropylene glycol |  |  | 5.0 |  |  |  |  |  |
| tetraethylene glycol |  |  |  |  | 1.0 |  |  |  |
| Trimethylolpropane |  |  |  |  |  |  | 2.0 |  |
| 1,3-dimethyl-2-imidazolidinone |  |  |  | 2.0 |  |  |  |  |

TABLE 17-continued

|  | Ex. 115 | Ex. 116 | Ex. 117 | Ex. 118 | Ex. 119 | Ex. 120 | Ex. 121 | Ex. 122 |
|---|---|---|---|---|---|---|---|---|
| Triethanolamine | 0.8 | 0.9 | 1.0 | 0.7 | 0.9 | 0.9 | 0.5 | 0.9 |
| potassium hydroxide |  |  | 0.1 |  |  |  | 0.05 | 0.1 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 33 | 32 | 31 | 34 | 34 | 32 | 33 | 29 |

TABLE 18

|  | Ex. 123 | Ex. 124 | Ex. 125 | Ex. 126 |
|---|---|---|---|---|
| Colorant | 5.0 | 3.0 | 5.0 | 5.5 |
|  | 1-4 | 3-1 | 3-3 | 3-4 |
| Olfin STG |  |  |  | 1.0 |
| Surfynol 465 | 0.5 |  | 1.0 |  |
| Surfynol 61 |  |  | 0.5 |  |
| DEGmBE |  | 7.0 | 8.0 | 10.0 |
| TEGmBE | 3.0 |  |  |  |
| PGmBE |  | 2.0 |  | 2.0 |
| 1,2-pentanediol | 5.0 |  |  |  |
| compound of formula (1) | 8.0 | 7.0 | 10.0 | 6.0 |
|  | 1-4 | 1-10 | 1-11 | 1-12 |
| 1,5-pentanediol | 2.0 |  |  |  |
| Glycerin | 8.0 | 14.0 | 10.0 | 7.0 |
| Maltose |  |  |  | 5.0 |
| erythritol |  |  |  | 1.0 |
| mannitol | 3.0 |  |  |  |
| Sorbitol | 2.0 |  |  |  |
| Fructose |  | 2.0 | 3.0 |  |
| Xylitol |  |  | 2.5 |  |
| Xylose |  |  | 2.0 |  |
| diethylene glycol |  |  |  | 5.0 |
| tetraethylene glycol |  | 1.0 |  |  |
| tetrapropylene glycol |  |  |  | 5.0 |
| trimethylolpropane |  |  | 1.0 |  |
| trimethylolethane |  |  | 1.0 |  |
| 1,3-dimethyl-2-imidazolidinone |  | 2.0 |  |  |
| sodium benzoate |  | 0.1 |  |  |
| triethanolamine |  | 0.7 | 0.9 | 0.5 | 0.9 |
| potassium hydroxide |  |  |  | 0.05 | 0.1 |
| Proxel XL-2 | 0.03 | 0.03 | 0.03 | 0.03 |
| benzotriazole | 0.02 | 0.02 | 0.02 | 0.02 |
| Water | balance | balance | balance | balance |
| surface tension (mN/m) | 34 | 34 | 33 | 33 |

TABLE 19

|  | Ex. 127 | Ex. 128 | Ex. 129 | Ex. 130 | Ex. 131 | Ex. 132 | Ex. 133 | Ex. 134 |
|---|---|---|---|---|---|---|---|---|
| Colorant | 7.5 | 4.5 | 5.5 | 5.0 | 3.0 | 5.0 | 5.0 | 5.5 |
|  | 1-1 | 1-2 | 1-3 | 1-4 | 1-1 | 1-2 | 1-3 | 1-4 |
| Olfin E1010 | 1.0 |  |  |  |  | 1.0 |  |  |
| Olfin STG |  |  | 0.5 |  |  |  |  | 1.0 |
| Surfynol 465 |  | 1.2 |  |  |  |  | 1.0 |  |
| Surfynol 61 |  |  |  | 0.5 |  |  | 0.5 |  |
| DEGmBE |  | 2.5 | 7.0 |  | 7.0 |  | 8.0 | 10.0 |
| TEGmBE | 5.0 |  |  | 3.0 |  | 6.0 |  |  |
| PGmBE |  |  |  |  |  |  |  | 2.0 |
| DPGmBE |  |  |  |  | 2.0 |  |  |  |
| DPDmBE |  |  | 3.0 |  |  |  |  |  |
| 1,2-propanediol |  |  |  |  |  | 6.0 |  |  |
| 1,2-pentanediol |  |  |  | 5.0 |  |  |  |  |
| 1,2-hexanediol |  | 4.5 | 1.0 |  |  |  |  |  |
| 1,5-pentanediol | 5.0 |  |  |  |  |  |  |  |
| 1,6-hexanediol |  |  |  | 5.0 |  |  |  |  |
| Glycerin | 9.0 | 8.0 | 7.0 | 8.0 | 14.0 | 7.0 | 10.0 | 7.0 |
| compound of formula (2) | 3.0 |  | 2.0 | 3.0 |  |  |  |  |
|  | 2-9 |  | 2-10 | 2-11 |  |  |  |  |
| Maltitol |  | 2.5 |  |  |  |  |  |  |
| Maltose | 3.5 |  | 3.0 |  |  | 3.0 |  | 5.0 |
| Erythritol |  | 2.5 |  |  |  |  |  |  |
| isomalto-oligosaccharide |  |  | 2.0 |  |  |  |  | 1.0 |
| Mannitol |  |  |  | 3.0 |  |  |  |  |
| Sorbitol |  |  |  | 2.0 |  |  |  |  |
| Fructose |  |  |  |  | 2.0 |  | 3.0 |  |
| Xylitol |  |  |  |  | 2.5 |  |  |  |
| Glucose |  |  |  |  |  | 2.0 |  |  |
| Xylose |  |  |  |  |  | 2.0 |  |  |
| diethylene glycol |  |  |  | 7.0 |  |  |  | 5.0 |
| dipropylene glycol |  |  | 5.0 |  |  |  |  |  |
| tetraethylene glycol |  |  |  |  |  | 1.0 |  |  |
| tetrapropylene glycol |  |  |  |  |  |  |  | 5.0 |
| Thiodiglycol |  |  |  | 3.5 |  | 2.0 |  |  |
| Trimethylolpropane |  |  |  |  |  |  | 1.0 |  |
| Trimethylolethane |  |  |  |  |  |  | 1.0 |  |
| 1,3-dimethyl-2-imidazolidinone |  |  |  |  |  |  |  | 2.0 |

TABLE 19-continued

|  | Ex. 127 | Ex. 128 | Ex. 129 | Ex. 130 | Ex. 131 | Ex. 132 | Ex. 133 | Ex. 134 |
|---|---|---|---|---|---|---|---|---|
| Triethanolamine | 0.8 | 0.9 | 1.0 | 0.7 | 0.9 | 0.9 | 0.5 | 0.9 |
| potassium hydroxide |  |  | 0.1 |  |  |  | 0.5 | 0.1 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 33 | 32 | 31 | 34 | 34 | 32 | 32 | 29 |

TABLE 20

|  | Ex. 135 | Ex. 136 | Ex. 137 | Ex. 138 | Ex. 139 | Ex. 140 | Ex. 141 | Ex. 142 |
|---|---|---|---|---|---|---|---|---|
| Colorant | 7.5 | 4.5 | 5.5 | 5.0 | 3.0 | 5.0 | 5.0 | 5.0 |
|  | 1-1 | 1-2 | 1-3 | 1-4 | 3-1 | 3-2 | 3-3 | 3-4 |
| Olfin E1010 | 0.1 |  |  |  |  | 0.05 |  |  |
| Olfin STG |  |  | 0.5 |  |  |  |  | 0.05 |
| Surfynol 465 |  | 0.1 |  |  |  |  | 1.0 |  |
| Surfynol 61 |  |  |  | 0.05 |  |  |  |  |
| DEGmBE |  | 0.5 | 0.7 |  | 0.3 |  | 0.5 |  |
| TEGmBE | 1.0 |  |  | 0.5 |  | 0.6 |  |  |
| DPGmBE |  |  |  |  | 0.3 |  |  |  |
| DPDmBE |  |  | 0.3 |  |  |  |  |  |
| DPGmME |  |  |  |  |  |  |  | 1.5 |
| TEGmME |  |  |  |  |  |  |  | 1.5 |
| 1,2-propanediol |  |  |  |  |  | 0.6 |  |  |
| 1,2-pentanediol |  |  |  | 5.0 |  |  |  |  |
| 1,2-hexanediol |  | 0.5 | 0.5 |  |  |  |  |  |
| compound of formula (1) |  |  |  | 0.5 | 0.5 |  | 0.5 | 0.8 |
|  |  |  |  | 1-4 | 1-5 |  | 1-15 | 1-18 |
| 1,5-pentanediol | 5.0 |  |  | 2.0 |  | 1.0 |  |  |
| Glycerin | 9.0 | 8.0 | 7.0 | 8.0 | 14.0 | 10.0 | 10.0 | 7.0 |
| compound of formula (2) | 8.0 | 10.0 | 2.0 | 8.0 | 10.0 | 6.0 | 10.0 | 6.0 |
|  | 2-1 | 2-2 | 2-3 | 2-4 | 2-5 | 2-6 | 2-7 | 2-8 |
| Maltitol | 3.5 |  |  |  |  |  |  |  |
| Maltose |  |  | 3.0 |  |  |  |  |  |
| diethylene glycol |  |  |  |  |  |  |  | 5.0 |
| dipropylene glycol |  | 5.0 |  |  |  |  |  |  |
| tetraethylene glycol |  |  |  | 1.0 |  |  |  |  |
| Trimethylolpropane |  |  |  |  |  |  | 1.0 |  |
| Trimethylolethane |  |  |  |  |  |  | 1.0 |  |
| 1,3-dimethyl-2-imidazolidinone |  |  |  | 2.0 |  |  |  |  |
| Triethanolamine | 0.8 | 0.9 | 1.0 | 0.7 | 0.9 | 0.9 | 0.5 | 0.9 |
| potassium hydroxide |  |  | 0.1 |  |  |  | 0.05 | 0.1 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 42 | 39 | 40 | 42 | 44 | 45 | 41 | 40 |

TABLE 21

|  | Ex. 143 | Ex. 144 | Ex. 145 | Ex. 146 | Ex. 147 | Ex. 148 | Ex. 149 | Ex. 150 |
|---|---|---|---|---|---|---|---|---|
| Colorant | 7.5 | 7.5 | 4.5 | 5.5 | 5.0 | 7.5 | 7.5 | 7.5 |
|  | 1-9 | 1-10 | 1-11 | 1-12 | 1-13 | 1-14 | 1-15 | 1-16 |
| Olfin E1010 | 1.0 | 1.0 |  |  |  | 1.0 | 1.0 | 1.0 |
| Olfin STG |  |  |  | 0.5 |  |  |  |  |
| Surfynol 465 |  |  | 1.2 |  |  |  |  |  |
| Surfynol 61 |  |  |  |  | 0.5 |  |  |  |
| TEGmBE |  |  |  |  | 3.0 |  |  |  |
| 1,2-pentanediol |  |  |  |  | 5.0 |  |  |  |
| 1,2-hexanediol |  |  |  | 1.0 |  |  |  |  |
| compound of formula (1) | 5.0 | 5.0 | 10.0 | 10.0 | 8.0 | 5.0 | 5.0 | 5.0 |
|  | 1-16 | 1-17 | 1-3 | 1-18 | 1-19 | 1-16 | 1-16 | 1-16 |
| 1,5-pentanediol | 5.0 | 5.0 |  |  | 2.0 | 5.0 | 5.0 | 5.0 |
| 1,6-hexanediol |  |  |  | 5.0 |  |  |  |  |
| Glycerin | 9.0 | 9.0 |  |  |  | 9.0 | 9.0 | 9.0 |
| diethylene glycol |  |  |  | 7.0 |  |  |  |  |
| dipropylene glycol |  |  | 5.0 |  |  |  |  |  |
| tetraethylene glycol |  |  |  |  | 9.0 |  |  |  |
| Thiodiglycol |  |  |  |  | 3.5 |  |  |  |
| 1,3-dimethyl-2-imidazolidinone |  |  |  |  | 2.0 |  |  |  |

TABLE 21-continued

|  | Ex. 143 | Ex. 144 | Ex. 145 | Ex. 146 | Ex. 147 | Ex. 148 | Ex. 149 | Ex. 150 |
|---|---|---|---|---|---|---|---|---|
| Triethanolamine | 0.8 | 0.8 | 0.9 | 1.0 | 0.7 | 0.8 | 0.8 | 0.8 |
| potassium hydroxide |  |  |  | 0.1 |  |  |  |  |
| Water | balance | balance | balance | balance | balance | balance | balance | balance |
| surface tension (mN/m) | 32 | 32 | 31 | 30 | 33 | 32 | 32 | 32 |

TABLE 22

|  | Ex. 151 | Ex. 152 | Ex. 153 | Ex. 154 | Ex. 155 |
|---|---|---|---|---|---|
| Colorant | 5.0 | 5.0 | 5.0 | 5.0 | 5.0 |
|  | 2-1 | 2-2 | 5-1 | 2-3 | 2-4 |
| Olfin E1010 | 1.0 | 1.0 | 1.0 |  |  |
| Surfynol 465 |  |  |  | 1.0 | 1.0 |
| DEGmBE | 5.0 |  | 5.0 |  |  |
| TEGmBE |  | 5.0 |  | 5.0 | 5.0 |
| PGmBE | 3.0 |  |  |  |  |
| DPGmBE |  |  |  | 2.0 | 2.0 |
| 1,2-pentanediol | 5.0 |  |  |  |  |
| 1,2-hexanediol |  | 5.0 | 5.0 | 5.0 | 5.0 |
| Glycerin | 10.0 | 10.0 | 10.0 | 10.0 | 10.0 |
| Triethanolamine | 0.5 | 0.5 | 0.5 | 0.5 | 0.5 |
| potassium hydroxide | 0.1 | 0.1 | 0.1 | 0.10 | 0.10 |
| Proxel XL-2 | 0.03 | 0.03 | 0.03 | 0.03 | 0.03 |
| Benzotriazole | 0.02 | 0.02 | 0.02 | 0.02 | 0.02 |
| Water | balance | balance | balance | balance | balance |
| surface tension (mN/m) | 32 | 32 | 32 | 32 | 32 |

TABLE 23

|  | Ex. 156 | Ex. 157 | Ex. 158 | Ex. 159 |
|---|---|---|---|---|
| Colorant | 8.0 | 8.0 | 8.0 | 8.0 |
|  | 2-6 | 2-7 | 2-8 | 2-9 |
| Olfin E1010 | 1.0 | 1.0 | 1.0 | 1.0 |
| DEGmBE | 5.0 | 5.0 | 5.0 | 5.0 |
| 1,2-hexanediol | 5.0 | 5.0 | 5.0 | 5.0 |
| Glycerin | 10.0 | 10.0 | 10.0 | 10.0 |
| Triethanolamine | 0.5 | 0.5 | 0.5 | 0.5 |
| potassium hydroxide | 0.1 | 0.1 | 0.1 | 0.1 |
| Proxel XL-2 | 0.03 | 0.03 | 0.03 | 0.03 |
| Benzotriazole | 0.02 | 0.02 | 0.02 | 0.02 |
| Water | balance | balance | balance | balance |
| surface tension (mN/m) | 30 | 29 | 30 | 29 |

TABLE 24

|  | Ex. 160 | Ex. 161 | Ex. 162 | Ex. 163 | Ex. 164 | Ex. 165 | Ex. 166 | Ex. 167 |
|---|---|---|---|---|---|---|---|---|
| Colorant | 5.0 | 5.0 | 5.0 | 5.0 | 5.0 | 8.0 | 8.0 | 8.0 |
|  | 2-1 | 2-2 | 5-1 | 2-3 | 2-4 | 2-6 | 2-7 | 2-8 |
| Olfin E1010 | 1.0 | 1.0 | 1.0 |  |  | 1.0 | 1.0 | 1.0 |
| Surfynol 465 |  |  |  | 1.0 | 1.0 |  |  |  |
| DEGmBE | 5.0 |  | 5.0 |  |  | 5.0 | 5.0 | 5.0 |
| TEGmBE |  | 5.0 |  | 5.0 | 5.0 |  |  |  |
| PGmBE | 3.0 |  |  |  |  |  |  |  |
| DPGmBE |  |  |  | 2.0 | 2.0 |  |  |  |
| 1,2-pentanediol | 5.0 |  |  |  |  |  |  |  |
| 1,2-hexanediol |  | 5.0 | 5.0 | 5.0 | 5.0 | 5.0 | 5.0 | 5.0 |
| Glycerin | 10.0 | 10.0 | 10.0 | 10.0 | 10.0 | 10.0 | 10.0 | 10.0 |
| Maltitol | 3.5 | 2.5 |  |  |  |  |  |  |
| Maltose |  |  | 3.0 |  |  |  |  |  |
| Erythritol |  | 2.5 |  |  |  |  |  |  |
| isomalto-oligosaccharide |  |  | 2.0 |  |  |  |  |  |
| Mannitol |  |  |  |  |  |  |  |  |
| Sorbitol |  |  |  | 3.0 |  |  |  |  |
| Fructose |  |  |  |  | 3.0 |  |  |  |
| Xylitol |  |  |  |  |  | 5.0 |  |  |
| Glucose |  |  |  |  |  |  | 3.0 |  |
| Xylose |  |  |  |  |  |  |  | 5.0 |
| Triethanolamine | 0.5 | 0.5 | 0.5 | 0.5 | 0.5 | 0.5 | 0.5 | 0.5 |
| potassium hydroxide | 0.1 | 0.1 | 0.1 | 0.10 | 0.10 | 0.1 | 0.10 | 0.10 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 33 | 33 | 33 | 33 | 33 | 31 | 30 | 31 |

TABLE 25

|  | Ex. 168 | Comp. 1 | Comp. 2 |
|---|---|---|---|
| Colorant | 8.0 | 8.0 | 8.0 |
|  | 2-9 | 2-6 | 2-6 |
| Olfin E1010 | 1.0 |  |  |
| Olfin STG |  |  | 5.0 |
| DEGmBE | 5.0 |  |  |
| TEGmBE |  |  | 5.0 |
| 1,2-hexanediol | 5.0 |  | 8.0 |
| Glycerin | 10.0 | 15.0 | 5.0 |
| Maltitol | 1.0 |  |  |

TABLE 25-continued

|  | Ex. 168 | Comp. 1 | Comp. 2 |
|---|---|---|---|
| Mannitol | 2.0 | | |
| diethylene glycol | | 0.5 | |
| 1,3-dimethyl-2-imidazolidinone | | | 6.0 |
| 2-pyrrolidone | | 5.0 | |
| Triethanolamine | 0.5 | 0.5 | 0.5 |
| potassium hydroxide | 0.1 | 0.1 | 0.1 |
| Proxel XL-2 | 0.03 | 0.03 | 0.03 |
| Benzotriazole | 0.02 | 0.02 | 0.02 |
| Water | balance | balance | balance |
| surface tension (mN/m) | 30 | 51 | 23 |

TABLE 26

|  | Ex. 169 | Ex. 170 | Ex. 171 | Ex. 172 | Ex. 173 |
|---|---|---|---|---|---|
| Colorant | 8.0 | 8.0 | 8.0 | 8.0 | 8.0 |
|  | 1-18 | 1-19 | 2-5 | 2-11 | 2-12 |
| Olfin E1010 | 1.0 | 1.0 | 1.0 | 1.0 | 1.0 |
| DEGmBE | 5.0 | 5.0 | 5.0 | | |
| TEGmBE | 2.0 | 2.0 | 2.0 | 6.0 | 6.0 |
| DPGmBE | | | | | 1.0 |
| 1,2-hexanediol | 3.0 | 3.0 | 3.0 | 2.0 | 2.0 |
| Glycerin | 10.0 | 10.0 | 10.0 | 10.0 | 10.0 |
| Triethanolamine | 0.5 | 0.5 | 0.5 | 0.5 | 0.5 |
| potassium hydroxide | 0.1 | 0.1 | 0.1 | 0.1 | 0.1 |
| Proxel XL-2 | 0.03 | 0.03 | 0.03 | 0.03 | 0.03 |
| Benzotriazole | 0.02 | 0.02 | 0.02 | 0.02 | 0.02 |
| Water | balance | balance | balance | balance | balance |
| surface tension (mN/m) | 33 | 32 | 33 | 32 | 32 |

TABLE 27

|  | Ex. 174 | Ex. 175 | Ex. 176 | Ex. 177 | Ex. 178 | Ex. 179 |
|---|---|---|---|---|---|---|
| Colorant | 7.0 | 5.0 | 7.0 | 7.0 | 7.0 | 7.0 |
|  | 1-17 | 2-1 | 2-11 | 2-10 | 2-13 | 2-15 |
| Olfin E1010 | 1.0 | | 1.0 | 1.0 | | 1.0 |
| Surfynol 465 | | 1.0 | | | 1.0 | |
| DEGmBE | 5.0 | | 5.0 | 5.0 | | |
| TEGmBE | | 5.0 | | | 5.0 | 5.0 |
| PGmBE | 1.0 | | 1.0 | 1.0 | 1.0 | |
| DPGmBE | | | | | | 2.0 |
| 1,2-pentanediol | 3.0 | | 3.0 | 3.0 | | 1.0 |
| 1,2-hexanediol | | 3.0 | | | 3.0 | 2.0 |
| Glycerin | 10.0 | 10.0 | 10.0 | 10.0 | 10.0 | 10.0 |
| Triethanolamine | 0.5 | 0.5 | 0.5 | 0.5 | 0.5 | 0.5 |
| potassium hydroxide | 0.1 | 0.1 | 0.1 | 0.1 | | |
| Proxel XL-2 | 0.03 | 0.03 | 0.03 | 0.03 | 0.03 | 0.03 |
| Benzotriazole | 0.02 | 0.02 | 0.02 | 0.02 | 0.02 | 0.02 |
| Water | balance | balance | balance | balance | balance | balance |
| surface tension (mN/m) | 33 | 32 | 32 | 32 | 32 | 32 |

TABLE 28

|  | Ex. 180 | Ex. 181 | Ex. 182 | Ex. 183 | Ex. 184 | Ex. 185 |
|---|---|---|---|---|---|---|
| Colorant | 7.0 | 7.0 | 5.0 | 7.0 | 7.0 | 7.0 |
|  | 1-18 | 1-19 | 2-5 | 2-12 | 2-14 | 2-16 |
| Olfin E1010 | | | | | 1.0 | |
| Surfynol 465 | 1.0 | 1.0 | 1.0 | 1.0 | | 1.0 |
| DEGmBE | | | 5.0 | 5.0 | | 5.0 |
| TEGmBE | 5.0 | 5.0 | | | 5.0 | |
| PGmBE | 1.0 | 1.0 | 2.0 | | | 2.0 |
| DPGmBE | | | | 2.0 | | |
| 1,2-pentanediol | 3.0 | 1.0 | | | 2.0 | 2.0 |
| 1,2-hexanediol | | 2.0 | 3.0 | 3.0 | | 1.0 |
| Glycerin | 10.0 | 10.0 | 10.0 | 10.0 | 10.0 | 10.0 |
| Triethanolamine | 0.5 | 0.5 | 0.5 | 0.5 | 0.5 | 0.5 |
| potassium hydroxide | 0.1 | 0.1 | 0.1 | 0.1 | 0.1 | 0.1 |
| Proxel XL-2 | 0.03 | 0.03 | 0.03 | 0.03 | 0.03 | 0.03 |
| Benzotriazole | 0.02 | 0.02 | 0.02 | 0.02 | 0.02 | 0.02 |
| Water | balance | balance | balance | balance | balance | balance |
| surface tension (mN/m) | 33 | 32 | 31 | 32 | 33 | 33 |

TABLE 29

|  | Ex. 186 | Ex. 187 | Ex. 188 | Ex. 189 |
|---|---|---|---|---|
| Colorant | 5.0 | 3.0 | 5.0 | 5.5 |
|  | 3-1 | 3-2 | 3-3 | 3-4 |
| Olfin STG | | | | 1.0 |
| Surfynol 465 | | | 1.0 | |
| Surfynol 61 | 0.5 | | 0.5 | |
| DEGmBE | | 7.0 | 8.0 | 10.0 |
| TEGmBE | 3.0 | | | |
| PGmBE | | | | 2.0 |
| DPGmBE | | 2.0 | | |
| 1,2-pentanediol | 5.0 | | | |
| compound of formula (1) | 8.0 | 7.0 | 10.0 | 6.0 |
|  | 1-4 | 1-5 | 1-20 | 1-21 |
| 1,5-pentanediol | 2.0 | | | |
| Glycerin | | 14.0 | 15.0 | 7.0 |
| diethylene glycol | | | | 5.0 |
| tetraethylene glycol | 9.0 | | | |
| tetrapropylene glycol | | | | 5.0 |
| trimethylolpropane | | | 1.0 | |
| trimethylolethane | | | 1.0 | |
| 1,3-dimethyl-2-imidazolidinone | 2.0 | | | |
| triethanolamine | 0.7 | 0.9 | 0.5 | 0.9 |
| potassium hydroxide | | | 0.05 | 0.1 |
| Proxel XL-2 | 0.03 | 0.03 | 0.03 | 0.03 |
| benzotriazole | 0.02 | 0.02 | 0.02 | 0.02 |
| Water | balance | balance | balance | balance |
| surface tension (mN/m) | 34 | 34 | 33 | 31 |

TABLE 30

|  | Ex. 190 | Ex. 191 | Ex. 192 | Ex. 193 | Ex. 194 | Ex. 195 | Ex. 196 | Ex. 197 |
|---|---|---|---|---|---|---|---|---|
| Colorant | 7.5 | 4.5 | 5.5 | 5.0 | 1.0 | 5.0 | 5.0 | 5.5 |
|  | 1-21 | 1-22 | 1-23 | 1-24 | 3-5 | 3-6 | 3-7 | 3-8 |
| Olfin E1010 | 1.0 | | | | | 1.0 | | |
| Olfin STG | | | 0.5 | | | | | 1.0 |
| Surfynol 465 | | 1.2 | | | | | 1.0 | |
| Surfynol 61 | | | | 0.5 | | | | 0.5 |
| DEGmBE | | 2.5 | 7.0 | | 7.0 | | 8.0 | 10.0 |
| TEGmBE | 5.0 | | | 3.0 | | 6.0 | | |
| PGmBE | | | | | | | | 2.0 |
| DPGmBE | | | | | 2.0 | | | |
| DPDmBE | | | 3.0 | | | | | |

TABLE 30-continued

|  | Ex. 190 | Ex. 191 | Ex. 192 | Ex. 193 | Ex. 194 | Ex. 195 | Ex. 196 | Ex. 197 |
|---|---|---|---|---|---|---|---|---|
| 1,2-propanediol |  |  |  | 5.0 |  |  | 6.0 |  |
| 1,2-pentanediol |  |  |  |  |  |  |  |  |
| 1,2-hexanediol |  | 4.5 | 1.0 |  |  |  |  |  |
| compound of formula (1) |  |  |  | 8.0 | 7.0 |  | 10.0 | 6.0 |
|  |  |  |  | 1-4 | 1-22 |  | 1-23 | 1-24 |
| 1,5-pentanediol | 5.0 |  |  | 2.0 |  | 1.0 |  |  |
| 1,6-hexanediol |  |  | 5.0 |  |  |  |  |  |
| Glycerin | 9.0 |  |  |  | 14.0 | 15.0 | 15.0 | 7.0 |
| diethylene glycol |  |  | 7.0 |  |  |  |  | 5.0 |
| dipropylene glycol |  | 5.0 |  |  |  |  |  | 5.0 |
| tetraethylene glycol |  |  |  | 9.0 |  |  |  |  |
| Thiodiglycol |  |  | 3.5 |  |  | 2.0 |  |  |
| Trimethylolpropane |  |  |  |  |  |  | 1.0 |  |
| Trimethylolethane |  |  |  |  |  |  | 1.0 |  |
| 1,3-dimethyl-2-imidazolidinone |  |  |  | 2.0 |  |  |  |  |
| sodium benzoate |  |  |  | 0.1 |  |  |  |  |
| Triethanolamine | 0.8 | 0.9 | 1.0 | 0.7 | 0.9 | 0.9 | 0.5 | 0.9 |
| potassium hydroxide |  |  | 0.1 |  |  |  | 0.05 | 0.1 |
| Proxel XL-2 | 0.03 | 0.03 | 0.03 | 0.03 | 0.03 | 0.03 | 0.03 | 0.03 |
| Benzotriazole | 0.02 | 0.02 | 0.02 | 0.02 | 0.02 | 0.02 | 0.02 | 0.02 |
| Water | balance | balance | balance | balance | balance | balance | balance | balance |
| surface tension (mN/m) | 33 | 33 | 31 | 34 | 34 | 33 | 32 | 32 |

TABLE 31

|  | Ex. 198 | Ex. 199 | Ex. 200 | Ex. 201 | Ex. 202 | Ex. 203 | Ex. 204 | Ex. 205 |
|---|---|---|---|---|---|---|---|---|
| Colorant | 7.5 | 4.5 | 5.5 | 5.0 | 3.0 | 5.0 | 5.0 | 5.5 |
|  | 1-1 | 1-2 | 1-3 | 1-4 | 3-1 | 3-2 | 3-3 | 3-4 |
| Olfin E1010 | 1.0 |  |  |  |  | 1.0 |  |  |
| Olfin STG |  |  | 0.5 |  |  |  |  | 1.0 |
| Surfynol 465 |  | 1.2 |  |  |  |  | 1.0 |  |
| Surfynol 61 |  |  |  | 0.5 |  |  | 0.5 |  |
| DEGmBE |  | 2.5 | 7.0 |  | 7.0 |  | 8.0 | 10.0 |
| TEGmBE | 5.0 |  |  | 3.0 |  | 6.0 |  |  |
| PGmBE |  |  |  |  |  |  |  | 2.0 |
| DPGmBE |  |  |  |  | 2.0 |  |  |  |
| DPDmBE |  |  | 3.0 |  |  |  |  |  |
| 1,2-propanediol |  |  |  |  |  | 3.0 |  |  |
| 1,2-pentanediol |  |  |  | 5.0 |  |  |  |  |
| 1,2-hexanediol |  | 4.5 | 1.0 |  |  | 3.0 |  |  |
| compound of formula (1) |  |  |  | 8.0 | 7.0 |  | 10.0 | 6.0 |
|  |  |  |  | 1-4 | 1-5 |  | 1-25 | 1-8 |
| 1,5-pentanediol |  |  |  | 2.0 |  |  |  |  |
| Glycerin | 12.0 | 12.0 | 7.0 | 8.0 | 14.0 | 10.0 | 10.0 | 7.0 |
| Maltitol | 3.5 | 2.5 |  |  |  | 3.0 |  | 5.0 |
| Maltose |  |  | 3.0 |  |  |  |  |  |
| Erythritol |  | 2.5 |  |  |  |  |  | 1.0 |
| isomalto-oligosaccharide |  |  | 2.0 |  |  |  |  |  |
| Mannitol |  |  |  | 3.0 |  |  |  |  |
| Sorbitol |  |  |  | 2.0 |  |  |  |  |
| Fructose |  |  |  |  | 2.0 |  | 3.0 |  |
| Xylitol |  |  |  |  | 5.0 |  |  |  |
| Glucose |  |  |  |  |  | 2.0 |  |  |
| Xylose |  |  |  |  |  |  | 2.0 |  |
| diethylene glycol |  |  | 7.0 |  |  |  |  | 5.0 |
| tetraethylene glycol |  |  |  | 1.0 |  |  |  |  |
| tetrapropylene glycol |  |  |  |  |  |  |  | 5.0 |
| Trimethylolpropane |  |  |  |  |  |  | 1.0 |  |
| Trimethylolethane |  |  |  |  |  |  | 1.0 |  |
| 1,3-dimethyl-2-imidazolidinone |  |  |  | 2.0 |  |  |  |  |
| sodium benzoate |  |  |  |  |  |  |  |  |
| Triethanolamine | 0.8 | 0.9 |  | 0.7 | 0.9 |  | 0.5 | 0.9 |
| potassium hydroxide |  |  | 0.1 | 0.1 |  | 0.1 | 0.05 | 0.1 |
| Proxel XL-2 | 0.03 | 0.03 | 0.03 |  |  |  |  |  |
| Proxel TN |  |  |  |  |  |  | 0.04 |  |
| Deniside CST |  |  |  | 0.01 |  |  |  |  |
| Deniside CSA |  |  |  |  |  |  | 0.01 |  |
| Deniside C3 |  |  |  | 0.02 |  |  |  |  |
| Deniside OMP |  |  |  |  |  | 0.03 |  |  |
| Microstat S520 |  |  |  |  |  | 0.03 |  |  |
| NS-BP |  |  |  |  |  |  |  | 0.05 |

TABLE 31-continued

|  | Ex. 198 | Ex. 199 | Ex. 200 | Ex. 201 | Ex. 202 | Ex. 203 | Ex. 204 | Ex. 205 |
|---|---|---|---|---|---|---|---|---|
| Benzotriazole | 0.02 | 0.02 | 0.03 |  | 0.02 | 0.02 | 0.03 |  |
| dicyclohexylammonium nitrate |  |  |  | 0.02 |  |  |  | 0.02 |
| disodium salt of ethylenediaminetetraacetic acid | 0.03 | 0.03 | 0.03 |  | 0.03 | 0.03 | 0.02 |  |
| dipotassium salt of ethylenediaminetetraacetic acid |  |  |  | 0.03 |  |  |  | 0.02 |
| Water | balance | balance | balance | balance | balance | balance | balance | balance |
| surface tension (mN/m) | 33 | 32 | 31 | 34 | 34 | 33 | 33 | 32 |

In accordance with the compositions set forth below, inks of (Comparative Example 3) to (Comparative Example) 5 were prepared.

Comparative Example 3

|  | Weight (%) |
|---|---|
| Carbon black pigment (mean particle size, 105 nm) | 5.0 |
| Glycerin | 10.0 |
| Dispersant | 3.0 |
| Nonionic surfactant | 1.0 |
| Ion-exchanged water | balance |

Carbon black pigment: Raven C (manufactured by Columbia Carbon)
Nonionic surfactant: Noigen EA160 (manufactured by Daiichi Kogyo Seiyaku)
Dispersant: Joncryl 62 (manufactured by Johnson Polymer)

Comparative Example 4

|  | Weight (%) |
|---|---|
| Acid Blue 9 | 5.5 |
| DEGmME | 7.0 |
| Diethylene glycol | 10.0 |
| 2-Pyrrolidone | 5.0 |
| Ion-exchanged water | balance |

Comparative Example 5

|  | Weight (%) |
|---|---|
| Direct Black 154 | 2.5 |
| Diethylene glycol | 10.0 |
| Nonionic surfactant | 1.0 |
| Ion-exchanged water | balance |

Nonionic surfactant: Epan 450 (manufactured by Daiichi Kogyo Seiyaku)

Inks of Comparative Example 6 to Comparative Example 15 were prepared by adding, to the composition of Comparative Example 3, at least one compound selected from acetylene glycol surfactants, acetylene alcohol surfactants, glycol ethers and 1,2-alkylene glycols as shown in Table 32 below.

TABLE 32

|  | Comp. 6 | Comp. 7 | Comp. 8 | Comp. 9 | Comp. 10 | Comp. 11 | Comp. 12 | Comp. 13 | Comp. 14 | Comp. 15 |
|---|---|---|---|---|---|---|---|---|---|---|
| Olfin E1010 |  | 1 | 1 |  | 1 |  |  |  | 1 |  |
| Olfin STG | 0.5 |  |  | 0.5 |  |  | 1 | 0.5 |  |  |
| Surfynol 465 |  |  |  |  |  |  |  |  |  |  |
| Surfynol 61 |  |  |  |  |  | 0.5 |  | 0.5 |  |  |
| DEGmBE | 5 |  | 5 |  |  | 6 | 10 |  |  |  |
| TEGmBE |  | 8 |  | 7 |  |  |  | 8 |  |  |
| PGmBE |  |  |  | 2 |  |  |  |  |  |  |
| DPGmBE |  |  |  | 2 |  |  | 3 |  |  |  |
| 1,2-pentanediol |  |  |  |  |  | 5 |  |  |  | 5 |
| 1,2-hexanediol |  |  |  |  | 3 |  |  | 2 |  | 2 |

The inks of Examples and Comparative Examples were evaluated according to the tests set forth below.
<Evaluation 1: Print Quality>
Using an ink jet printer, MJ-930C (manufactured by Seiko Epson), each 24 pieces of upper-case and lower-case alphabet letters were printed with each ink on various kinds of paper set forth below. The printed letters were visually observed, and evaluated according to the following criteria.
SA: No bleeding was found on every kind of paper, and the printed density is high.
AA: No bleeding was found on every kind of paper, but the printed density is lower than that of the SA-rank.
A: Some bleeding was found only on a few kinds of paper.
B: Some bleeding was found on every kind of paper.
C: Much bleeding was found on every kind of paper.

Used in the test were 12 kinds of paper: Conqueror paper, Favorit paper, Modo paper, Rapid Copy paper, Epson EPP paper, Xerox P paper, Xerox 4024 paper, Xerox 10 paper, Neenha Bond paper, Ricopy 6200 paper, Yamayuri paper (regenerated paper) and Xerox R paper (regenerated paper).

<Evaluation 2: Water Resistance>

Onto the printed area of each printed matter obtained in the print quality test of evaluation 1, 1 ml of ion-exchanged water was dropped. The condition of the printed matter, 20 minutes after the drop, was visually observed, and was evaluated according to the following criteria.

A: No change was found in every kind of paper.

B: A little colorant bled out of the printed area, but the printed letters are still recognizable.

C: The colorant bled out of the printed area, making the outline of the printed letters blurred and making it difficult to recognize the printed letters.

<Evaluation 3: Dispersion Stability (1)>

Each ink was put in a glass sample bottle (50 ml) and the bottle was sealed. The sealed bottle was stored at 60° C. for 2 weeks. Before and after the storage, the viscosity of the ink was measured with Rheometrics Scientific RFS2 at 20° C. and 150 sec$^{-1}$. The obtained data was evaluated according to the following criteria.

SA: The viscosity change is smaller than ±0.02 mPa·s.

AA: The viscosity change ranges from ±0.02 to smaller than 0.05 mPa·s.

A: The viscosity change ranges from ±0.05 to smaller than 0.1 mPa·s.

B: The viscosity change ranges from ±0.1 to smaller than 0.3 mPa·s.

C: The viscosity change is ±0.3 mPa·s or more.

<Evaluation 4: Dispersion Stability (2)>

Each ink was put in a glass sample bottle (50 ml) and the bottle was sealed. The sealed bottle was stored at 60° C. for 2 weeks to see whether a sediment or foreign substance is generated or not, and the result was evaluated according to the following criteria.

A: Generation of sediments or foreign substance was not found.

B: Generation of sediments or foreign substance was found.

<Evaluation 5: Clogging Resistance Reliability (1)>

Each ink was filled in the head of an ink jet printer, MJ-930C manufactured by Seiko Epson, with which alphabet and numeral letters were printed on paper continuously for 10 minutes. Thereafter, the printer was stopped, and left at 40° C. and a humidity of 25% for 2 weeks with no cap fitted thereto. After this suspension, the printer was again used to print alphabet and numeral letters. The number of operation times required until prints of the same quality as that of the prints before the suspension (the number of operation times for recovery) was counted, and was evaluated according to the following criteria.

SA: Prints of the same quality as that before the suspension were obtained with 0 to 1 recovery operation.

AA: Prints of the same quality as that before the suspension were obtained with 2 to 3 recovery operations.

A: Prints of the same quality as that before the suspension were obtained with 3 to 4 recovery operations.

B: Prints of the same quality as that before the suspension were obtained with 5 to 6 recovery operations.

C: Prints of the same quality as that before the suspension could not obtained even with 7 recovery operations.

<Evaluation 6: Ejection Stability>

Using an ink jet printer, MJ-930C (manufactured by Seiko Epson), alphabet and numeral letters were continuously printed with each ink on Xerox P paper. The printing condition such as dot deletion and deviation in the ink-landing position was visually observed, and was evaluated according to the following criteria.

SA: Even after printing over 50000 sheets, neither dot deletion nor deviation in the ink-landing position was found.

AA: Dot deletion or deviation in the ink-landing position was found at the number of printed sheets of from 10000 to less than 50000.

A: Dot deletion or deviation in the ink-landing position was found at the number of printed sheets of from 1000 to less than 10000.

B: Dot deletion or deviation in the ink-landing position was found at the number of printed sheets of from 100 to less than 1000.

C: Dot deletion or deviation in the ink-landing position was found at the number of printed sheets of less than 100.

<Evaluation 7: Rubbing Resistance>

Using the head of an ink jet printer, MJ-930C manufactured by Seiko Epson, solid printing was carried out with each ink at 100% duty on an area of 10 mm×10 mm of a superfine-exclusive glossy film manufactured by Seiko Epson. The printed film was then left for 1 hour at 25° C., and then the printed area was rubbed with an aqueous yellow fluorescent ink pen, ZEBRA PEN2 (trademark) manufactured by Zebra, under a load of 500 g at a speed of 10 mm/sec. The printed film was observed to see the presence or absence of stains therein, and the result was evaluated according to the following criteria.

A: Not stained at all, even after rubbed twice.

B: Not stained after rubbed once, but stained after rubbed twice.

C: Stained when rubbed once.

<Evaluation 8: Rapid Dryability>

Using an ink jet printer, MJ-930C (manufactured by Seiko Epson), solid printing was carried out with each ink at 100% duty on an area of 10 mm×10 mm of Xerox P paper. 10 seconds after the solid printing, a fresh sheet of the same kind paper was put on the printed area, and a 300 g weight was put thereon. After kept as such for 10 seconds, the weight was removed, and the latter fresh sheet was checked for the presence or absence of ink transfer thereto. The result was evaluated according to the following criteria.

A: No ink transfer was found.

B: Ink transfer was found.

TABLE 33

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| Print Quality | SA | SA | SA | SA | SA | SA | SA | SA | SA | SA | SA | SA | SA | SA |
| Water resistance | A | A | A | A | A | A | A | A | A | A | A | A | A | A |
| Dispersion Stability (1) | SA | SA | SA | SA | SA | SA | SA | SA | SA | SA | SA | SA | SA | SA |
| Dispersion Stability (2) | A | A | A | A | A | A | A | A | A | A | A | A | A | A |
| Clogging Resistance Reliability (1) | AA | AA | AA | AA | AA | AA | AA | AA | AA | AA | AA | AA | AA | AA |

TABLE 33-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| Jetting Stability | SA | SA | SA | SA | SA | SA | SA | SA | SA | SA | SA | SA | SA | SA |
| Rubbing Resistance | A | A | A | A | A | A | A | A | A | A | A | A | A | A |
| Rapid Dryability | A | A | A | A | A | A | A | A | A | A | A | A | A | A |

TABLE 34

|  | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|
| Print Quality | SA | SA | SA | SA | SA | SA | SA | SA | SA | SA | SA | SA | SA | SA |
| Water resistance | A | A | A | A | A | A | A | A | A | A | A | A | A | A |
| Dispersion Stability (1) | SA | SA | SA | SA | SA | SA | SA | SA | SA | SA | SA | SA | SA | SA |
| Dispersion Stability (2) | A | A | A | A | A | A | A | A | A | A | A | A | A | A |
| Clogging Resistance Reliability (1) | AA | AA | AA | AA | AA | AA | AA | AA | AA | AA | AA | AA | AA | AA |
| Jetting Stability | AA | AA | SA | AA | AA | AA | AA | SA | AA | SA | SA | SA | SA | SA |
| Rubbing Resistance | A | A | A | A | A | A | A | A | A | A | A | A | A | A |
| Rapid Dryability | A | A | A | A | A | A | A | A | A | A | A | A | A | A |

TABLE 35

|  | Ex. 29 | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|---|---|---|---|
| Print Quality | SA | SA | AA | AA | AA | AA | AA | AA | AA | AA | AA | AA | AA | AA |
| Water resistance | A | A | A | A | A | A | A | A | A | A | A | A | A | A |
| Dispersion Stability (1) | SA | SA | SA | SA | SA | SA | SA | SA | A | A | A | A | A | A |
| Dispersion Stability (2) | A | A | A | A | A | A | A | A | A | A | A | A | A | A |
| Clogging Resistance Reliability (1) | AA | AA | AA | AA | AA | AA | AA | AA | A | A | A | A | A | A |
| Jetting Stability | SA | SA | AA | AA | AA | AA | AA | AA | A | A | A | A | A | A |
| Rubbing Resistance | A | A | A | A | A | A | A | A | A | A | A | A | A | A |
| Rapid Dryability | A | A | A | A | A | A | A | A | A | A | A | A | A | A |

TABLE 36

|  | Ex. 43 | Ex. 44 | Ex. 45 | Ex. 46 | Ex. 47 | Ex. 48 | Ex. 49 | Ex. 50 | Ex. 51 | Ex. 52 | Ex. 53 | Ex. 54 | Ex. 55 | Ex. 56 |
|---|---|---|---|---|---|---|---|---|---|---|---|---|---|---|
| Print Quality | AA | AA | AA | AA | A | A | A | A | A | A | A | A | AA | AA |
| Water resistance | A | A | A | A | A | A | A | A | A | A | A | A | A | A |
| Dispersion Stability (1) | A | A | A | A | A | A | A | A | A | A | A | A | AA | AA |
| Dispersion Stability (2) | A | A | A | A | A | A | A | A | A | A | A | A | A | A |
| Clogging Resistance Reliability (1) | A | A | A | A | A | A | A | A | A | A | A | A | A | A |
| Jetting Stability | A | A | A | A | A | A | A | A | A | A | A | A | AA | AA |
| Rubbing Resistance | A | A | A | A | A | A | A | A | A | A | A | A | A | A |
| Rapid Dryability | A | A | A | A | A | A | A | A | A | A | A | A | A | A |

TABLE 37

|  | Ex. 57 | Ex. 58 | Ex. 59 | Ex. 60 | Ex. 61 | Ex. 62 | Ex. 63 | Ex. 64 | Ex. 65 | Ex. 66 | Ex. 67 | Ex. 68 | Ex. 69 | Ex. 70 |
|---|---|---|---|---|---|---|---|---|---|---|---|---|---|---|
| Print Quality | SA | SA | SA | SA | SA | SA | SA | SA | SA | SA | SA | SA | SA | SA |
| Water resistance | A | A | A | A | A | A | A | A | A | A | A | A | A | A |
| Dispersion Stability (1) | SA | SA | SA | SA | SA | SA | SA | SA | SA | SA | SA | SA | SA | SA |
| Dispersion Stability (2) | A | A | A | A | A | A | A | A | A | A | A | A | A | A |
| Clogging Resistance Reliability (1) | SA | SA | SA | SA | SA | SA | SA | SA | SA | SA | SA | SA | SA | SA |

TABLE 37-continued

|  | Ex. 57 | Ex. 58 | Ex. 59 | Ex. 60 | Ex. 61 | Ex. 62 | Ex. 63 | Ex. 64 | Ex. 65 | Ex. 66 | Ex. 67 | Ex. 68 | Ex. 69 | Ex. 70 |
|---|---|---|---|---|---|---|---|---|---|---|---|---|---|---|
| Jetting Stability | SA | SA | SA | SA | SA | SA | SA | SA | SA | SA | SA | SA | AA | AA |
| Rubbing Resistance | A | A | A | A | A | A | A | A | A | A | A | A | A | A |
| Rapid Dryability | A | A | A | A | A | A | A | A | A | A | A | A | A | A |

TABLE 38

|  | Ex. 71 | Ex. 72 | Ex. 73 | Ex. 74 | Ex. 75 | Ex. 76 | Ex. 77 | Ex. 78 | Ex. 79 | Ex. 80 | Ex. 81 | Ex. 82 | Ex. 83 | Ex. 84 |
|---|---|---|---|---|---|---|---|---|---|---|---|---|---|---|
| Print Quality | SA | SA | SA | SA | SA | SA | SA | SA | SA | SA | SA | AA | AA | AA |
| Water resistance | A | A | A | A | A | A | A | A | A | A | A | A | A | A |
| Dispersion Stability (1) | SA | SA | SA | SA | SA | SA | SA | SA | SA | SA | SA | SA | SA | SA |
| Dispersion Stability (2) | A | A | A | A | A | A | A | A | A | A | A | A | A | A |
| Clogging Resistance Reliability (1) | SA | SA | SA | SA | SA | SA | SA | SA | SA | SA | SA | SA | SA | SA |
| Jetting Stability | SA | AA | AA | AA | AA | SA | AA | SA | SA | SA | SA | AA | AA | AA |
| Rubbing Resistance | A | A | A | A | A | A | A | A | A | A | A | A | A | A |
| Rapid Dryability | A | A | A | A | A | A | A | A | A | A | A | A | A | A |

TABLE 39

|  | Ex. 85 | Ex. 86 | Ex. 87 | Ex. 88 | Ex. 89 | Ex. 90 | Ex. 91 | Ex. 92 | Ex. 93 | Ex. 94 | Ex. 95 | Ex. 96 | Ex. 97 | Ex. 98 |
|---|---|---|---|---|---|---|---|---|---|---|---|---|---|---|
| Print Quality | AA | AA | AA | AA | AA | AA | AA | AA | AA | AA | AA | AA | AA | A |
| Water resistance | A | A | A | A | A | A | A | A | A | A | A | A | A | A |
| Dispersion Stability (1) | SA | SA | SA | A | A | A | A | A | A | A | A | A | A | A |
| Dispersion Stability (2) | A | A | A | A | A | A | A | A | A | A | A | A | A | A |
| Clogging Resistance Reliability (1) | SA | SA | SA | AA | AA | AA | AA | AA | AA | AA | AA | AA | AA | AA |
| Jetting Stability | AA | AA | AA | A | A | A | A | A | A | A | A | A | A | A |
| Rubbing Resistance | A | A | A | A | A | A | A | A | A | A | A | A | A | A |
| Rapid Dryability | A | A | A | A | A | A | A | A | A | A | A | A | A | A |

TABLE 40

|  | Ex. 99 | Ex. 100 | Ex. 101 | Ex. 102 | Ex. 103 | Ex. 104 | Ex. 105 | Ex. 106 | Ex. 107 | Ex. 108 | Ex. 109 | Ex. 110 | Ex. 111 | Ex. 112 |
|---|---|---|---|---|---|---|---|---|---|---|---|---|---|---|
| Print Quality | A | A | A | A | A | A | A | AA | SA | SA | SA | SA | AA | AA |
| Water resistance | A | A | A | A | A | A | A | A | A | A | A | A | A | A |
| Dispersion Stability (1) | A | A | A | A | A | A | A | AA | SA | SA | SA | SA | SA | SA |
| Dispersion Stability (2) | A | A | A | A | A | A | A | A | A | A | A | A | A | A |
| Clogging Resistance Reliability (1) | AA | AA | AA | AA | AA | AA | AA | AA | AA | AA | AA | AA | AA | AA |
| Jetting Stability | A | A | A | A | A | A | A | AA | SA | SA | SA | SA | AA | AA |
| Rubbing Resistance | A | A | A | A | A | A | A | A | A | A | A | A | A | A |
| Rapid Dryability | A | A | A | A | A | A | A | A | A | A | A | A | A | A |

TABLE 41

|  | Ex. 113 | Ex. 114 | Ex. 115 | Ex. 116 | Ex. 117 | Ex. 118 | Ex. 119 | Ex. 120 | Ex. 121 | Ex. 122 | Ex. 123 | Ex. 124 |
|---|---|---|---|---|---|---|---|---|---|---|---|---|
| Print Quality | AA | AA | SA | SA | SA | SA | AA | AA | AA | AA | SA | AA |
| Water resistance | A | A | A | A | A | A | A | A | A | A | A | A |
| Dispersion Stability (1) | SA | SA | SA | SA | SA | SA | SA | SA | SA | SA | SA | SA |
| Dispersion Stability (2) | A | A | A | A | A | A | A | A | A | A | A | A |
| Clogging Resistance Reliability (1) | AA | AA | SA | SA | SA | SA | SA | SA | SA | SA | SA | SA |

TABLE 41-continued

|  | Ex. 113 | Ex. 114 | Ex. 115 | Ex. 116 | Ex. 117 | Ex. 118 | Ex. 119 | Ex. 120 | Ex. 121 | Ex. 122 | Ex. 123 | Ex. 124 |
| --- | --- | --- | --- | --- | --- | --- | --- | --- | --- | --- | --- | --- |
| Jetting Stability | AA | AA | SA | SA | SA | SA | SA | SA | SA | SA | SA | AA |
| Rubbing Resistance | A | A | A | A | A | A | A | A | A | A | A | A |
| Rapid Dryability | A | A | A | A | A | A | A | A | A | A | A | A |

TABLE 42

|  | Ex. 125 | Ex. 126 | Ex. 127 | Ex. 128 | Ex. 129 | Ex. 130 | Ex. 131 | Ex. 132 | Ex. 133 | Ex. 134 | Ex. 135 | Ex. 136 | Ex. 137 |
| --- | --- | --- | --- | --- | --- | --- | --- | --- | --- | --- | --- | --- | --- |
| Print Quality | AA | AA | SA | SA | SA | SA | SA | SA | SA | SA | SA | SA | SA |
| Water resistance | A | A | A | A | A | A | A | A | A | A | A | A | A |
| Dispersion Stability (1) | SA | SA | SA | SA | SA | SA | SA | SA | SA | SA | SA | SA | SA |
| Dispersion Stability (2) | A | A | A | A | A | A | A | A | A | A | A | A | A |
| Clogging Resistance Reliability (1) | SA | AA | SA | SA | SA | SA | SA | SA | SA | SA | SA | SA | SA |
| Jetting Stability | AA | AA | SA | SA | SA | SA | SA | SA | SA | SA | SA | SA | SA |
| Rubbing Resistance | A | A | A | A | A | A | A | A | A | A | A | A | A |
| Rapid Dryability | A | A | A | A | A | A | A | A | A | A | A | A | A |

TABLE 43

|  | Ex. 138 | Ex. 139 | Ex. 140 | Ex. 141 | Ex. 142 | Ex. 143 | Ex. 144 | Ex. 145 | Ex. 146 | Ex. 147 | Ex. 148 | Ex. 149 | Ex. 150 | Ex. 151 |
| --- | --- | --- | --- | --- | --- | --- | --- | --- | --- | --- | --- | --- | --- | --- |
| Print Quality | SA | AA | AA | AA | AA | SA | SA | SA | SA | SA | SA | SA | SA | AA |
| Water resistance | A | A | A | A | A | A | A | A | A | A | A | A | A | A |
| Dispersion Stability (1) | SA | SA | SA | SA | SA | SA | SA | SA | SA | SA | SA | SA | SA | AA |
| Dispersion Stability (2) | A | A | A | A | A | A | A | A | A | A | A | A | A | A |
| Clogging Resistance Reliability (1) | SA | SA | SA | SA | SA | AA | AA | AA | AA | AA | AA | AA | AA | A |
| Jetting Stability | SA | AA | AA | AA | AA | SA | SA | SA | SA | SA | SA | SA | SA | AA |
| Rubbing Resistance | A | A | A | A | A | A | A | A | A | A | A | A | A | A |
| Rapid Dryability | A | A | A | A | A | A | A | A | A | A | A | A | A | A |

TABLE 44

|  | Ex. 152 | Ex. 153 | Ex. 154 | Ex. 155 | Ex. 156 | Ex. 157 | Ex. 158 | Ex. 159 | Ex. 160 | Ex. 161 | Ex. 162 | Ex. 163 | Ex. 164 | Ex. 165 |
| --- | --- | --- | --- | --- | --- | --- | --- | --- | --- | --- | --- | --- | --- | --- |
| Print Quality | AA | AA | AA | AA | SA | SA | SA | SA | AA | AA | AA | AA | AA | SA |
| Water resistance | A | A | A | A | A | A | A | A | A | A | A | A | A | A |
| Dispersion Stability (1) | AA | AA | AA | AA | SA | SA | SA | SA | AA | AA | AA | AA | AA | SA |
| Dispersion Stability (2) | A | A | A | A | A | A | A | A | A | A | A | A | A | A |
| Clogging Resistance Reliability (1) | A | A | A | A | SA | SA | SA | SA | AA | AA | AA | AA | AA | SA |
| Jetting Stability | AA | AA | AA | AA | SA | SA | SA | SA | AA | AA | AA | AA | AA | SA |
| Rubbing Resistance | A | A | A | A | A | A | A | A | A | A | A | A | A | A |
| Rapid Dryability | A | A | A | A | A | A | A | A | A | A | A | A | A | A |

TABLE 45

|  | Ex. 166 | Ex. 167 | Ex. 168 | Comp. 1 | Comp. 2 | Ex. 169 | Ex. 170 | Ex. 171 | Ex. 172 | Ex. 173 | Ex. 174 |
| --- | --- | --- | --- | --- | --- | --- | --- | --- | --- | --- | --- |
| Print Quality | SA | SA | SA | AA | B | SA | SA | AA | SA | SA | SA |
| Water resistance | A | A | A | A | A | A | A | A | A | A | A |
| Dispersion Stability (1) | SA | SA | SA | SA | AA | SA | SA | A | SA | SA | SA |
| Dispersion Stability (2) | A | A | A | A | A | A | A | A | A | A | A |
| Clogging Resistance Reliability (1) | SA | SA | SA | SA | AA | AA | AA | A | AA | AA | AA |

TABLE 45-continued

|  | Ex. 166 | Ex. 167 | Ex. 168 | Comp. 1 | Comp. 2 | Ex. 169 | Ex. 170 | Ex. 171 | Ex. 172 | Ex. 173 | Ex. 174 |
|---|---|---|---|---|---|---|---|---|---|---|---|
| Jetting Stability | SA | SA | SA | AA | C | SA | SA | A | SA | SA | SA |
| Rubbing Resistance | A | A | A | A | A | A | A | A | A | A | A |
| Rapid Dryability | A | A | A | B | A | A | A | A | A | A | A |

TABLE 46

|  | Ex. 175 | Ex. 176 | Ex. 177 | Ex. 178 | Ex. 179 | Ex. 180 | Ex. 181 | Ex. 182 | Ex. 183 | Ex. 184 | Ex. 185 |
|---|---|---|---|---|---|---|---|---|---|---|---|
| Print Quality | AA | SA | SA | SA | SA | SA | SA | SA | SA | SA | SA |
| Water resistance | A | A | A | A | A | A | A | A | A | A | A |
| Dispersion Stability (1) | A | SA | SA | SA | SA | SA | SA | SA | SA | SA | SA |
| Dispersion Stability (2) | A | A | A | A | A | A | A | A | A | A | A |
| Clogging Resistance Reliability (1) | A | AA | AA | AA | AA | AA | AA | AA | AA | AA | AA |
| Jetting Stability | AA | SA | SA | SA | SA | SA | SA | A | SA | SA | SA |
| Rubbing Resistance | A | A | A | A | A | A | A | A | A | A | A |
| Rapid Dryability | A | A | A | A | A | A | A | A | A | A | A |

TABLE 47

|  | Ex. 186 | Ex. 187 | Ex. 188 | Ex. 189 | Ex. 190 | Ex. 191 | Ex. 192 | Ex. 193 | Ex. 194 | Ex. 195 | Ex. 196 | Ex. 197 | Ex. 198 |
|---|---|---|---|---|---|---|---|---|---|---|---|---|---|
| Print Quality | SA | AA | AA | AA | SA | SA | SA | SA | AA | AA | AA | AA | SA |
| Water resistance | A | A | A | A | A | A | A | A | A | A | A | A | A |
| Dispersion Stability (1) | SA | SA | SA | SA | SA | SA | SA | SA | SA | SA | SA | SA | SA |
| Dispersion Stability (2) | A | A | A | A | A | A | A | A | A | A | A | A | A |
| Clogging Resistance Reliability (1) | AA | AA | AA | AA | AA | AA | AA | AA | AA | AA | AA | AA | AA |
| Jetting Stability | AA | AA | AA | SA | SA | SA | SA | A | AA | AA | AA | AA | SA |
| Rubbing Resistance | A | A | A | A | A | A | A | A | A | A | A | A | A |
| Rapid Dryability | A | A | A | A | A | A | A | A | A | A | A | A | A |

TABLE 48

|  | Ex. 199 | Ex. 200 | Ex. 201 | Ex. 202 | Ex. 203 | Ex. 204 | Ex. 205 | Comp. 3 | Comp. 4 | Comp. 5 | Comp. 6 | Comp. 7 | Comp. 8 |
|---|---|---|---|---|---|---|---|---|---|---|---|---|---|
| Print Quality | SA | SA | SA | AA | AA | AA | AA | C | C | C | B | B | B |
| Water resistance | A | A | A | A | A | A | A | A | C | C | A | A | A |
| Dispersion Stability (1) | SA | SA | SA | SA | SA | SA | SA | C | — | — | C | C | C |
| Dispersion Stability (2) | A | A | A | A | A | A | A | B | — | — | B | B | B |
| Clogging Resistance Reliability (1) | AA | AA | AA | AA | AA | AA | AA | C | A | A | C | C | C |
| Jetting Stability | SA | SA | SA | AA | AA | AA | AA | C | C | C | C | C | C |
| Rubbing Resistance | A | A | A | A | A | A | A | C | C | C | C | C | C |
| Rapid Dryability | A | A | A | A | A | A | A | B | A | B | A | A | A |

TABLE 49

|  | Comp. 9 | Comp. 10 | Comp. 11 | Comp. 12 | Comp. 13 | Comp. 14 | Comp. 15 |
|---|---|---|---|---|---|---|---|
| Print Quality | B | B | B | B | B | B | B |
| Water resistance | A | A | A | A | A | A | A |
| Dispersion Stability (1) | C | C | C | C | C | C | C |
| Dispersion Stability (2) | B | B | B | B | B | B | B |
| Clogging Resistance Reliability (1) | C | C | C | C | C | C | C |

TABLE 49-continued

|  | Comp. 9 | Comp. 10 | Comp. 11 | Comp. 12 | Comp. 13 | Comp. 14 | Comp. 15 |
| --- | --- | --- | --- | --- | --- | --- | --- |
| Jetting Stability | C | C | C | C | C | C | C |
| Rubbing Resistance | C | C | C | C | C | C | C |
| Rapid Dryability | A | A | A | A | A | A | A |

As shown above, the inks of Examples, when used in printing on various kinds of plain paper and regenerated paper (Yamayuri, Xerox R), provided high-quality images with reduced bleeding on the printed images.

On the other hand, the ink in which a pigment is dispersed with ordinary dispersant (Comparative Example 3) and the inks of dye colorant (Comparative Example 4, Comparative Example 5) caused bleeding, and could not provide high-quality images.

The colorants of the inks of the Examples are insoluble in water. Therefore, as compared with those using a water-soluble dye such as Comparative Examples 4 and 5, the images formed by the inks of the Examples have extremely excellent water resistance.

As can be understood from the results in Tables 32 to 49 above, the inks of the Examples produced neither sediments nor foreign substance, exhibited almost no change in their physical properties, and had satisfactory dispersion stability and ejection stability.

Specifically, it has been confirmed that satisfactory ejection stability and dispersion stability can be attained, firstly, by combining the "colorant of a pigment/and or dye enveloped in a polymer" and the "at least one compound selected from the group consisting of acetylene glycol surfactants, acetylene alcohol surfactants, glycol ethers and 1,2-alkylene glycols".

On the other hand, even when the "colorant of pigment/and or dye enveloped in a polymer" and the "at least one compound selected from the group consisting of acetylene glycol surfactants, acetylene alcohol surfactants, glycol ethers and 1,2-alkylene glycols" were added to an ink in which a pigment is dispersed with ordinary dispersant (Comparative Examples 6 to 15), satisfactory dispersion stability and ejection stability could not be obtained.

The inks further containing at least one compound selected from the group consisting of polyalcohols and compounds of formula (1) exhibited extremely satisfactory dispersion stability and ejection stability, with almost no generation of sediments and foreign substance and almost no change in physical properties.

The inks further containing at least one compound selected from saccharide and formula (2), and glycerin exhibited extremely satisfactory clogging resistance reliability.

When the surface tension thereof was larger than 45 mN/m, the rapid dryability was deteriorated, readily causing bleeding. When the surface tension was smaller than 25 mN/m, the ejection was not stable. That is, it was confirmed that the surface tension of the ink preferably falls between 25 and 45 mN/m.

<Evaluation Test: Clogging Resistance Reliability (2)>

Regarding the "polymer-enveloped pigment colorants" contained in the inks of Examples 127 to 134, the amount, % by weight, of the "polymer" with respect to the "polymer-enveloped pigment colorant" was varied as shown in Table 50, and those inks were tested for the clogging resistance reliability. The test method is as follows: Each ink was charged in the ink cartridge in an ink jet printer, MJ-930C manufactured by Seiko Epson, left therein at 40° C. and at a humidity of 20% for 3 months, and then taken out. Thereafter, the printer was tested in a cleaning mode (this is a mode intrinsic to the ink jet printer, MJ-930J manufactured by Seiko Epson, for recovering the function of the printer when dot deletion or the like occurs), and the number of cleaning mode operations required for recovering was counted. "A" indicates that the printer recovered with three times or less operations; "B" indicates that the printer recovered with 4 or 5 times operations; "C" indicates that the printer recovered with 5 to 20 times operations; and "D" indicates that the printer did not recover even with 20 times or more operations.

TABLE 50

Clogging Resistance Reliability (2)

| | | amount of polymer (wt. %) | | | | | | | |
| --- | --- | --- | --- | --- | --- | --- | --- | --- | --- |
| | | 1 | 2 | 5 | 10 | 15 | 20 | 30 | 50 |
| Inks with varying amount of polymer in colorant | Ex. 51 | D | D | C | A | A | A | A | A |
| | Ex. 52 | D | D | C | A | A | A | A | A |
| | Ex. 53 | D | D | C | A | A | A | A | A |
| | Ex. 54 | D | D | C | A | A | A | A | A |
| | Ex. 55 | D | D | C | A | A | A | A | A |
| | Ex. 56 | D | D | C | A | A | A | A | A |
| | Ex. 57 | D | D | C | A | A | A | A | A |
| | Ex. 58 | D | D | C | A | A | A | A | A |

As can be seen from the results in Table 50, it was confirmed that when the amount of the polymer is 10% by weight or more, particularly, good clogging recovering property can be obtained.

Regarding the "polymer-enveloped pigment colorants" contained in the color inks of Examples 128 to 134, the amount of the polymer was varied as shown in Table 51. Using MJ-930C, solid printing was carried out with those inks on paper exclusively for OHP (manufactured by Seiko Epson). The measurement results of the haze thereof are shown. The haze was measured with a haze meter (manufactured by Suga Test Instruments). Smaller data indicate lower haze and higher transparency.

TABLE 51

Data of Haze

| | | amount of polymer (wt. %) | | | | | | | |
| --- | --- | --- | --- | --- | --- | --- | --- | --- | --- |
| | | 1 | 2 | 5 | 10 | 15 | 20 | 30 | 50 |
| Inks with varying amount of polymer in colorant | Ex. 52 | 25 | 24 | 22 | 13 | 10 | 8 | 7 | 6 |
| | Ex. 53 | 30 | 28 | 25 | 18 | 13 | 10 | 8 | 7 |
| | Ex. 54 | 40 | 37 | 34 | 20 | 17 | 15 | 11 | 9 |
| | Ex. 56 | 26 | 24 | 22 | 13 | 10 | 8 | 7 | 6 |
| | Ex. 57 | 32 | 32 | 30 | 17 | 14 | 10 | 9 | 8 |
| | Ex. 58 | 43 | 41 | 35 | 20 | 18 | 12 | 12 | 10 |

As can be seen from the results in Table 51, it was confirmed that when the amount of the polymer is 10% by weight or more, particularly, good color transparency with respect to a transparent sheet such as OHP can be attained.

<Evaluation Test: Rubbing Resistance>

In the preparation of the "polymer-enveloped pigment colorant" contained in the ink of Example 1, the total amount of styrene and butyl acrylate was kept at 60 parts by weight, but the ratio by weight of styrene to butyl acrylate was varied as shown in Tables 52 and 53 to thereby vary the glass transition temperature and film-forming temperature of the polymers. The results of the rubbing resistance evaluation thereof are given in Tables 52 and 53.

The film-forming temperature shown therein was measured as follows: Using the head of an ink jet printer, MJ-930C manufactured by Seiko Epson, solid printing was carried out with each ink at 100% duty at a predetermined temperature on an area of 10 mm×10 mm of a superfine-exclusive glossy film manufactured by Seiko Epson. After the printed film was then left for 1 hour at the temperature, the printed region was rubbed with an aqueous yellow fluorescent ink pen, ZEBRA PEN2 (trademark) manufactured by Zebra, under a load of 500 g at a speed of 10 mm/sec. The temperature at which the printed region was stained was regarded as the film-forming temperature. The evaluation of the rubbing resistance was made according to the method for the evaluation 7 described above.

TABLE 52

| | glass transition temperature (° C.) | | | | | | |
|---|---|---|---|---|---|---|---|
| | 60 | 40 | 30 | 25 | 20 | 10 | 0 |
| St/BA | 37/23 | 27/33 | 21/39 | 18/42 | 15/42 | 9/51 | 2/58 |
| rubbing resistance | C | C | B | A | A | A | A |

St/BA: ratio by weight of styrene to butyl acrylate.

TABLE 53

| | film-forming temperature (° C.) | | | | | | |
|---|---|---|---|---|---|---|---|
| | 60 | 40 | 30 | 25 | 20 | 10 | 0 |
| St/BA | 37/23 | 27/33 | 21/39 | 18/42 | 15/42 | 9/51 | 2/58 |
| rubbing resistance | C | C | B | A | A | A | A |

St/BA: ratio by weight of styrene to butyl acrylate.

As can be seen from the results in Tables 52 and 53, it was confirmed that when the glass transition temperature and film-forming temperature of the polymer part of the colorant are not higher than 25° C., particularly, good rubbing resistance can be obtained.

In addition, also in the preparation of the "polymer-enveloped pigment colorants" contained in the inks of Examples 2 to 4 and 31 to 34, the ratio by weight of styrene to butyl acrylate was varied as in Tables 52 and 53 above, and the same test was carried out. As a result, almost the same results as in Tables 52 and 53 were obtained (In the preparation of the polymer-enveloped pigment or dye colorants for the inks, the total amount of styrene and butyl acrylate was 60 parts by weight in Examples 2 to 4, and was 65 parts by weight in Examples 31 to 34).

In the preparation of the "polymer-enveloped pigment colorant" contained in the ink of Example 190, the addition amount of the hardly water-soluble, film-forming promoter, ADEKA PLANON MCP-709 was varied as shown in Tables 54 and 55. The evaluation results of the rubbing resistance thereof are given in Table Tables 54 and 55.

TABLE 54

| | glass transition temperature (° C.) | | | | | |
|---|---|---|---|---|---|---|
| | 40 | 30 | 25 | 20 | 10 | 0 |
| film-forming promoter (wt. %) | 0 | 10 | 15 | 20 | 30 | 40 |
| rubbing resistance | B | B | A | A | A | A |

TABLE 55

| | film-forming temperature (° C.) | | | | | |
|---|---|---|---|---|---|---|
| | 40 | 30 | 25 | 20 | 10 | 0 |
| film-forming promoter (wt. %) | 0 | 10 | 15 | 20 | 30 | 40 |
| rubbing resistance | B | B | A | A | A | A |

As can be seen from Tables 54 and 55, it was confirmed that when the glass transition temperature and film-forming temperature of the polymer part of the colorant are not higher than 25° C., particularly, good rubbing resistance can be attained.

In addition, also in the preparation of the "polymer-enveloped pigment colorants" contained in the inks of Examples 191 to 197, the film-forming promoter content was varied as in Tables 54 and 55 above, and the same test was carried out. As a result, almost the same results as in Tables 54 and 55 were obtained.

<Evaluation Test: Storage Stability>

Using the inks of Examples 198 to 205, and inks prepared by eliminating therefrom the preservative, the sequestrant or the rust preventive, evaluation of their storage stability and ejection stability was carried out. The results are given in Table 56.

For the storage stability, the inks were tested as follows: The ink to be tested was filled in the cartridge of an ink jet printer, MJ-930C manufactured by Seiko Epson, and left at 30° C. for a half year. After thus left, the ink was checked as to whether it had a foreign odor and got mildewed, or not. The case where foreign substance was not at all visually observed is indicated as "A", and the case where foreign substance was visually observed though its amount was extremely minute is indicated as "B". The case where generation of a foreign odor and mildew was not found is indicated as "A", and the case where generation of a foreign odor and mildew was found is indicated as "B". The case where generation of rust was not found in the nozzle part of the ink jet printer is indicated as "A", and the case where generation of rust was found therein is indicated as "B".

TABLE 56

Storage Stability (upper rows: generation of foreign substance, middle rows: generation of foreign odor and mildew, lower rows: generation of rust)

| | Inks of Examples to be based | | | | | | | |
|---|---|---|---|---|---|---|---|---|
| | Ex. 198 | Ex. 199 | Ex. 200 | Ex. 201 | Ex. 202 | Ex. 203 | Ex. 204 | Ex. 205 |
| no change in composition | A | A | A | A | A | A | A | A |
| | A | A | A | A | A | A | A | A |
| | A | A | A | A | A | A | A | A |
| preservative omitted | A | A | A | A | A | A | A | A |
| | B | B | B | B | B | B | B | B |
| | A | A | A | A | A | A | A | A |

TABLE 56-continued

Storage Stability (upper rows: generation of foreign substance, middle rows: generation of foreign odor and mildew, lower rows: generation of rust)

| | Inks of Examples to be based | | | | | | | |
|---|---|---|---|---|---|---|---|---|
| | Ex. 198 | Ex. 199 | Ex. 200 | Ex. 201 | Ex. 202 | Ex. 203 | Ex. 204 | Ex. 205 |
| sequestrant omitted | B | B | B | B | B | B | B | B |
| | A | A | A | A | A | A | A | A |
| | A | A | A | A | A | A | A | A |
| rust preventive omitted | A | A | A | A | A | A | A | A |
| | A | A | A | A | A | A | A | A |
| | B | B | B | B | B | B | B | B |

As can be seen from Table 56, it was confirmed that, particularly, good storage stability can be attained with the inks containing a preservative, a sequestrant and an ethylenediamine acetate, wherein the preservative is at least one compound selected from the group consisting of alkylisothiazolones, chloroalkylisothiazolones, benzisothiazolones, bromonitroalcohols, oxazolidines and chloroxylenols, the sequestrant is ethylenediamine acetate, and the rust preventive is dicyclohexylammonium nitrate and/or benzotriazole.

INDUSTRIAL APPLICABILITY

As has been described hereinabove, the present invention provides an ink jet recording ink, an ink jet recording ink set and a recording method, having excellent dispersion stability and ejection stability and being capable of providing a high-quality image which is free from bleeding and has high printed density and excellent color development property even on plain paper and regenerated paper.

Also, the invention provides an ink jet recording ink, an ink jet recording ink set and a recording method, capable of attaining satisfactory rubbing resistance not only on plain paper and regenerated paper but also on other recording media such as coated paper, etc.

Also, the invention provides an ink jet recording ink and an ink jet recording ink set, which have excellent long-term storage stability.

Also, the invention provides recorded matter having high-quality images of high printed density and excellent color development property, and having satisfactory rubbing resistance.

Still also, the invention is to provide an ink jet recording apparatus capable of producing recorded matter having high-quality images of high printed density and excellent color development property, and having satisfactory rubbing resistance.

The invention claimed is:

1. An ink jet recording ink comprising:
   a pigment dispersed by a polymer;
   water;
   at least one compound selected from the group consisting of an acetylene glycol surfactant and an acetylene alcohol surfactant; and
   1,2-hexanediol;
   wherein the pigment dispersed by the polymer is produced by a phase conversion emulsification, an emulsion polymerization, an acid deposition or a forced emulsification;
   wherein the polymer has a glass transition temperature of not higher than 15° C;
   wherein the ink has a surface tension between 25 mN/m and 45 mN/m; and
   wherein the polymer has a crosslinked structure.

* * * * *